(12) United States Patent
Fleming-Dahl

(10) Patent No.: US 6,744,893 B1
(45) Date of Patent: Jun. 1, 2004

(54) RECEIVER ESTIMATION ENGINE FOR A CHAOTIC SYSTEM

(75) Inventor: Arthur Fleming-Dahl, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/382,523

(22) Filed: Aug. 25, 1999

(51) Int. Cl.$^7$ ................................................ H04L 9/00
(52) U.S. Cl. ......................... 380/263; 380/46; 380/274
(58) Field of Search ........................ 380/263, 46, 274

(56) References Cited

U.S. PATENT DOCUMENTS

| | | | |
|---|---|---|---|
| 5,291,555 A | * 3/1994 | Cuomo et al. | ............... 380/263 |
| 5,379,346 A | 1/1995 | Pecora et al. | |
| 5,432,697 A | 7/1995 | Hayes | |
| 5,473,694 A | 12/1995 | Carroll et al. | |
| 5,510,976 A | 4/1996 | Tanaka et al. | |
| 5,680,462 A | 10/1997 | Miller et al. | |
| 5,748,851 A | 5/1998 | Iokibe et al. | |
| 5,857,025 A | * 1/1999 | Anderson et al. | ............. 380/28 |
| 6,178,217 B1 | * 1/2001 | Defries et al. | ............... 375/377 |
| 6,363,153 B1 | * 3/2002 | Parker et al. | ............... 380/263 |

OTHER PUBLICATIONS

Herve Dedieu, Michael Peter Kennedy and Martin Hasler, "Choas Shift Keying: Modulation and Demodulation of a Chaotic Carrier Using Self–Synchronizing Chua's Circuits", Oct. 1993, pp. 634–641.

Scott Hayes and Celso Grebogi, "Coding information in the natural complexity of chaos", 1993, pp. 153–160.

Scott Hayes, Celso Grebogi, Edward Ott and Andrea Mark, "Controlling Symbolic Dynamics for Communication", 1993, pp. 122–129.

Louis Pecora, "Overview of chaos and communications research", 1993, pp. 2–21.

Philip Downes, "Secure Communication Using Chaotic Synchronization", 1993, pp. 227–234.

Henry D.I. Abarbanel and Paul S. Linsay, "Secure Communications and Unstable Periodic Orbits of Strange Attractors", Oct. 1993, pp. 643–645.

Thomas L. Carroll and Louis M. Pecora, "Synchronizing Chaotic Systems", 1993, pp. 32–42.

Thomas L. Carroll and Louis M. Pecora, "Synchronizing Nonautonomous Chaotic Circuits", 1993, pp. 646–649.

Jorg Schweizer, "A stochastic approach to spread spectrum communication using chaos", 1995, pp. 115–124.

(List continued on next page.)

Primary Examiner—Gilberto Barrón
Assistant Examiner—Kambiz Zand
(74) Attorney, Agent, or Firm—Taylor Russell & Russell, P.C.

(57) ABSTRACT

A chaotic receiver estimation engine and method of use. The estimation engine synchronizes and recovers data and performs its decision and tracking processes by mapping probability calculation results onto chaotic dynamics via a strange attractor geometrical approximation. Restrictive standard chaotic synchronization requirements of either a stable/unstable subspace separation or a chaotic system inversion are not required. The receiver determines and models both the logical zero and logical one versions of the strange attractor and the transmitted chaotic sequence probability density function (PDF). Two estimates of the transmitted value are created from each received iterate by probability and the transmitted PDF calculations. A third estimate is generated from the chaotic processing of the previous receiver final decisions. The three estimates are combined using a probability-based weighted average to form the initial current decision. A final current decision incorporates chaotic dynamics by mapping the initial decision onto the geometrical model of the attractors via a minimum Euclidean distance metric.

67 Claims, 33 Drawing Sheets

OTHER PUBLICATIONS

T. L. Carroll, "Amplitude–independent chaotic synchronization and communication", 1995, pp. 181–187.

Ute Feldmann, Martin Hasler and Wolfgang Schwarz, "Communication by Chaotic Signals: the Inverse System Approach", 1995, pp. 680–683.

Martin Hasler, "Engineering chaos for encryption and broadband communication", 1995, pp. 115–125.

Maciej J. Ogorzalek, "view of electronic chaos generation, control, and applications", 1995, pp. 2–10.

Kevin M. Short, "Unmasking A Modulated Chaotic Communications Scheme", 1995, pp. 367–375.

T. L. Carroll, "Using Filters For Chaotic Synchronization For Communications", 1995, pp. 688–690.

Scott Hayes and Celso Grebogi, "Digital Communication Using Controlled Chaos: Theory And Experiment", 1996, pp. 170–173.

Jorg Schweizer and Martin Hasler, "Multiple Access Communications Using Chaotic Signals", 1996, pp. 108–111.

Frank Dachselt, Kristina Kelber and Wolfgang Schwarz, "Chaotic Coding And Cryptoanalysis", 1997, pp. 1061–1064.

Hiroyuki Kamata, Tetsuro Endo and Yoshihisa Ishida, "Communication With Chaos Via DSP Implementations", 1997, pp. 1069–1072.

Zbigniew Kotulski and Janusz Szczepanski, "Discrete chaotic cryptography", 1997, pp. 381–394.

Chang–song Zhou and Tian–lun Chen, "Robust communication via chaotic synchronization based on contraction maps", 1997, pp. 60–65.

Hong Zhou, Xie–Ting Ling and Jun Yu, "Secure Communication Via One–dimensional Chaotic Inverse Systems", 1997, pp. 1029–1032.

* cited by examiner

PARABOLIC TRANSPOSITION THROUGH THE HENON MAP
HIGHLIGHTING THE FIXED POINT (STAR)

MAJOR AND MINOR SECTION LIMITS AN THE HENON ATTRACTOR

MAJOR AND MINOR SECTION LIMITS AN THE PARABOLAS

PARABOLA 4, QUAD IV→PARABOLA 1, QUAD I &
PARABOLA 1, QUAD II

PARABOLA 1, QUAD I,→PARABOLA 3, QUAD I

RECEIVER ESTIMATION ENGINE FOR A CHAOTIC SYSTEM

The present invention relates generally to chaotic communications systems and more particularly to a chaotic communication system utilizing a chaotic receiver estimation engine. This estimation engine both synchronizes and recovers data by mapping probability calculation results onto the chaotic dynamics via a strange attractor geometrical approximation. For synchronization, the system does not require either a stable/unstable subsystem separation or a chaotic system inversion. The techniques employed can be implemented with any chaotic system for which a suitable geometric model of the attractor can be found.

BACKGROUND

Chaos is an area of science and mathematics that is characterized by processes that are nonlinear, such as equations that have a squared or higher order term. Chaotic processes are iterative, in that they perform the same operations over and over. By taking the result of the process (equations) and performing the process again on the result, a new result is generated. Chaos is often called deterministically random motion. Chaotic processes are deterministic because they can be described by equations and because knowledge of the equations and a set of initial values allows all future values to be determined. Chaotic processes also appear random since a sequence of numbers generated by chaotic equations has the appearance of randomness. One unique aspect of chaos compared to an arbitrarily chosen aperiodic nonlinear process is that the chaotic process can be iterated an infinite number of times, with a result that continues to exist in the same range of values or the same region of space.

A chaotic system exists in a region of space called phase space. Points within the phase space fly away from each other with iterations of the chaotic process. Their trajetories are stretched apart but their trajectories are then folded back onto themselves into other local parts of the phase space but still occupy a confined region of phase space A geometrical shape, called the strange attractor, results from this stretching and folding process. One type of strange attractor for a chaotic process called the Rossler system is depicted in FIG. 1, and illustrates the stretching and folding process. The chaotic attracter exists in perpetuity in the region of phase space for which the chaotic system is stable.

In an unstable system, two points in phase space that are initially close together become separated by the stretching and the folding, which causes the points to be placed correspondingly farther apart in the phase space than they originally were. Repeating the process (iterating) accentuates the situation. The points not only diverge from each other, but both trajectories move toward infinity and, therefore, away from the stable region of perpetual chaotic existence.

The sequences of points that result from two closely spaced initial conditions become very different very quickly in chaotic processes. The Henon chaotic system, for example, has been shown to start with two initial conditions differring by one (1) digit in the $15^{th}$ decimal place. The result was that within 70 iterates the trajectories were so different that subtracting them resulted in a signal that was as large as the original trajectories' signals themselves. Therefore, the stretching and folding causes the chaotic process to exhibit sensitive dependence on initial conditions. A receiver without perfect information about a transmitter (a "key") will be unable to lock to the transmitter and recover the message. Even if a very close lock were achieved at one point in time, it is lost extremely quickly because the time sequences in the transmitter and receiver diverge from each other within a few iterations of the chaotic process.

Chaotic nonlinear dynamics may be utilized in telecommunications systems. There is interest in utilizing and exploiting the nonlinearities to realize secure communications, while achieving reductions in complexity, size, cost, and power requirements over the current communications techniques. Chaotic processes are inherently spread in frequency, secure in that they possess a low probability of detection and a low probability of intercept, and are immune to most of the conventional detection, intercept, and disruption methods used against current 'secure' communications systems based on linear pseudo-random noise sequence generators. Chaotic time sequences theoretically never repeat, making them important for such applications as cryptographic methods and direct sequence spread spectrum spreading codes. In addition, chaotic behavior has been found to occur naturally in semiconductors, feedback circuits, lasers, and devices operating in compression outside their linear region.

Unfortunately, many of these characteristics also complicate the task of recovering the message in the chaotic transmission. A fundamental problem permeating chaotic communications research is the need for synchronization of chaotic systems and/or probabilistic estimation of chaotic state, without which there can be no transfer of information. Without synchronization, meaning alignment of a local receiver chaotic signal or sequence with that of the transmitter, the characteristic of sensitive dependence on initial conditions causes free-running chaotic oscillators or maps to quickly diverge from each other, preventing the transfer of information. Probability-based estimates of chaotic state are typically made via correlation or autocorrelation calculations, which are time consuming. The number of iterates per bit can be reasonable in conjunction with synchronization, but values of several thousand iterates per bit are typically seen without synchronization.

A general communications system employing chaos usually consists of a message m(t) injected into a chaotic transmitter, resulting in a chaotic, encoded transmit signal y(t). This signal is altered as it passes through the channel, becoming the received signal r(t). The receiver implements some mix of chaotic and/or statistical methods to generate an estimate of the message $m_e(t)$.

The recovery of a message from transmitted data depends on the ability of the receiver to perform either asynchronous or synchronous detection. There are three fundamental approaches to chaotic synchronization delineated in the literature of the prior art: (1) decomposition into subsystems, (2) inverse system approach, and (3) linear feedback.

If the approach is a decomposition into subsystems, the chaotic system is divided into two or more parts: an unstable subsystem usually containing a nonlinearity and one or more stable subsystems. The stable subsystem may contain a nonlinearity if its Lyapunov exponents remain negative. The Lyapunov exponents of all subsystems must be computed to evaluate the stability or instability of each one, where negative Lyapunov exponents indicate stability and positive Lyapunov exponents indicate instability. The arbitrary division into stable and unstable systems is accomplished by trial and error until successful. The driver or master system is the complete chaotic system, and the driven or slave system(s) consists of the stable subsystem(s). In general, synchronization will depend on circuit component choices and initial conditions.

The problem with using the decomposition approach is threefold. First, the decomposition into subsystems is arbitrary, with success being defined via the results of Lyapunov exponent calculations. There is presently no known method by which to synthesize successful subsystem decomposition to satisfy a set of requirements. Second, the evaluation of Lyapunov exponents can become extremely involved, complicated, and messy. The time and effort spent evaluating a trial, arbitrary decomposition can be extensive, with no guarantee of success. Third, there can be several possible situations for the subsystem decompositions for a given chaotic process. A chaotic process could have single acceptable decomposition, multiple acceptable decompositions, or no acceptable decompositions. Since the method is by trial-and-error and without guarantee of success, a general approach that will work for an arbitrary chaotic process is highly desirable.

In the inverse system approach, the receiver is designed to invert the chaotic function of the transmitter. For appropriate choices of transmitter systems and initial conditions, inverse systems can be designed into a receiver that results in perfect recovery of a noiseless transmitted message. However, one major drawback of using the inverse system approach is that signal noise results in erroneous message recovery. In addition, the invertible system must be based on a specially designed chaotic process since generic chaotic signals are not invertible. The collection of specially designed invertible chaotic processes is very small. This seriously limits the repertoire of receiver designs as well as the library of applicable chaotic process choices. Hostile countermeasures designers would have a relatively easy time analyzing and compromising the small set of systems that could be developed using these invertible chaotic functions.

In the linear feedback system approach, a master-slave setup is used in which the output of the slave system is fed back and subtracted from the received chaotic time sequence to generate an error function. The error function drives the slave system in a manner reminiscent of a phase-lock loop. Synchronization depends on the initial conditions of the master and slave systems. One drawback of linear feedback systems is that without a set of constraints on the initial conditions, synchronization of the master and slave systems cannot be guaranteed. In addition, the slave is a stable subsystem of the chaotic process, and is subject to the same drawbacks and limitations enumerated for the subsystem decomposition method above.

In addition to the three fundamental approaches to chaotic synchronization, there are four basic methods of encoding digital data into chaotic transmitted sequences: masking, orbit control, chaos shift key, and orthogonal autocorrelation sequence. They employ several different chaotic systems, with the most commonly mentioned including the Henon, Rossler, Lorenz, and Double Scroll (Chua's circuit). Most of these methods have variations in their implementations. A common problem among them is the issue of transmitter-receiver synchronization.

Signal masking refers to the process of embedding a message in a free-running chaotic time series such that the message is hidden, the chaotic dynamics are not altered enough to preclude synchronization, and the chaotic noise-like waveform is the dominant transmit feature. Signal masking consists of the message signal being added to a chaotic signal and recovered via subtraction of the synchronized receiver local chaotic signal from the received waveform. The masking signal requirements are satisfied when the message power has an embedding factor on the order of −30 dBc, which places the message power 30 dB below the chaotic power. Synchronization has been shown at higher information signal power levels, but with increased incidence of synchronization error bursts and degraded message recovery. One difficulty with this method is that noise power on the order of the message signal power level results in erroneous message recovery. The transmit SNR, which is determined by the power of the chaotic signal, must be very large in order to overcome the effects of modest channel noise which wastes power and broadcasts the signal presence (non-LPD). In addition, small trajectory perturbations, as little as the order of $10^{-16}$, can result in significant synchronization error bursts. Another difficulty for real implementations is that most synchronous chaotic systems can't accommodate channel losses, because the receiver synchronization degrades when the received signal has been attenuated from its original transmitted value. Finally, an unintended listener can recover the message without knowledge of the chaotic system by performing a mathematical reconstruction of the chaotic attractor and using it in conjunction with a set of recent observations to make local predictions of the immediate future for the chaotic system. Sufficiently accurate results are obtained to subtract out the chaotic process and uncover the hidden message, thereby compromising the security of the chaotic communication.

Chaotic attractors consist of an infinite number of unstable periodic orbits, all of which will be approached eventually from any initial condition. The system trajectory will be repelled away from any given orbit because of the stretching and folding of the chaotic dynamics, but it will eventually return to within a small neighborhood of the same orbit for the same reason. Orbit control exploits this type of behavior to transmit information by controlling the system trajectory such that it stays in the vicinity of one or more orbits for a prescribed length of time or follows a predetermined sequence of orbits. This method is very sensitive to noise and relatively small perturbations to the transmitted signal can cause the receiver trajectory to drift out of the required orbit.

Using the chaos shift key method of encoding digital data into chaotic transmitted sequences, for a binary-valued data stream, an aspect of the chaotic system is altered to create a transmit data stream. One method is to toggle a chaotic system parameter value, causing the data stream to switch between two chaotic attractors. Alternatively, the output can be inverted or not (i.e., multiplied by +1 or −1), causing the two attractors to be mirror images of each other. Both methods utilize a chaotic synchronization scheme as a precondition of message recovery. The message is demodulated either via the detection of synchronization with one of two attractors in the receiver (a hardware version of which is used with a Chua's circuit), or by the statistical method of correlation between the received sequence and a local chaotic signal over a large number of samples.

The orthogonal autocorrelation sequence method of encoding digital data into chaotic transmitted sequences develops a system with signal properties such that multiple user signals can be combined at the transmitter and then separated at each receiver by an autocorrelation calculation. The technique is presented as a general design method independent of the chaotic system used for the transmitter, but heavy use is made of a specific chaotic process in developing the concepts and results. Reasons for developing this scheme include the claims that non-repeating chaotic carrier signals provide greater transmission security than periodic carriers, require neither acquisition nor tracking logic for successful detection, and are more immune to co-channel interference than periodic carrier methods. Implementation investigations have demonstrated that an extremely large number of received values is required to accomplish demodulation, severely restricting the message data rates.

DESCRIPTION OF THE INVENTION

The present invention is a communications system based on a chaotic estimation engine. The invention provides for efficient communication with as little as two iterates per bit, a very general synchronization scheme, the integration of statistical methods with chaotic dynamics in the data recovery calculations, algorithms to enable a maximum aposteriori transmitted value estimation, secure communication by using completely overlapping ranges of transmit values for the conveyance of a logical zero or a logical one, and the development of a signal-to-noise ratio (SNR) estimator that produces good estimates of the true channel SNR and tracks changes in the channel noise power over time.

A transmit sequence is derived that sends one version of the chaotic strange attractor for a logical one and another version for a logical zero. Several new computational techniques allow for the estimation of both the instantaneous and average signal-to-noise ratio (SNR) values, as well as the maximum a posteriori (MAP) transmitted value for a given received chaotic iterate.

The receiver synchronizes to the transmitted chaotic sequence without requiring a chaotic equation separation into stable and unstable components or the design of an invertible chaotic process as was done in previous systems. The two processes of chaotic synchronization and message recovery required for synchronous communications are interleaved in the receiver estimation engine algorithms, obviating the need for an independent effort to achieve the synchronization of the transmitted chaotic signal with a locally generated version in the receiver. The estimation engine has the ability to make accurate decisions with as little as two chaotic iterations per data bit.

Three different estimates are generated for each received value and then combined into a single initial decision. This initial decision is mapped onto the closest portion of the geometric structures used to model the chaotic attractors via a minimum Euclidean metric. This mapping results in the final receiver decision of the transmitted value for the current received iterate. The concluding step of combining the decisions for all iterates in a bit yields the receiver bit decision, which is the transmitted message recovery.

A nonlinear chaotic receiver comprises a component for receiving a chaotic encoded digital signal transmission from a chaotic transmitter, synchronizing the chaotic receiver with the chaotic transmitter and recovering the contents of the encoded chaotic digital signal transmission using a chaotic strange attractor model and a chaotic probability density function model. Synchronization of the chaotic receiver with the chaotic transmitter and recovery of the contents of the encoded chaotic digital signal transmission may occur in the same calculations and result concurrently from the same calculations. The chaotic encoded digital signal transmission is a data sequence comprising a first through N number of iterates, wherein the first iterate represents a first value in the data sequence and the Nth iterate represents a last value in the data sequence. The chaotic strange attractor model comprises using one chaotic sequence to represent a logical zero data state and using a second chaotic sequence to represent a logical one data state. The first and second chaotic sequences may have attractors with completely overlapping regions of validity and the attractors may be mirror images of each other. The attractors are modeled as a set of geometrical functions having defined regions of validity. The chaotic strange attractor model comprises a strange attractor generated by combining Henon and mirrored Henon attractors, wherein the Henon and mirrored Henon attractors are generated by starting with one or more arbitrary points within an area of phase space that stretches and folds back onto itself, and inputting the points to a set of Henon equations, the result being the Henon attractor, and taking a mirror image of the Henon attractor to form the mirrored Henon attractor where the strange attractor is represented as a set of parabolas displayed on a Cartesian coordinate system and the parabolic regions of validity of the strange attractor are determined. The chaotic attractor model determines any existing fixed point on the strange attractor that repeats itself through multiple iterations of the chaotic transmission. The data sequence of the received chaotic encoded digital signal transmission is randomly selected from the group consisting of a first logical state for the Henon attractor and a second logical state for the mirrored Henon attractor. The chaotic probability density function models the probability of the first and second logical states of the Henon and mirrored Henon attractors as a random selection. The Henon strange attractor is generated by using image calculations on a Henon map, is represented in a Cartesian coordinate system as a crescent-like shape which occupies all four quadrants of the Cartesian coordinate system and is modeled as a set of four parabolas. The contents of the encoded chaotic digital signal transmission is determined by generating an initial decision for the contents of each iterate and generating a final decision for the contents of each iterate using a decision and weighting function. The final decision is generated using a synchronizer and final decision function and the final decision is used to recover the data sequence. The contents of the encoded chaotic digital signal transmission are determined by generating three estimates for each iterate received and calculating an initial decision for each iterate and mapping the initial decision onto the chaotic attractor to form a final decision for each estimate. The three estimates comprise a first estimate which is the value of the received iterate, a second estimate which is a minimum error probabilistic estimate and a third estimate which is a final decision of the previous iterate processed through Henon and mirrored Henon equations. The three estimates are combined to form the initial decision through a weighted average using probability calculations for the first, second and third estimates.

A means for determining a synchronization estimate to synchronize the chaotic receiver with a chaotic transmitter that generates the encoded chaotic digital signal transmission is provided. Signal estimates of the value of the 1 through N iterates received are generated.

The signal estimates comprise a received value which is equal to the actual value of the received iterate, a maximum a posteriori (MAP) estimate and a decision feedback estimate. The decision feedback estimate comprises generating a first decision feedback estimate for iterate n by passing iterate (n−1) through Henon equations and generating a second decision feedback estimate for iterate n by passing iterate (n−1) through mirrored Henon equations.

The decision and weighting function comprises performing a probabilistic combination of the three signal estimates by finding a probability for each iterate for each received value, MAP estimate and decision feedback estimate, generating an initial decision for each iterate, selecting the feedback estimate closest in value to the received value and the MAP estimate, generating weighting factors used in a weighted average computation and performing a weighted average, calculating a discount factor to discount a final decision for received values close to zero, determining the Cartesian coordinate representation of the initial decision and passing the Cartesian coordinates of the initial decision to a synchronizer and final decision generator and passing the zero proximity discount value to a system to bit map function. The weighting factors comprise generating a first weighting factor that quantifies channel effects by using a transmit PDF window used in determining the MAP estimate and multiplying the channel effects weighting factor by a second weighting factor that uses a PDF selected from the group consisting of the received PDF and transmit PDF, the result being the weighting factor for each iterate which is passed to the synchronization and final decision function. A discount weight is calculated to reduce the impact of initial decisions whose receive values are close to zero.

The selection of the feedback estimate comprises calculating one dimensional Euclidean distances from the received value and MAP estimate to the first and second feedback estimates and selecting the feedback estimate with the minimum Euclidean distance.

The synchronization and final decision function uses an initial decision from the decision and weighting function and maps Cartesian coordinates of the initial decision onto a Cartesian coordinate representation of the strange attractor. The mapping comprises inputting the initial decision into parabola models, the parabola models comprising equations approximating Henon and mirrored Henon attractors and calculating two dimensional Euclidean distance between the initial decision and every point on all parabolas and selecting a point on an attractor model corresponding to a minimum Euclidean distance as the final decision of the value of each iterate. The transmitted data sequence is recovered by combining the final decision of iterates 1 through N to determine the encoded digital signal transmission data sequence.

The nonlinear chaotic receiver comprises a receiver estimation engine for synchronizing the chaotic receiver with a chaotic transmitter and recovering the value of an encoded chaotic digital signal transmission. The receiver estimation engine comprises a signal-to-noise ratio (SNR) estimator, a maximum a posteriori (MAP) estimator, a feedback estimator wherein the chaotic receiver and the chaotic transmitter synchronization and the encoded digital signal transmission recovery occur concurrently while executing the same set of calculations within the receiver estimation engine. The receiver also includes a decision and weighting function within the receiver estimation engine comprising determining the probability of the estimate produced by the SNR estimator, the MAP estimator and the feedback estimator for each received iterate. The receiver calculates an initial decision for the iterate, a discount weight for a final decision for received values in close proximity to zero, and determines the final estimate of each iterate based on the initial decision from the decision and weighting function and then combines the final decision of iterates 1 through N to recover the encoded digital signal transmission data sequence.

The present invention comprises a method in a computer system and computer-readable instructions for controlling a computer system for receiving and recovering the contents of a chaotic encoded digital signal transmission by receiving a chaotic encoded digital signal transmission from a chaotic transmitter, synchronizing the chaotic receiver with the chaotic transmitter, and recovering the contents of the encoded chaotic digital signal transmission using a chaotic strange attractor model and a chaotic probability density function model.

BRIEF DESCRIPTION OF THE DRAWINGS

These and other features, aspects and advantages of the present invention will become better understood with regard to the following description, appended claims and accompanying drawings where:

FIG. 6b is a plot of the first iterate of the initial array of FIG. 6a.

FIG. 6c is a plot of the second iterate of the initial array of FIG. 6a.

FIG. 6d is a plot of the third iterate of the initial array of FIG. 6a.

FIG. 10a is a plot of the innermost major section. FIG. 10b is a plot of the innermost minor section. FIG. 10c is a plot of the outermost minor section. FIG. 10d is a plot of the outermost major section.

DETAILED DESCRIPTION OF THE INVENTION

Figure 1:
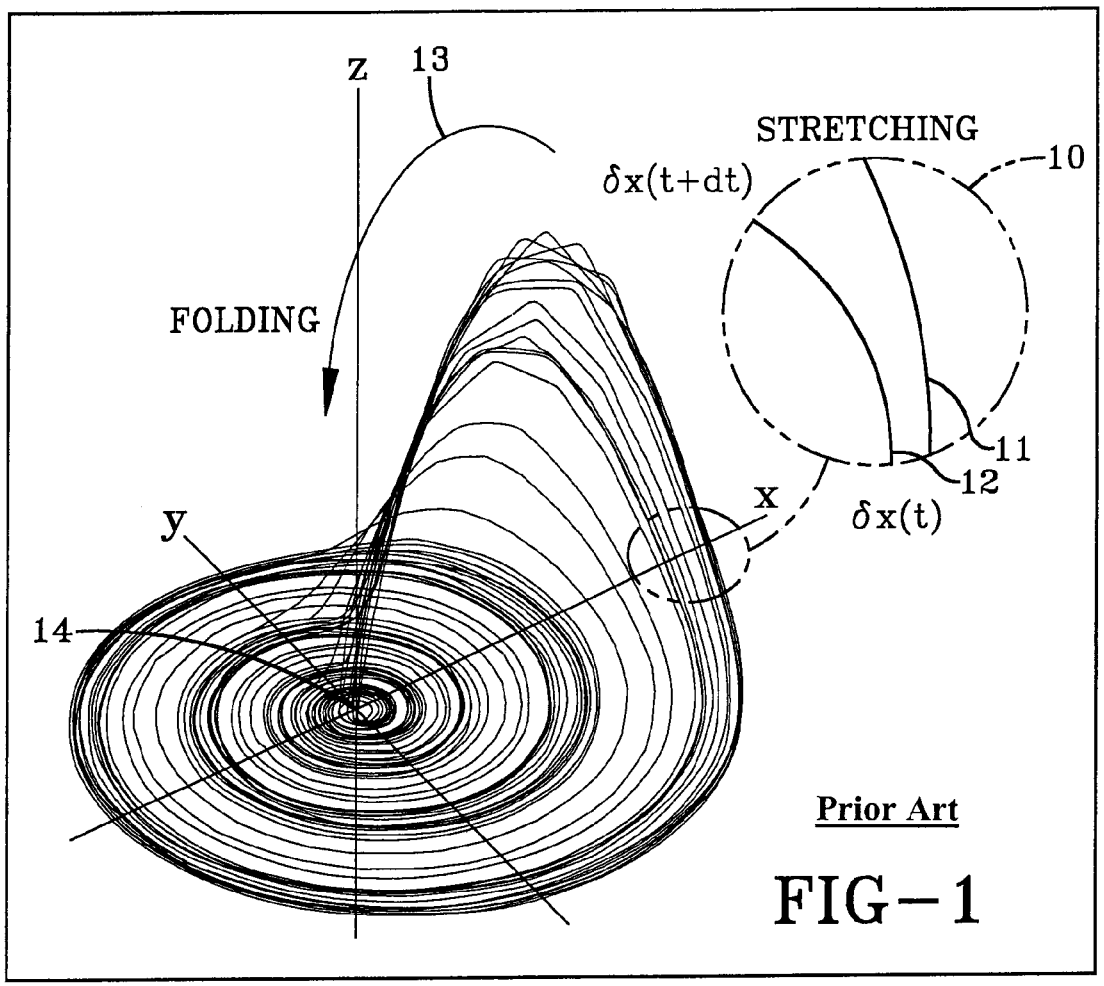
FIG. 1 shows a strange attractor of the Rossler system.

FIG. 1 is a depiction of the strange attractor of the Rossler system, showing the chaotic characteristics of stretching and folding. As a background, chaotic dynamics are frequently viewed in phase space, which is a region of space where the current state of the system perpetually exists. Stretching 10, has causes such as scaling factors greater than unity, power terms such as squared, cubed, etc., or other mathematical processes. The stretching expands the phase space and causes nearby points 11 and 12 in the phase space to move apart as time progresses. Folding 13 is a result of nonlinearities such as power terms or appropriate slope breakpoints. Folding causes the stretched phase space to fold back into its original confinements, resulting in the capture of the chaotic dynamics in a finite area of space 14. Phase space and the structure contained within can be illustrated with a chaotic map (i.e., a set of equations with chaotic behavior) in three-dimensional space using the Rossler system. The chaotic equations operate on coordinates in space, and each iteration of the equations signifies the passage of the next time increment.

The Rossler equations in differential form are $$\frac{dx}{dt} = -(y(t) + z(t))$$

$$\frac{dy}{dt} = x(t) + ay(t)$$

$$\frac{dz}{dt} = b + x(t)z(t) - cz(t)$$
(1)

where a=0.2, b=0.2, and c=5.7 in this case, and t denotes time. In discrete time form, these equations become $$x[k]=x[k-1]-(y[k-1]+z[k-1])$$

$$y[k]=y[k-1]+x[k-1]+ay[k-1]$$

$$z[k]=z[k-1]+b+x[k-1]z[k-1]-cz[k-1]$$
(2)

where k is the discrete time index. For any time k, the coordinate value (x[k],y[k],z[k]) is plotted in space. The collection of points for a large number of iterations in the region of space where the Rossler chaotic system perpetually exists is shown in FIG. 1. The structure that forms from the continued iteration of the chaotic map in this region of perpetual chaotic existence is called the strange attractor of the chaotic system. The strange attractor can be visualized in different ways. One is simply the collection of points that results from repeated iterations of the chaotic system, neither requiring knowledge of the temporal sequence of the points nor using connecting lines between the data points. It is the purest form of the attractor and applies to all attractors, but cannot illustrate the dynamics associated with the chaotic process time evolution. Another attractor visualization method uses a collection of trajectories or orbits that the chaotic system follows. A trajectory or orbit is a sequence of points produced by the dynamics of the chaotic system. Its relationship to the strange attractor is best illustrated by plotting the points in phase space in their temporal order of occurrence, with lines connecting them. The sequence of phase space location can then be traced on the attractor, and such processes as stretching and folding might be illustrated. Some attractors are better than others for this method of visualization. FIG. 1 is an illustration of this trajectory plotting method of attractor construction.

Under iteration, these systems induce all points in phase space within a basin of attraction to collapse to a chaotic attractor and all points outside the basin of attraction to fly off to infinity. The attractor is a fractal, which is a geometrical figure with non-integer dimension. It is comprised of an infinite number of unstable orbits.

Figure 2:
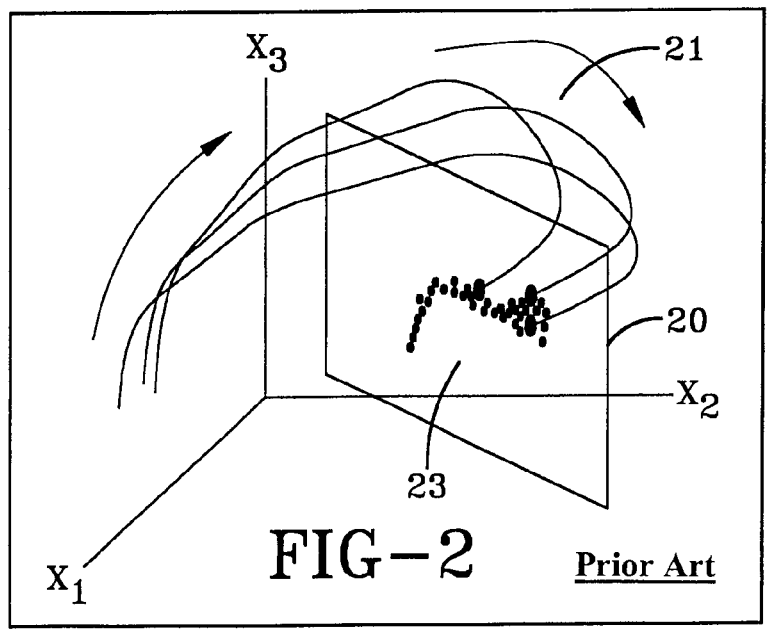
FIG. 2 shows a Poincare surface with intersecting trajectories.

A useful viewpoint of a chaotic process is found by creating a cross-section of its orbit at some position in phase space as shown in FIG. 2, which is a general illustration of a Poincare surface with intersecting trajectories. FIG. 2 shows this cross-section 20, called a Poincare section, and the pattern of intersections for the trajectory crossing the surface of section 21 can have some useful applications in controlling the orbits of a chaotic system either to mitigate chaotic effects in applications where chaos is undesirable or to impart a property to the chaotic system such as information content in a communications system. Every time that a chaotic trajectory 21 crosses the surface of section 20, its position 23 on the section can be determined and the orbit modified if desired. Orbit modification may minimize the drift inherent in one of the infinite number of unstable orbits contained in the chaotic attractor so a predetermined orbit is perpetually maintained. Another possibility is to alter the orbit so it follows a particular sequence of states in the trajectory. A third approach may be to eliminate states from the orbit for the purpose of encoding information into a transmitted chaotic sequence.

Figure 3:
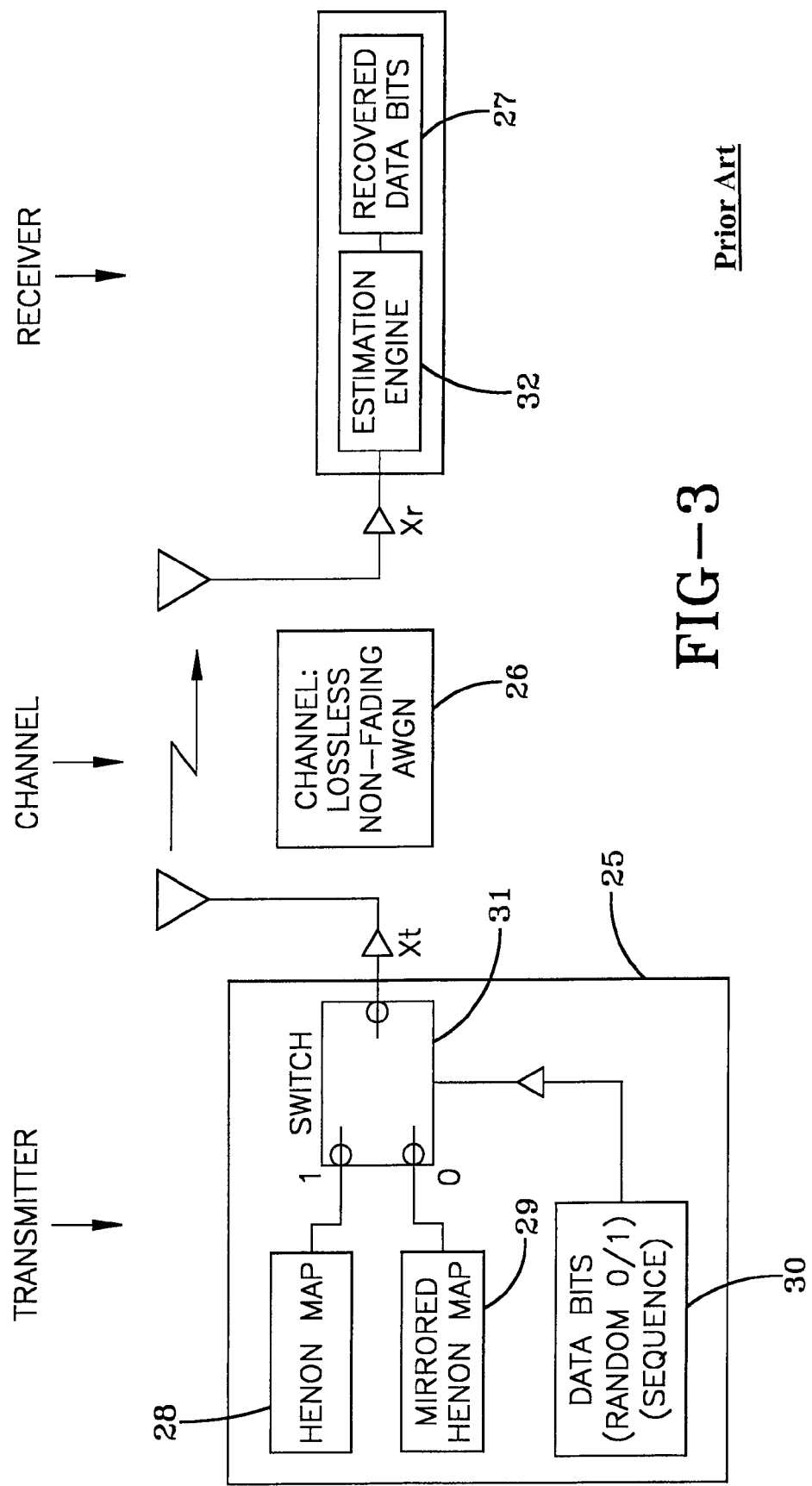
FIG. 3 is a block diagram of a chaotic communication system.

The top-level chaotic communications system block diagram is depicted in FIG. 3, showing a transmitter 25, channel 26, which may be a lossless non-fading AWGN, and receiver 27. In the transmitter, the chaotic system is specified as a Henon map 28, and the alternate version of the same strange attractor labeled the mirrored Henon map 29. Typical data sequences have a stream of logical 0 and 1 values, each occurring with a probability of ½. In these simulations, the data bits are therefore generated as a random bit stream 30, and the logical values of 0 and 1 toggle a switch 31 between the Henon and mirrored Henon chaotic systems.

Although not explicitly shown in FIG. 3, the output of the switch 31 is passed through a digital-to-analog converter (D/A), followed by a power amplifier and possibly frequency translation in order to transmit the encoded chaotic sequence. The practical issues of bit alignment, sampling synchronization, D/A and A/D quantization effects, and channel phenomena such as losses, fading, Doppler, and non-Gaussian noise are addressed in the hardware implementation of this chaotic communications technique.

The receiver 27 in FIG. 3 shows the estimation engine 32, followed by the data bit calculation block 33. Transmitted value and transmitted chaotic system decisions are made on every received value. Data bits containing a certain number of chaotic iterates are recovered by combining the appropriate individual iterate decisions to reach a bit decision to decode the chaotic transmission.

Figure 4:
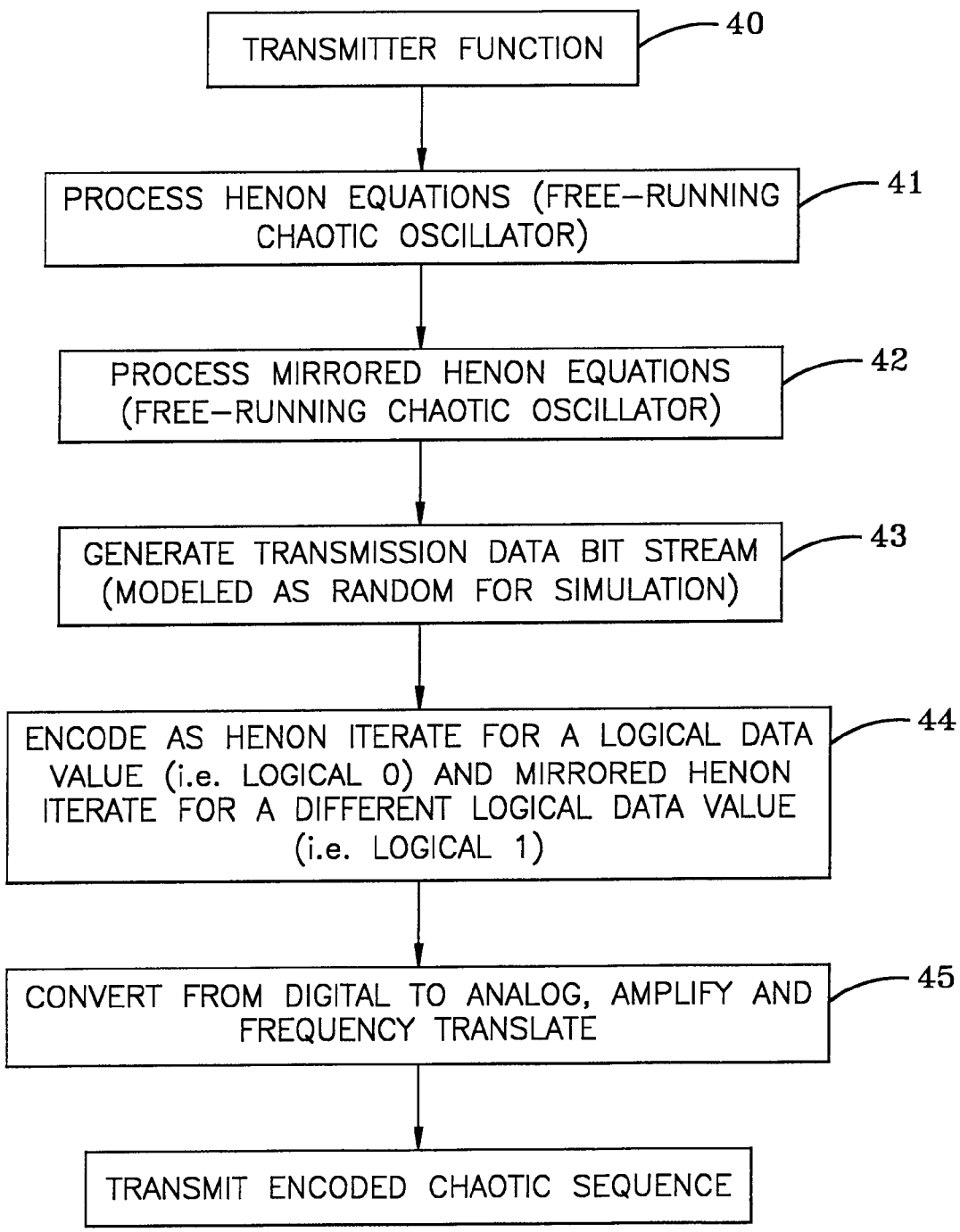
FIG. 4 is a flowchart of the transmitter function.

The transmitter 25 of FIG. 3 is based on the Henon chaotic system. FIG. 4 shows a flowchart of the transmitter function 40. Before transmitting the encoded chaotic signal 45, the transmit function must operate free-running chaotic oscillators 41 and 42, generate the transmission data bit stream 43, encode the data as chaotic iterates 44, convert the iterates from digital to analog and amplify and frequency translate the signal if necessary 45. In designing the receiver estimation engine, the strange attractor and the probability density function must be empirically determined in any implementation of the receiver estimation algorithms. In addition, either or both may be modeled for certain algorithm designs.

Figure 5:
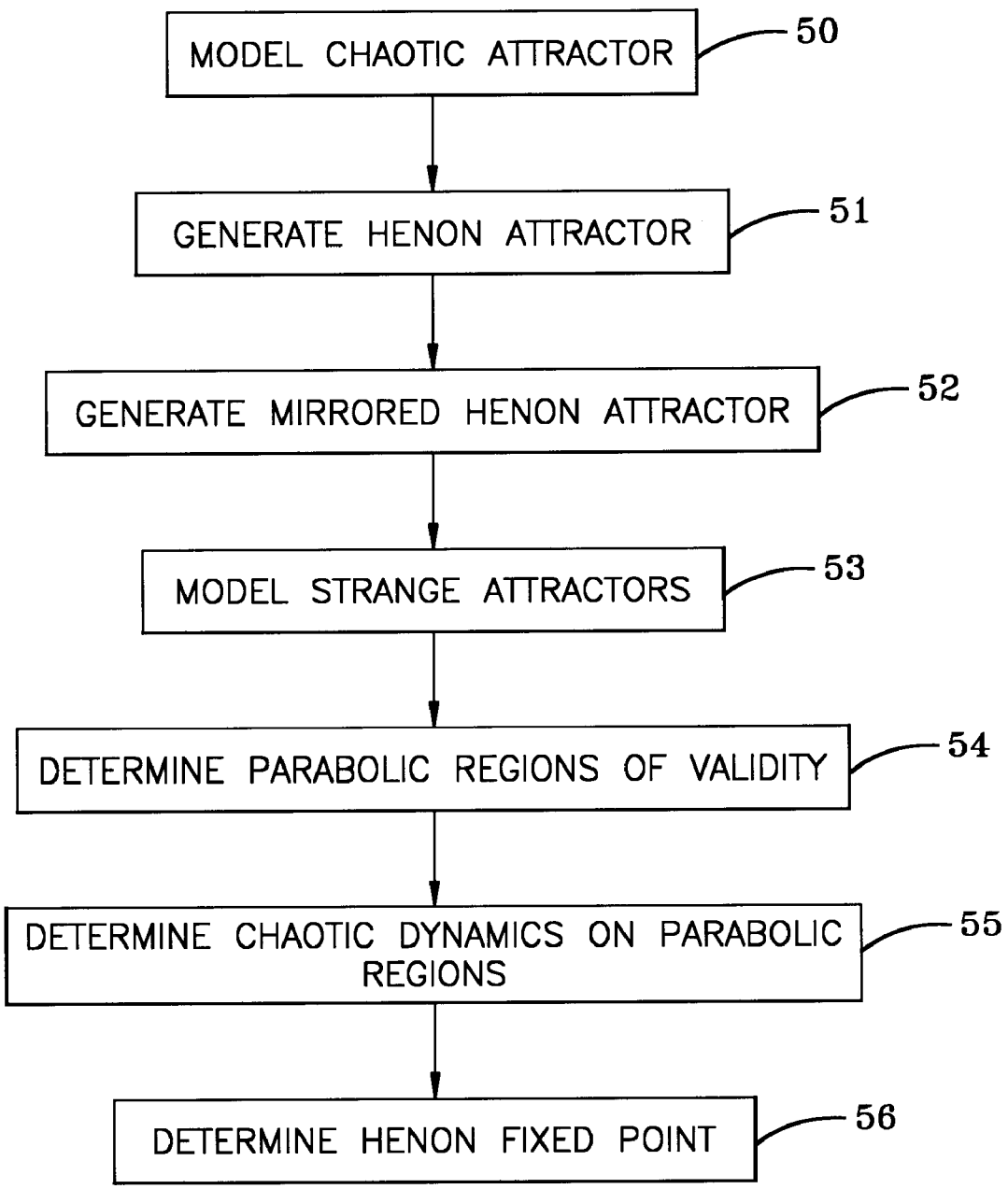
FIG. 5 is a flowcart to model the chaotic attractor.

The modeling of the chaotic attractor may proceed as shown in FIG. 5. The first step in modeling the chaotic attractor 50 is to generate the Henon attractor 51 and the mirrored Henon attractor 52. The next step is to create models of the strange attractor 53. After the strange attractor is modeled 53, the next steps are to determine the parabolic regions of validity 54, the chaotic dynamics on the parabolic regions 55 and to determine the Henon fixed point 56. The processing of these steps is detailed below.

Figure 6A:
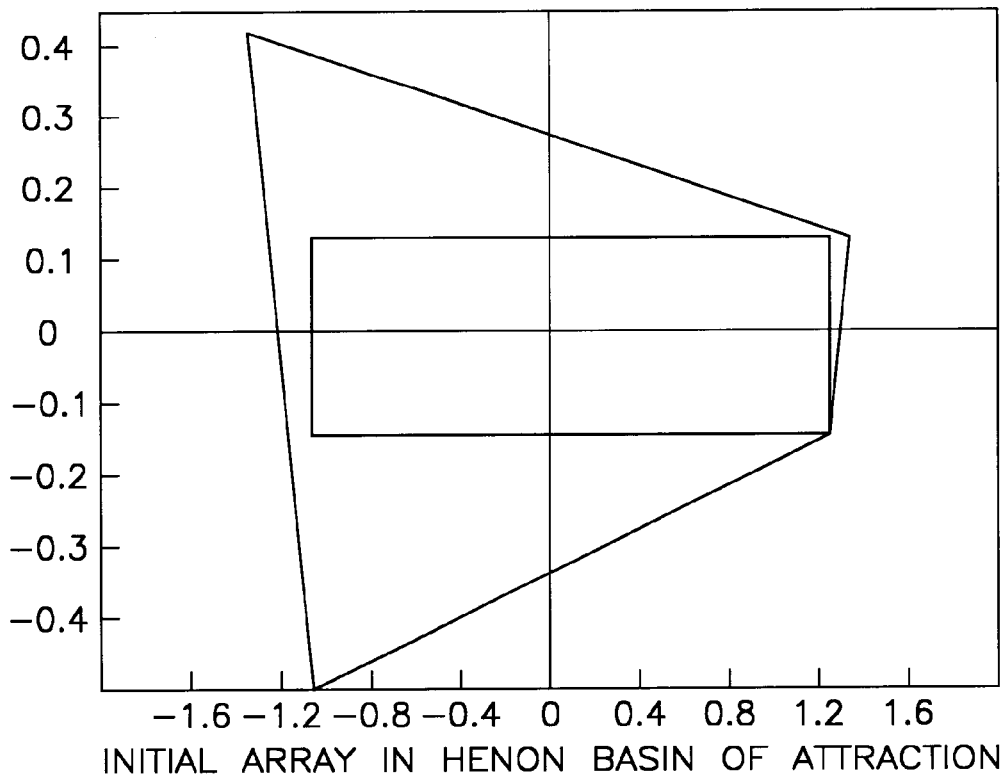
FIG. 6a is a plot of the result of generating a chaotic time series where an entire sector of the basin of attraction was chosen as the initial array condition.
Figure 6B:
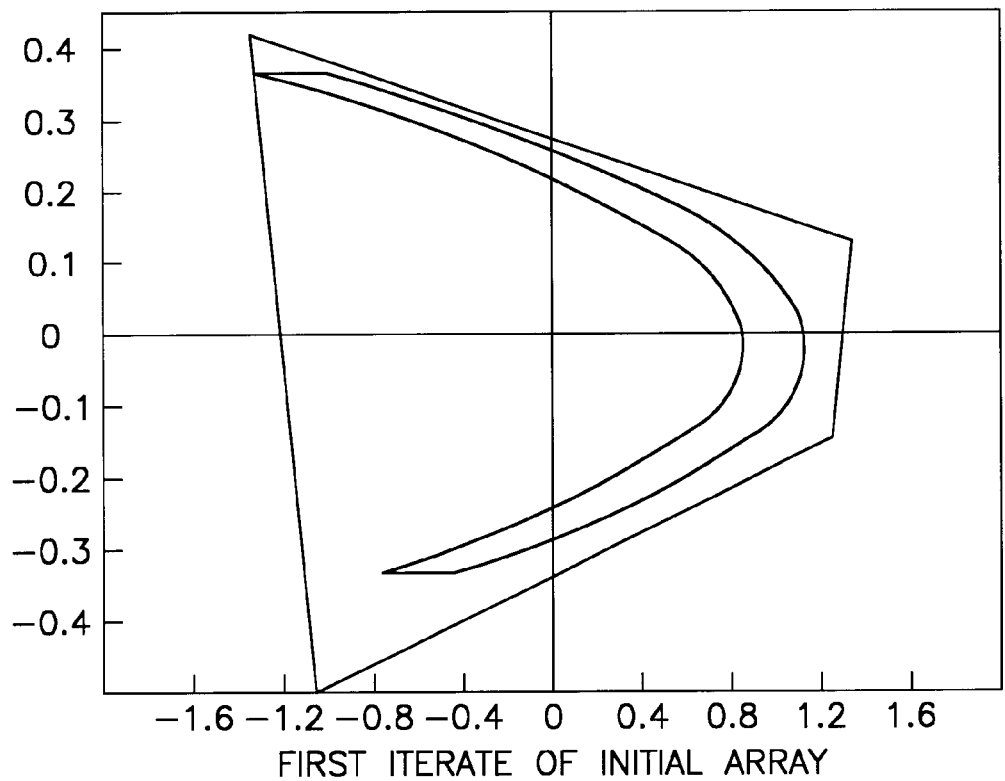
Figure 6C:
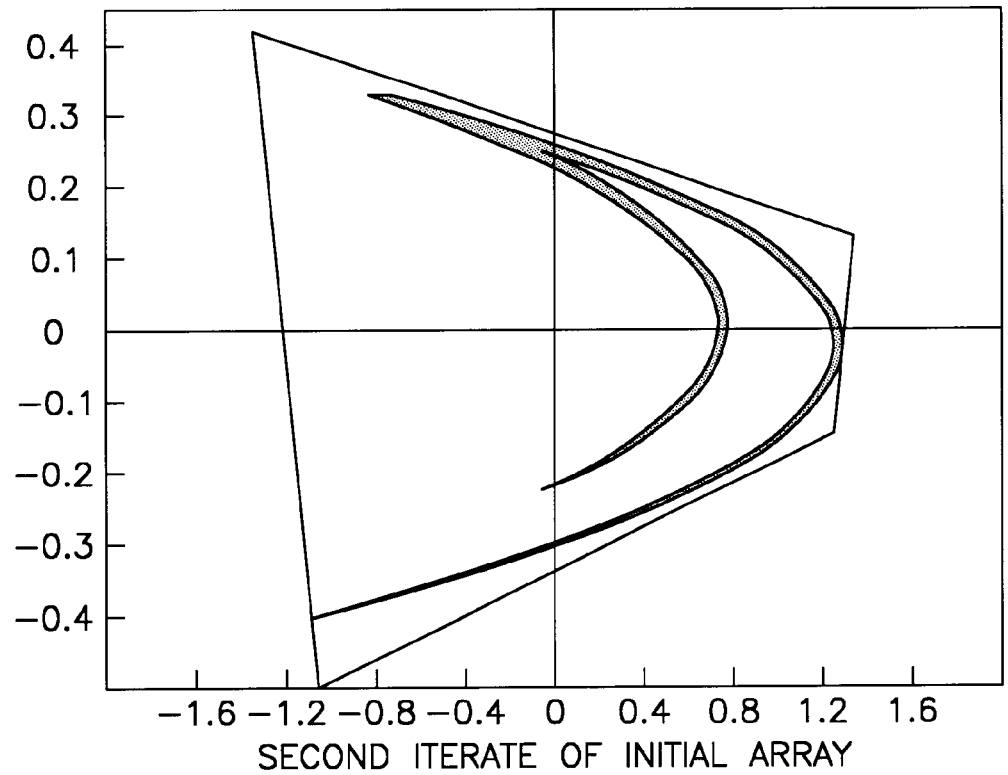
Figure 6D:
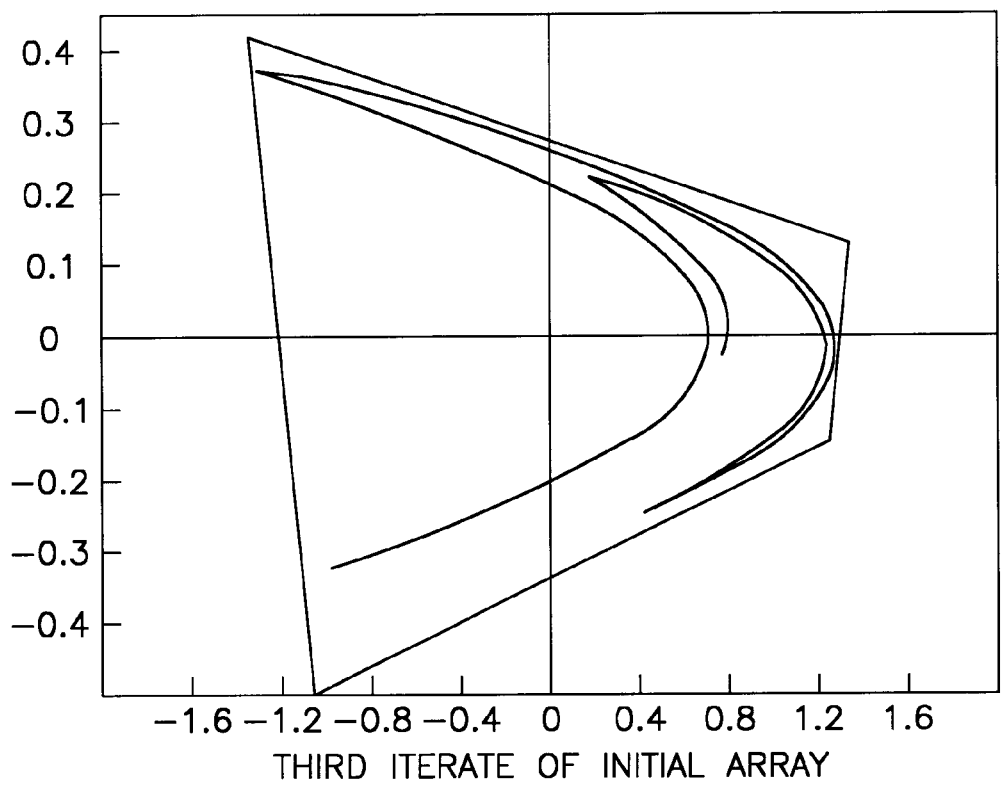

A standard attractor generation technique involves creating a chaotic time series by starting at a single initial point and iterating through the chaotic equations until sufficient information has been obtained to visualize an attractor. This process is shown in FIGS. 6a through d. Instead of starting with a single point and generating a plot from the time series, an entire section of the basin of attraction was chosen as the initial array condition (FIG. 6a). This region quickly changed its morphological appearance into a form resembling the Henon attractor. FIGS. 6b, 6c, and 6d show the first, second, and third iterates of the initial array respectively. The choice of a rectangular subset of the basin of attraction for the process as shown in FIGS. 6a through 6d was one of convenience. Any other area of arbitrary shape wholly contained within the basin of attraction would have generated the same result, with more or fewer iterations necessary, depending on its size.

Figure 7:
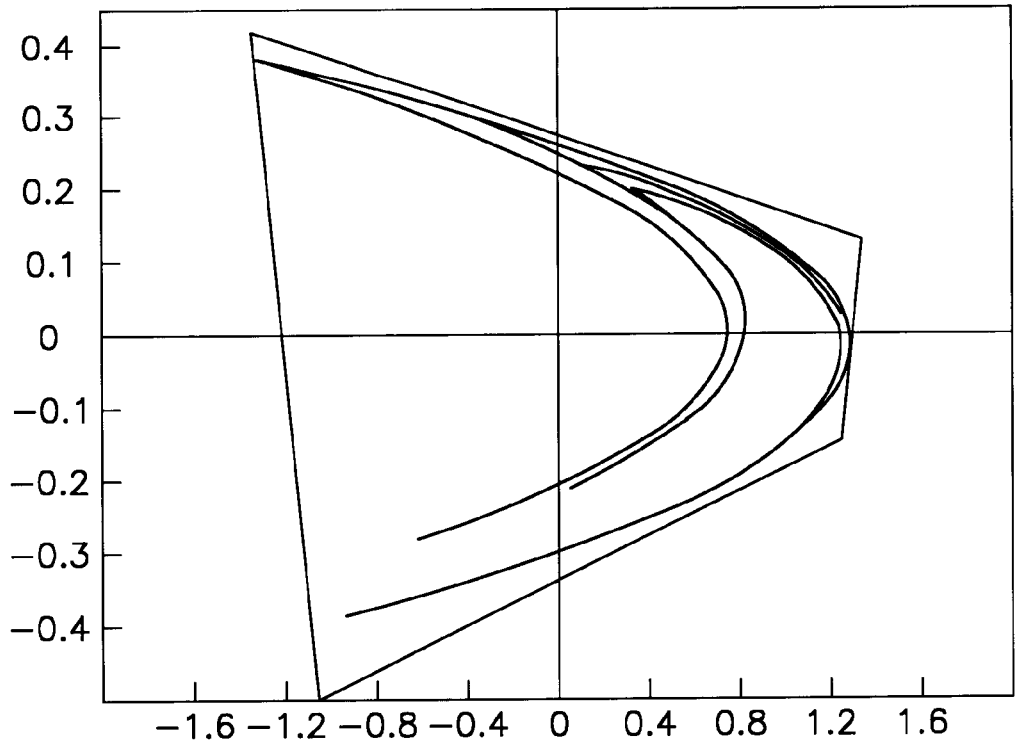
FIG. 7 is a plot of a Henon attractor.

FIG. 7 depicts the resulting Henon attractor. The equations for the Henon chaotic process are that produced this attractor are:

$$x_h[k+1] = -ax_h[k]^2 + y_h[k] + 1 \quad (3)$$

$$y_h[k+1] = bx_h[k] \, k=1, K, K \quad (4)$$

where a=1.4, b=0.3, k=iterate index, and there are K total iterates in a time series.

This process for generating the Henon attractor works because there is a trapping region for chaotic systems, also called a basin of attraction, within which no orbit can escape. In general space, the stretching and folding of the chaotic dynamics will cause many orbits to escape to infinity, but there exists a region of phase space which stretches and folds back onto itself ad infinitum. This region of phase space is called the basin of attraction. This entire trapping region maps back onto itself with a morphologically altered appearance, and multiple iterations of the chaotic transform result in the strange attractor. Letting R represent the basin of attraction and H represent the Henon transform, $$H(R) \subset R, \quad (5)$$

so the Henon transformation of R lies entirely within R. Repeated applications of this region produce subsets of the region, and so no orbits can escape.

FIG. 7 is a plot of a Henon attractor and is the superposition of iterates 5–10,000 of this initial set. The first few iterates of the Henon transform were eliminated because they contained excess area tending to obscure the attractor detail. Iterates in the vicinity of 10,000 had only a few points left to plot because the finite precision of the internal representation of numbers inside computers caused the transforms of distinct numbers to be indistinguishable to the computer. The range of x-values for the Henon system was approximately symmetric, covering roughly (−1.28, 1.28). The y-values have the same approximate symmetry over a smaller range because the they are scaled versions of the x-values, as can be seen in equation (4). This symmetry allows the creation of a second version of the same attractor, mirrored through the x- and y-axes. This mirrored attractor has an identical range of x-values, yielding the desired transmit characteristic of completely overlapping transmit values for both logical data states. It was observed that the structure of the main attractor features appeared roughly parabolic. Simple geometric equations can, therefore, be used to model the major attractor sections, yielding a means by which to map a probability-based receiver decision onto the chaotic dynamics represented by the attractor.

Turning back to FIG. 5, the next step is to empirically determine the mirrored Henon attractor 52 using an identical process as that depicted in FIG. 6 for the Henon chaotic process. The output of that step is a mirrored Henon attractor, shown in FIG. 8, which is a second version of the attractor shown in FIG. 7 created for the second logical state. It is a mirror image through the x- and y-axes which yields intersecting crescents with completely overlapping x-value ranges. Letting $$x_m = -x_h \text{ and } y_m = -y_h, \quad (6)$$

$$x_m[k+1] = 1.4x_m[k]^2 + y_m[k] - 1 \quad (7)$$

$$y_m[k+1] = 0.3x_m[k]. \quad (8)$$

Figure 8:
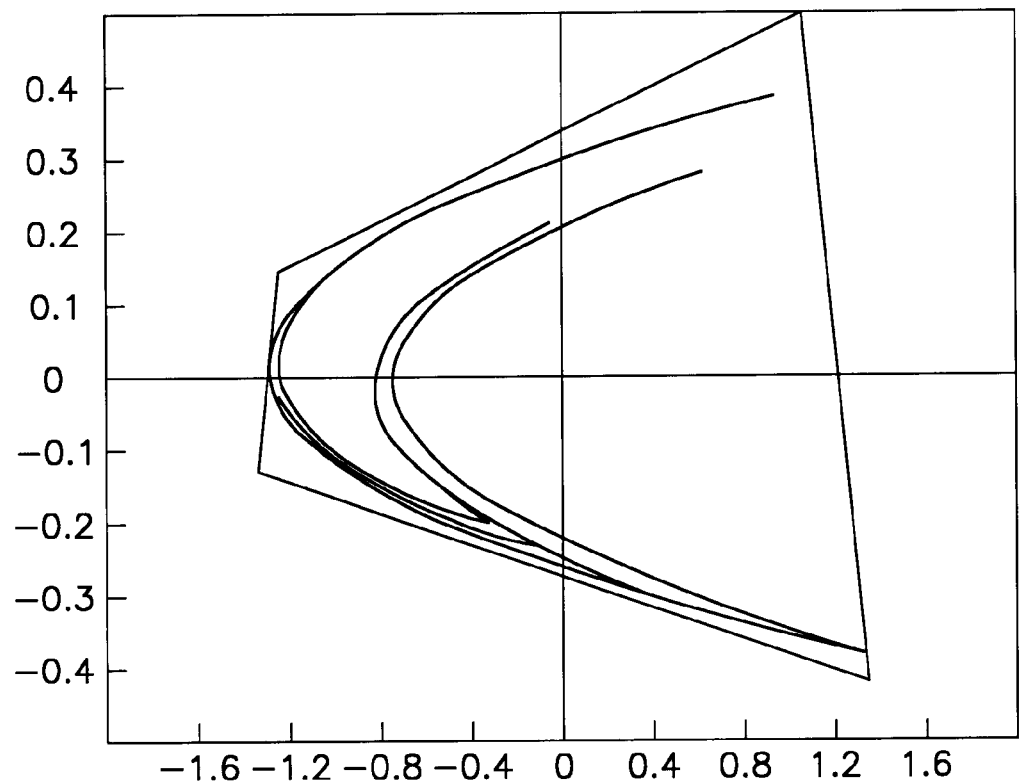
FIG. 8 is a plot of a mirrored Henon attractor.
Figure 9:
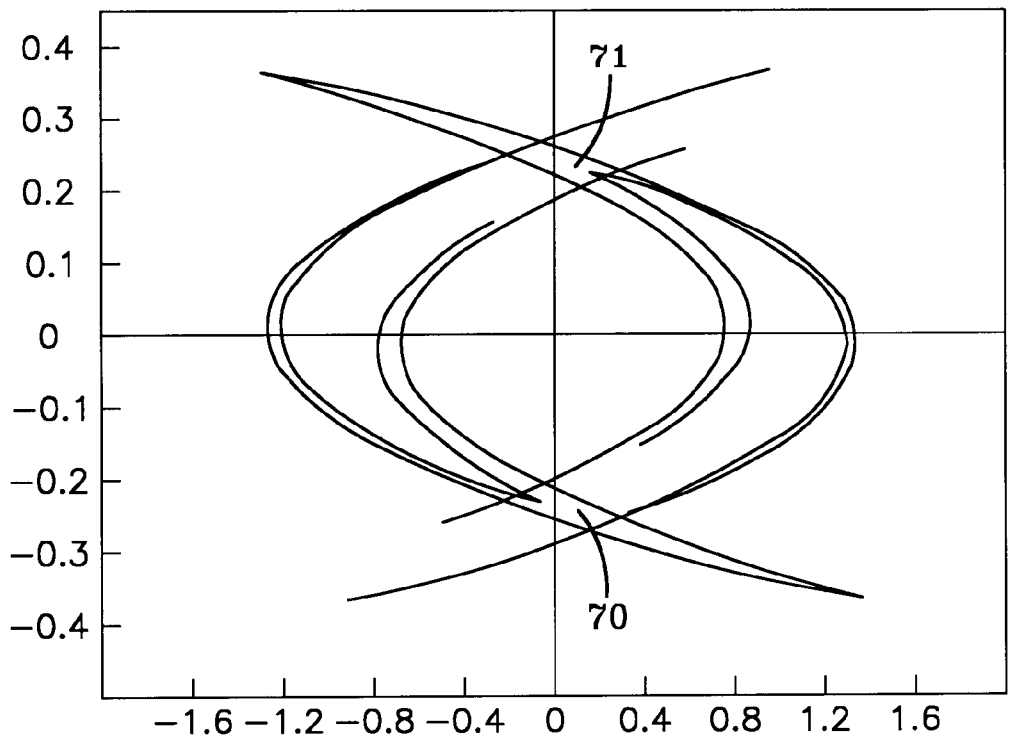
FIG. 9 is a plot of the superposition of the attractors of FIGS. 7 and 8.

The attractor formed by these equations is shown in FIG. 8, along with the corresponding basin of attraction. FIG. 9 shows the superposition of the two versions of the strange attractor (FIGS. 7 and 8) and highlights the identical ranges of values for both the Henon and mirrored Henon systems. The complete overlap of value ranges is indicative of the fact that there is not a one-to-one correspondence between a transmit value or a range of transmit values and digital message value, as exists for most other communications systems. This feature yields security for the communications scheme because the observation of a received value or range of values does not reveal in a direct manner which logical data state has been sent. The sequence of received values in a data bit must be processed and the attractor from which the sequence was generated found in order to determine the logical data state of the bit being received. There are areas where the two attractors intersect each other 70 and 71, and it will be difficult to distinguish between the Henon or mirrored Henon chaotic dynamics in these regions. In addition, there are precise points of intersection for which the correct decision cannot be guaranteed even in the absence of noise.

Turning back to FIG. 5, the next step is to model the Henon strange attractor 53. The Henon strange attractor 53 may be modeled with four parabolas to achieve a fairly accurate representation of the structure, and the plots are shown in FIGS. 10a through 10d. Image tools were used again to plot the attractor and parabolas on the same image window to evaluate the match of a given parabola to the appropriate attractor section. The Henon attractor was broken into a sections according to a large (major) crescent pair, with a smaller (minor) crescent pair contained inside the major section. These four primary features were deemed to model the attractor well, and so four parabolas were found. The parabola equations and valid y-values are listed below in Table 1 for each of the plots of FIGS. 10a through d.

TABLE 1

| Parabola | Ymin | Ymax | Equation | |
|---|---|---|---|---|
| Henon | | | | |
| 1 | −0.2846 | 0.3659 | $\tilde{x}_{h1} = -15.15(y - 0.014)^2 + 0.710$ | (9) |
| 2 | −0.1911 | 0.2215 | $\tilde{x}_{h2} = -14.75(y - 0.018)^2 + 0.800$ | (10) |
| 3 | −0.2154 | 0.2378 | $\tilde{x}_{h3} = -16.60(y + 0.014)^2 + 1.245$ | (11) |
| 4 | −0.3862 | 0.3780 | $\tilde{x}_{h4} = -16.05(y + 0.013)^2 + 1.280$ | (12) |
| Mirrored Henon | | | | |
| 1 | −0.3659 | 0.2846 | $\tilde{x}_{m1} = 15.15(y + 0.014)^2 - 0.710$ | (13) |
| 2 | −0.2215 | 0.1911 | $\tilde{x}_{m2} = 14.75(y + 0.018)^2 - 0.800$ | (14) |
| 3 | −0.2378 | 0.2154 | $\tilde{x}_{m3} = 16.60(y - 0.014)^2 - 1.245$ | (15) |
| 4 | −0.3780 | 0.3862 | $\tilde{x}_{m4} = 16.05(y - 0.013)^2 - 1.280$ | (16) |

To quantify the closeness of the parabolic model to the empirical attractor, a time sequence of Heron (x,y) values was generated and the y-values used as input to the four parabola equations. This created four corresponding x-values for each Henon x-value, and the closest parabola was chosen for each Henon point. The resulting set of errors was obtained by subtraction of only the x-values for each parabola (because the Henon y-values were used in parabola equations), and the mean-square-error (mse) was calculated for each parabola fit. Increasingly longer time sequences were used until the results stabilized. A 500,000 point time sequence generated the results shown in Table 2, which illustrates the excellent quality of fit between the empirically determined attractors and their parabolic section models.

TABLE 2

| | parabola 1 | parabola 2 | parabola 3 | parabola 4 |
|---|---|---|---|---|
| mse | 0.00018 | 0.00046 | 0.00047 | 0.00017 |

Turning back to FIG. 5, the next step in modeling the chaotic attractor 50 is to determine the parabolic regions of validity 54. The regions of validity for the four parabolas may be determined by the limits of the major (large pair of crescents) and minor (small pair of crescents) sections on the attractor. These regions are shown in FIGS. 11a and 11b, where FIG. 11a shows the Henon attractor and FIG. 11b shows the four modeling parabolas.

Figure 11A:
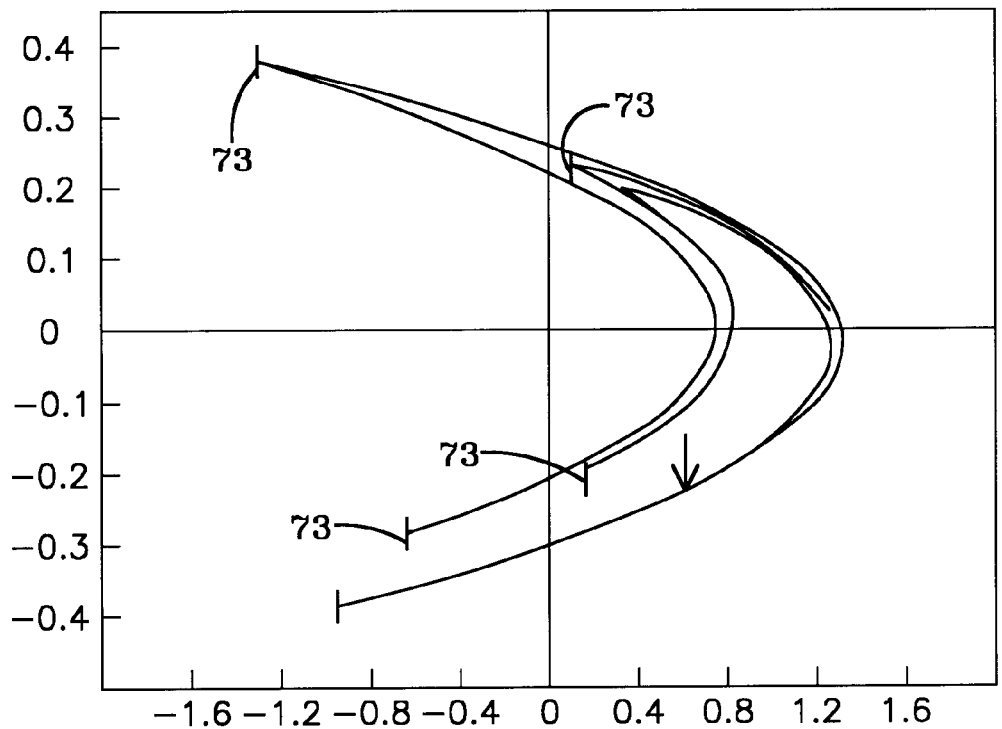
FIG. 11a is a plot of the regions of validity for the Henon attractors of FIGS. 10a through 10d.
Figure 11B:
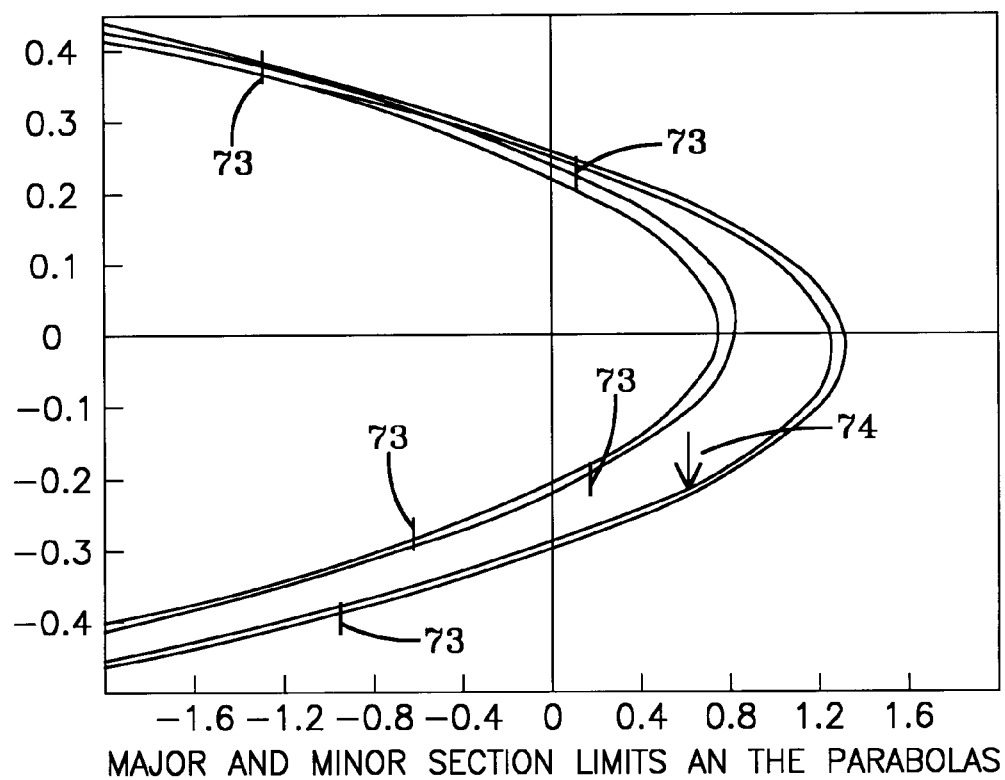
FIG. 11b is a plot of the regions of validity of the parabolas of FIGS. 10a through 10d.

Referring to FIG. 11a, the vertical dash marks 73 delineate the limits of the major and minor sections on the attractor. These limit marks 73 are transposed directly onto the parabolas in FIG. 11b, identifying almost all termination points on the parabolic regions of validity. There is, however, an arrow 74 in the vicinity of point (0.6,−0.22). This arrow 74 marks the limit of the parabola 3 region of validity, because this area of the attractor is about equidistant between parabolas 3 and 4, and the model transitions to parabola 4 at this point.

Figure 12A:
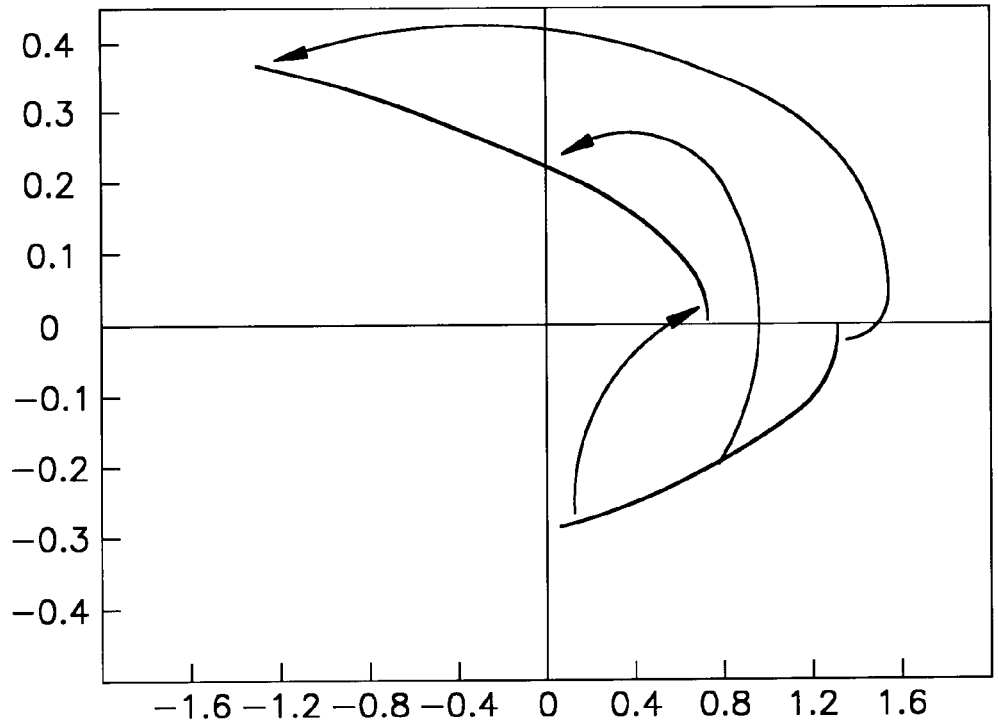
FIGS. 12a and 12b are plots of examples of parabolas transposed through Henon equations.
Figure 12B:
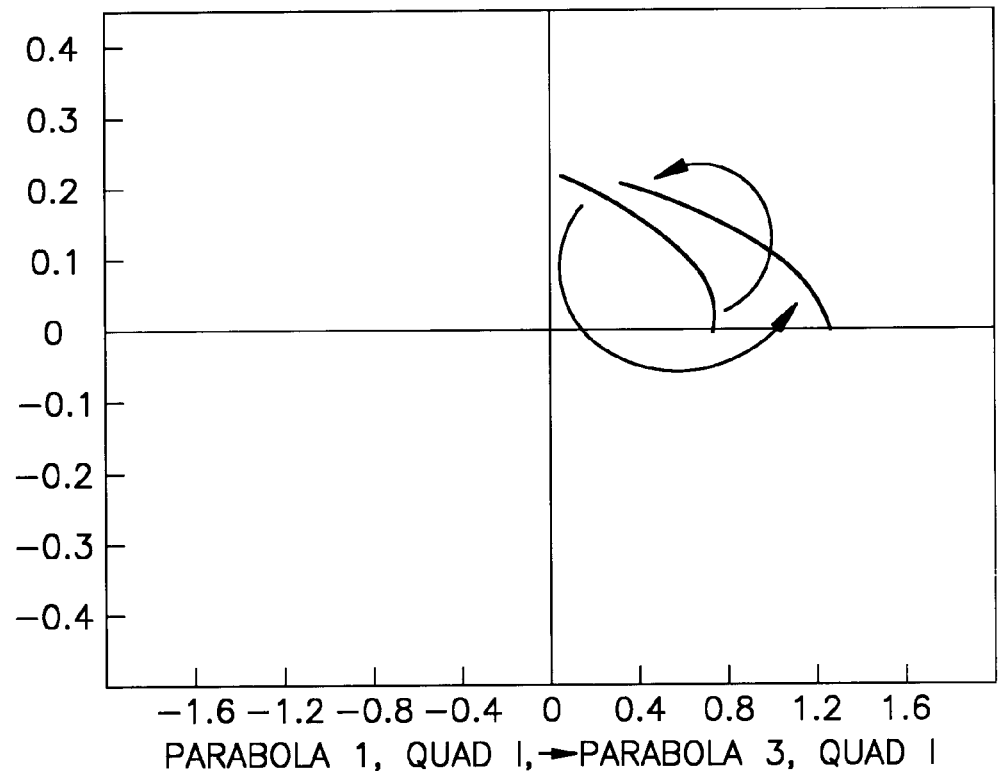

Turning back to FIG. 5, the next step in modeling the chaotic attractor 50 is to determine the chaotic dynamics associated with the various parabolic regions 55. Each of the model parabolas was broken into sections according to quadrant of the Cartesian coordinate system and traced through an iteration of the Henon system equations to determine which parabolic sections they became after a chaotic iteration. Examples are shown in FIGS. 12a and 12b. Each final receiver decision of the current transmit value is mapped by a minimum Euclidean distance metric onto the closest attractor section via the parabolic model equations. Assuming an accurate decision, knowledge of the current parabolic section and its transposition through the system equations can be used to identify the range of valid received values on the next iterate. This information is embedded in other areas of the receiver calculations, and so these tracings are no longer explicitly used. However, while determining the chaotic dynamics associated with the various parabolic regions, a fixed point on the Henon attractor was identified.

Figure 13:
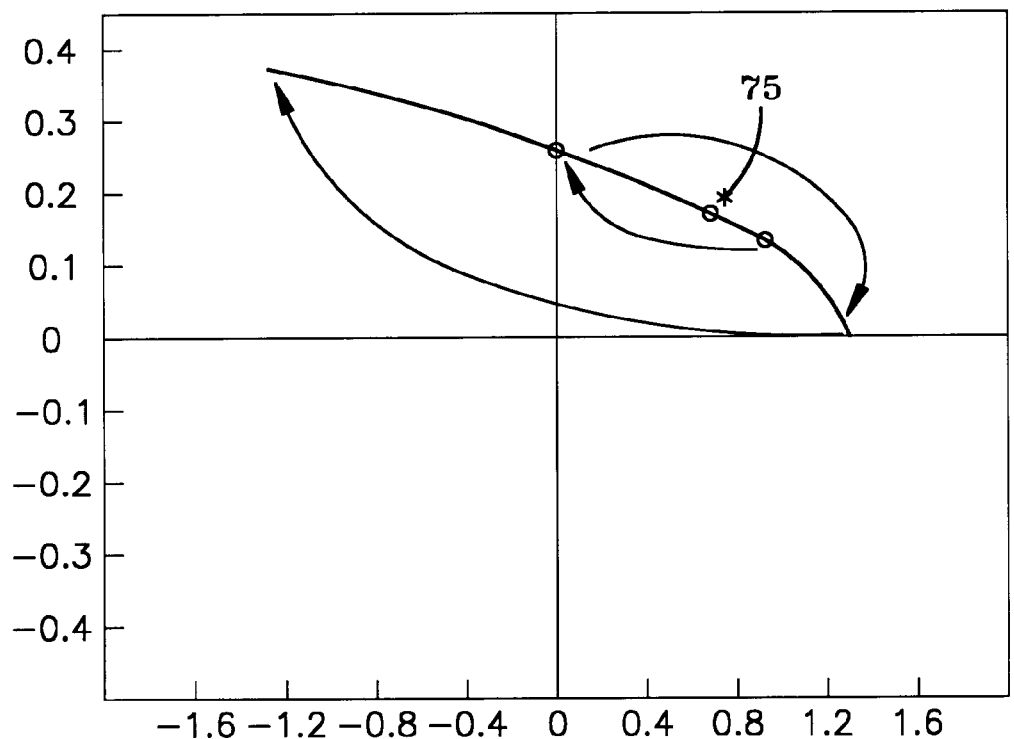
FIG. 13 is a plot of parabolic transposition through the Henon map highlighting a fixed point
Figure 10A:
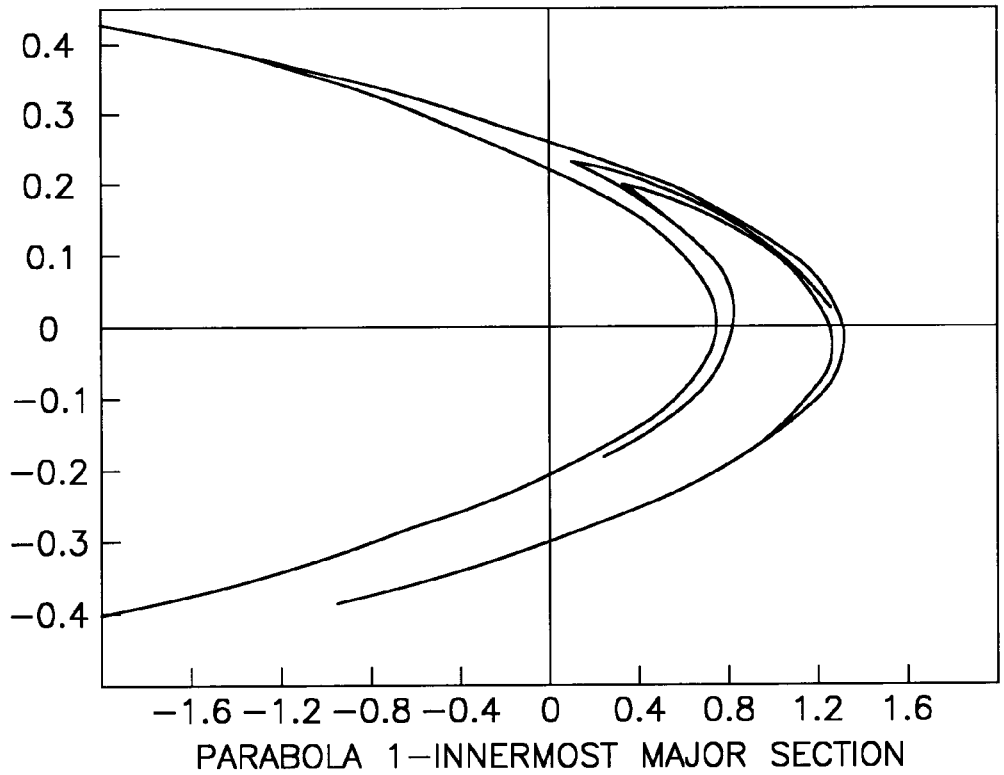
FIGS. 10a through 10d are plots of parabolas modeling the Henon attractor.
Figure 10B:
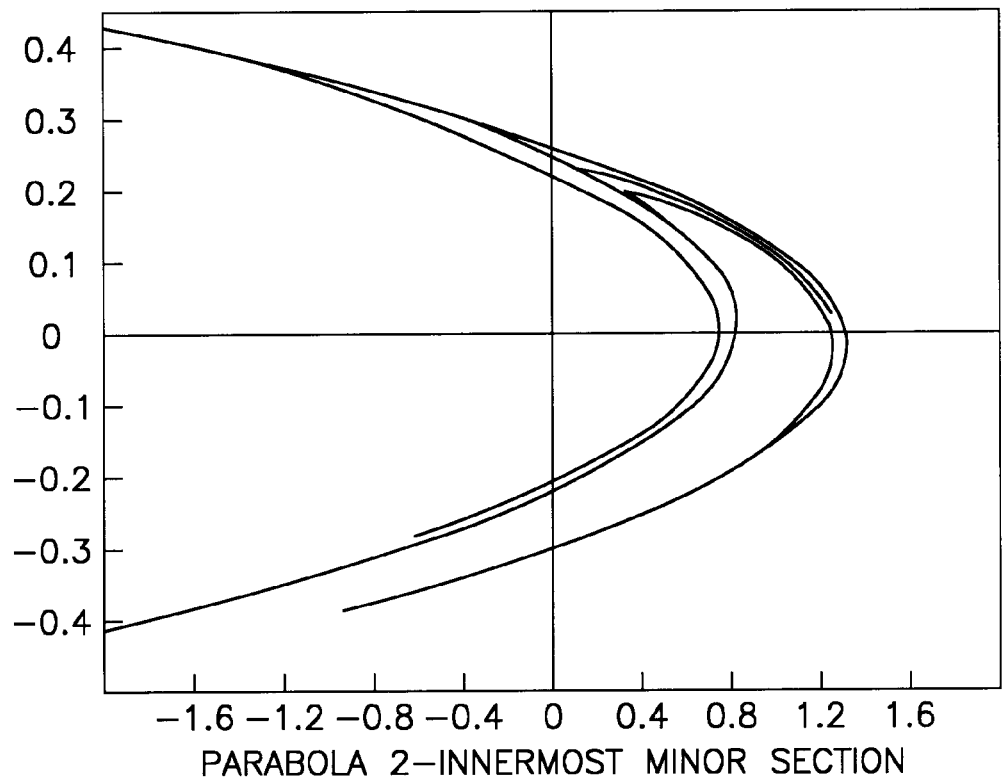
Figure 10C:
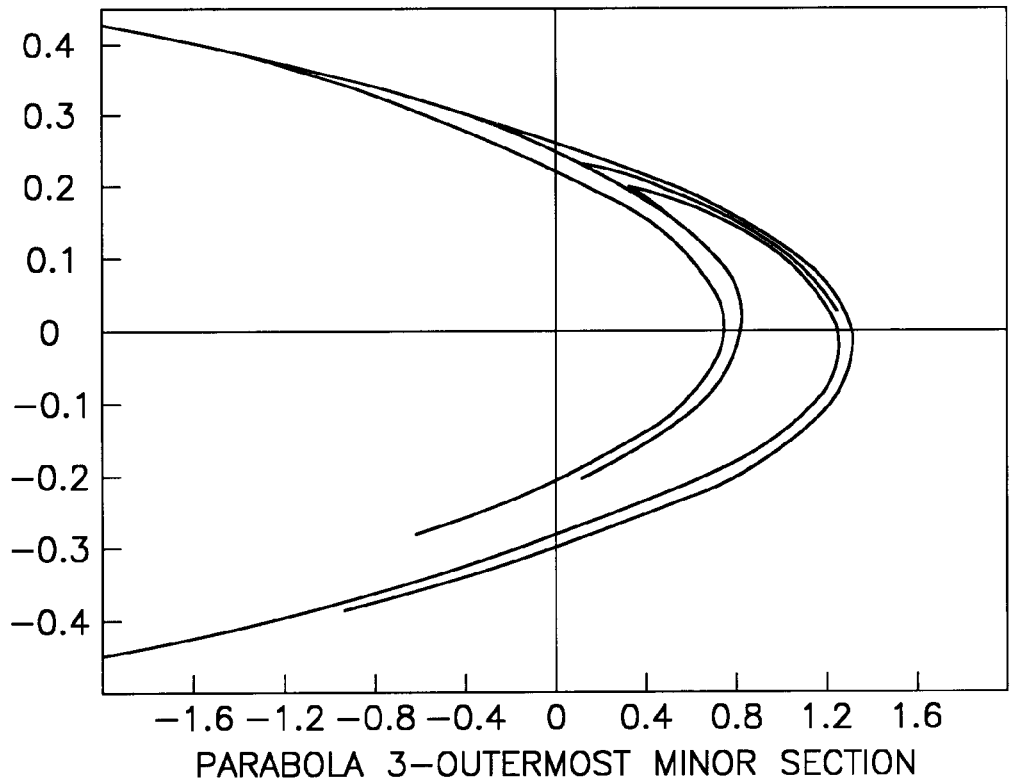
Figure 10D:
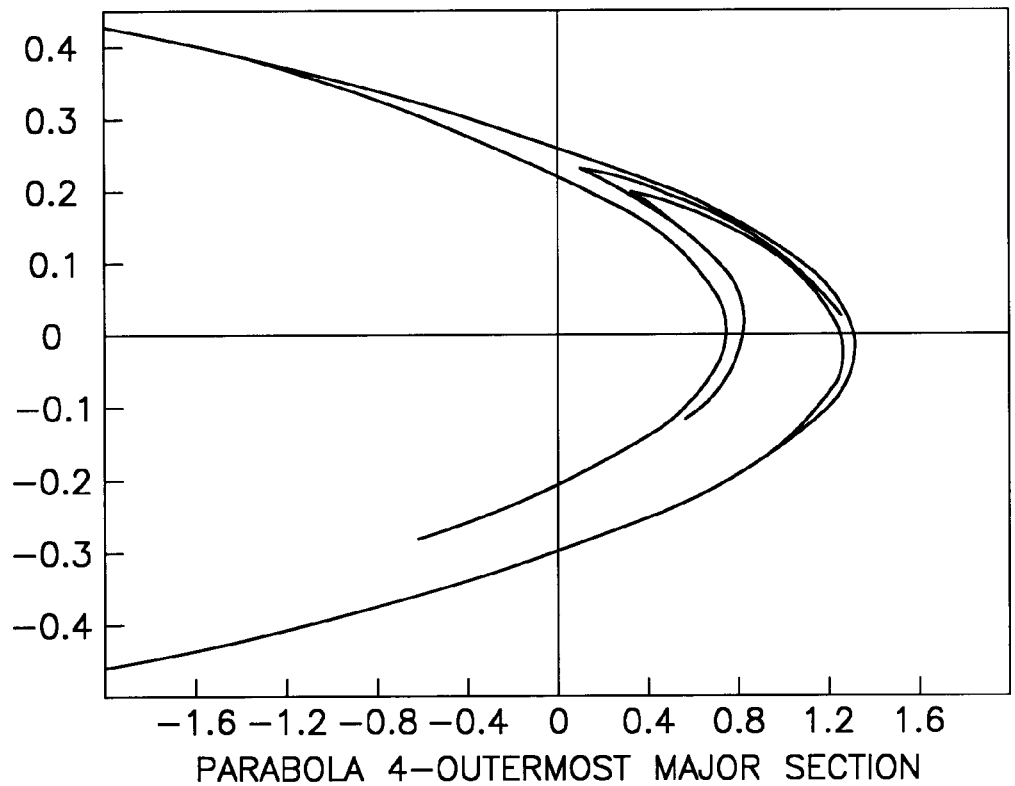

Turning back to FIG. 5, the last step in modeling the chaotic attractor 50 is to determine the Henon fixed point 56. Tracing the parabolic sections through the Henon map uncovered a repelling fixed point 75 in the Henon attractor which is shown in FIG. 13. A fixed point on a chaotic attractor is one that repeats itself through chaotic iterations ad infinitum, i.e. it maps exactly onto itself. A stable or attractive fixed point is one toward which a neighborhood around the fixed moves under iteration of the chaotic equations, so chaotic iterates on the neighborhood decrease the distance from the fixed point. An unstable or repelling fixed point 75 is one for which the distance between itself and any point in a surrounding neighborhood increases through iteration of the chaotic system. Within the resolution of MATLAB, the Henon fixed point is (0.63135447708950, 0.18940634312685). This point has been found to the $14^{th}$ decimal place. The first iterate changes the x-value by one digit in the $14^{th}$ decimal place, with the y-value unchanged. After 45 iterations of the Henon equations, the result is still within 2% of the starting values.

The chaotic attractor has been empirically determined and modeled as shown in FIG. 5. The next step in the determination of a priori information for proper receiver design is to find, and possibly model the chaotic transmit sequence probability density function. The transmit sequence is chosen between the Henon and mirrored Henon free-running maps by the logical value of the data, with a logical 0 choosing the mirrored Henon value and a logical 1 choosing the Henon value for this investigation. A typical digital data stream contains about equal occurrences of zeros and ones, so the transmit data sequence was modeled as a random sequence of zeros and ones with equal probability of occurrence. The PDFs for the Henon, mirrored Henon, and transmit sequences were found empirically using multimillion iterate data runs. All three PDFs were modeled, but the transmit PDF is the only used in the receiver estimation engine for this design.

Starting from any given initial point within the appropriate basin of attraction, the first 100 or so iterates were ignored as transient while the chaotic trajectory moved onto the attractor. A time series was then recorded for 2,000,000 iterates for the Henon and mirrored Henon systems, and 4,000,000 iterates for the transmit sequence.

It was desirable to define the range of values according to the anticipated values for the received data sequence with noise contamination. This range of values was based on a worst-case signal-to-noise ratio (SNR) of 0 dB, at which point the noise power and signal power are equal. It is generally difficult to work with a higher noise power than signal power, and most techniques approach a 0.5 BER in these cases. It was decided to use 4096 data bins to perform the various PDF calculations and the subsequent receiver processing on all of the PDFs so found.

As discussed below in more detail concerning the receiver processing, the received data PDF is the convolution of the transmit PDF and the PDF of the additive noise in the channel. In the general case of a received PDF without closed form representation, the FFT-based fast convolution technique can be used to find the received PDF for any SNR value and any combination of transmit and noise PDF waveforms. It is therefore important to define the bin range with a sufficient region of insignificant values to make the aliasing contamination of the desired linear convolution result caused by the inherent circular convolutional characteristic of the FFT-based method negligible. In addition, the greatest computational efficiency of the FFT is realized when its input data length is a power of 2. Zero-padding can be used to address the circular convolution concern. However, the increased lengths of the FFT calculations load down the computer system resources if 4096 bins are spread over a smaller range of received values such that zero padding is required, and the calculation fidelity decreases if fewer bins are used over the range of significant values. A range of [−5.12, 5.12] with 4096 bins was used, yielding a bin width of $$1/400,$$

or 0.0025, and a bin density of $$400\, bins/UnitRange.$$

To empirically find the many PDFs in this investigation, the MATLAB histogram function was used for each PDF calculation to get the number of occurrences in the time series that fell into the range of numbers for each data bin.

Letting b=bin index
B=number of data bins
K=number of iterates in the time series
$_b$n=number of hits in data bin b
$_b$r=relative number of occurrences in data bin b
w=bin width, which is constant for all bins
p=continuous probability density function
$_b$p=PDF value of data bin b (quantized probability density function)
P=probability $$_br = {_b}n/K \qquad (17)$$

where $$\sum_{b=1}^{B} {_b}n = K \qquad (18)$$

and $_b$n is found easily by using MATLAB's histogram function.

The fundamental definition of PDF requires that $$P_\infty = \int_{-\infty}^{\infty} (p(x))dx = 1. \qquad (19)$$

For the present formulation, this translates into the requirement $$\sum_{b=1}^{B} {_b}pw = 1. \qquad (20)$$

The PDF can be found from the relative number of occurrences as follows:

$$\sum_{b=1}^{B} {_b}r = \sum_{b=1}^{B} {_b}n/K = K/K = 1 \qquad (21)$$

$$\sum_{b=1}^{B} {_b}pw = w\sum_{b=1}^{B} {_b}p = \sum_{b=1}^{B} {_b}r \qquad (22)$$

$$_bp = {_b}r/w. \qquad (23)$$

Figure 14:
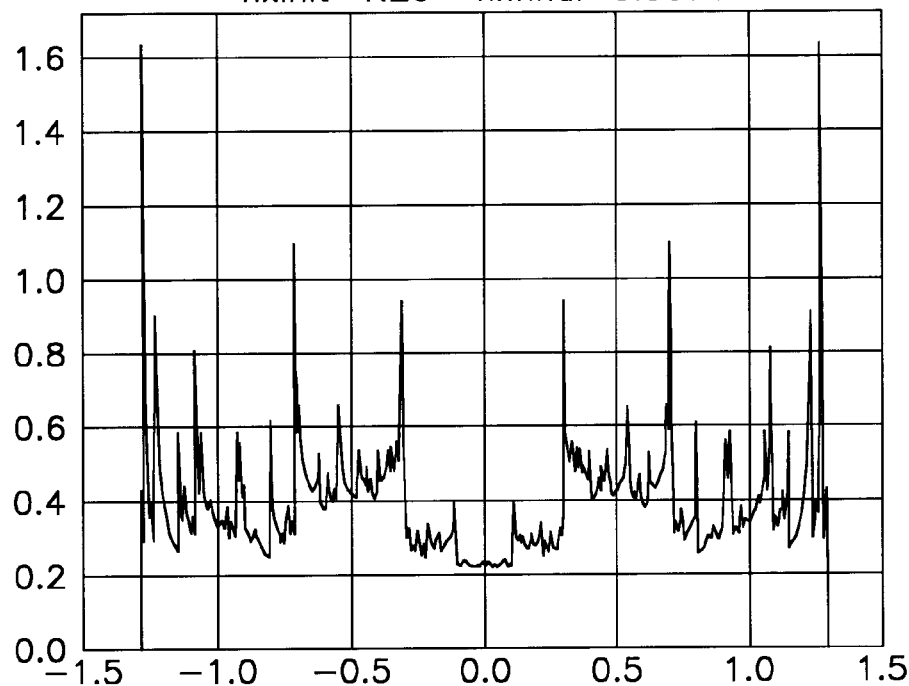
FIG. 14 is a plot of the transmit sequence empirical PDF for a data run of 4,000,000 iterates.

Because the logical 0 and 1 values of a typical data sequence each have a probability of occurrence of ½, the transmit sequence of the transmit probability density function is modeled as an arbitrary choice between the Henon and mirrored Henon time series for each data bit duration. Data runs of 4,000,000 iterates were taken to empirically construct a smooth transmit PDF as shown in FIG. 14. This transmit PDF can be found from the Henon and mirrored Henon PDFs via multiplying each by its corresponding probability of occurrence (½ for both in this case) and adding them together. Actually, all PDFs can be generated from a single Henon or mirrored Henon PDF. The transmit PDF was modeled as a DC level plus a summation of Gaussian functions. There is a choice as to window only the DC level and let the Gaussian functions remain infinite, or to set up the DC level and Gaussian functions first and window the entire PDF model. In either case, the window must be defined from observations of the empirical PDF trace coupled with the bin range and bin width choices. The maximum positive bin center value for which there is a nonzero transmit PDF value is 1.2841, and the bin limits are [1.2828, 1.2854]. Since the transmit PDF is symmetrical, the corresponding negative bin limits are [−1.2828, −1.2854]. The window is, therefore, defined as $$W_{dc}(x)=U(x-(-H_{max}))-U(x-H_{max})=U(x-(-1.2854))-U(x-1.2854) \qquad (24)$$

where $$U(x_0) = \begin{Bmatrix} 0 \Rightarrow x < x_0 \\ 0 \Rightarrow x \geq x_0 \end{Bmatrix} = \text{the unit step function}$$

and $H_{max}$=1.2854 is the maximum Henon magnitude for the specified bin structure The differences between the two windowing methods are very small in terms of establishing the PDF trace model. It turns out that windowing both the DC level and the Gaussian functions requires the DC level (0.2160) to be greater by 0.0002 than the method of windowing only the DC value (0.2158). The small degree of difference is because the Gaussian functions used to model the transmit PDF have very little area outside the valid DC region. The choice between windowing methods cannot be made on considerations stemming from the construction of a PDF model, but SNR estimation calculations involving the transmit PDF in the receiver influenced the decision to window only the DC component.

First the DC level and four Gaussian functions structure the general trend with MSE (mean square error)=0.0057. Some coarse details are added in with 18 more Gaussian functions (22 total) with MSE=0.0031, and some detailed fine structure consisting of 16 Gaussian functions (38 total) and MSE=0.0014. The final attractor approximation has the final details added in using 6 Gaussian functions (44 total) that fill in some gaps and have a final MSE=0.0012.

The final tally is a windowed DC level with 44 weighted Gaussian functions to construct the transmit PDF model. Because of the symmetry of the structure, only 22 Gaussian functions (mean and variance) had to be defined, along with the corresponding 22 weighting factors.

Figure 15:
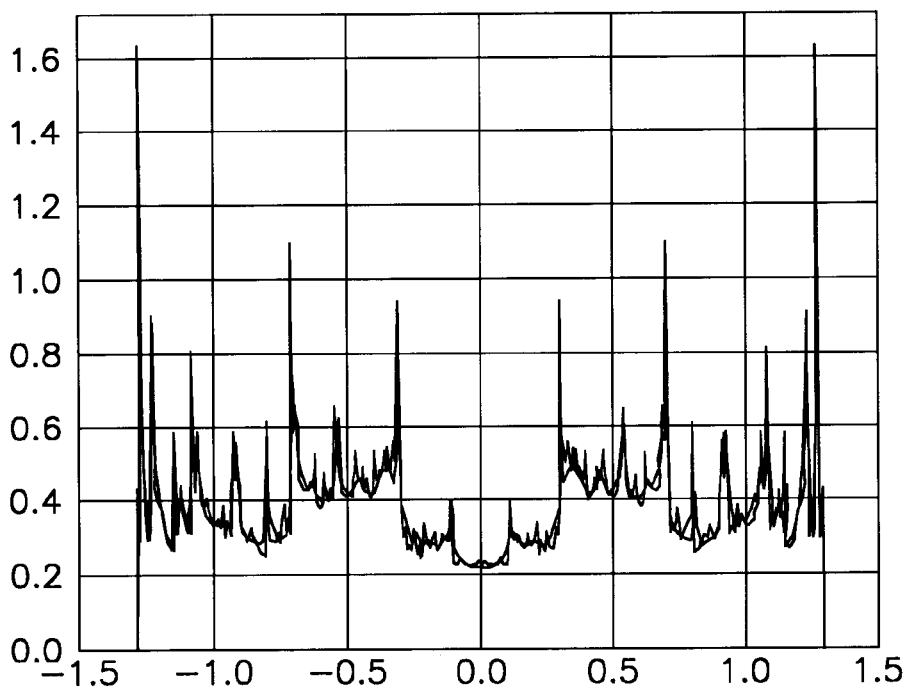
FIG. 15 is a plot of the transmit PDF of FIG. 14 overlaid on the PDF model.

The empirical attractor of the transmit PDF is overlaid on the model as shown in FIG. 15. The close match with the distinguishing features of the true PDF can be readily seen. A metric against which to measure the match between the empirical PDF and the approximation is the mean squared error (MSE), whose value is 0.0012. The approximation total probability, which is the area under the PDF approximation, is 0.9999. This compares favorably with the theoretical area under a PDF curve, which equals one.

The equation for the transmit PDF approximation model with windowing only for the DC level is $$\tilde{p}_t(x) = cW_{dc}(x) + \sum_{l=1}^{L} \frac{b_l}{\sqrt{2\pi}\,\sigma_l} e^{-\left(\frac{x-m_l}{\sqrt{2}\,\sigma_l}\right)^2} \tag{25}$$

where c=DC value
l=Gaussian functions' index
L=total number of Gaussian functions
$b_l$=weights of the Gaussian functions
$m_l$=mean values of the Gaussian functions
$\sigma_l^2$=variances of the Gaussian functions
and the values for the approximation depicted here are listed below, with a one-to-one correspondence between the values occupying identical positions in the vectors b, m, and σ
c=0.2158
L=44

The power in the encoded chaotic transmit sequence needs to be determined. This can be done using the power found empirically in the Henon and mirrored Henon time signals. It should be noted that the Henon and mirrored Henon PDFs were skewed positive and negative, respectively, indicating correspondingly positive and negative mean values for the systems. The mean and variance for the systems have been estimated from million-iterate data runs to be

| Henon | Mirrored Henon |
|---|---|
| $\bar{x}_h^{\;a} = 0.2558$ | $\bar{x}_m^{\;a} = -0.2558$ |
| $\sigma_h^{\;a2} = 0.5210$ | $\sigma_m^{\;a2} = 0.5210$ |

As shown in FIG. 15, the transmit PDF is seen to be symmetrical about zero, however, because of the random selection between the Henon and mirrored Henon time sequences according to the data bits. Since the Henon and mirrored Henon values ranges have complete overlap, the range of transmit values is the same as the range in either individual system. In terms of the original systems, $$\bar{x}_h = \frac{1}{K}\sum_{k=1}^{K} x_h[k] \tag{26}$$

$$\sigma_h^2 = \frac{1}{K}\sum_{k=1}^{K}(x_h[k]-\bar{x}_h)^2 = \frac{1}{K}\sum_{k=1}^{K}\bar{x}_h^2[k] - \bar{x}_m^2 = \overline{x_h^2} - \bar{x}_h^2 \tag{27}$$

$$\bar{x}_m = \frac{1}{K}\sum_{k=1}^{K} x_m[k] \tag{28}$$

$$\sigma_m^2 = \frac{1}{K}\sum_{k=1}^{K}(x_m[k]-\bar{x}_m)^2 = \frac{1}{K}\sum_{k=1}^{K}x_m^2[k] - \bar{x}_m^2 = \overline{x_m^2} - \bar{x}_m^2. \tag{29}$$

Turning back to FIG. 4, the encoded chaotic transmit sequence is now generated 44, modeled as a random selection between the Henon and mirrored Henon systems 43. For the transmit sequence, $$P_h(x_h)=P_r(x_h \text{ is sent})\; P_m(x_m)=P_r(x_m \text{ is sent}) \tag{30}$$

```
b =   [0.0036   0.0030   0.0026   0.0098   0.0070   0.0024   0.0045
       0.0040   0.0045   0.0038   0.0010   0.0085   0.0077   0.0069
       0.0099   0.0037   0.0050   0.0030   0.0181   0.0048   0.0318
       0.0770   0.0770   0.0318   0.0048   0.0181   0.0030   0.0050
       0.0037   0.0099   0.0069   0.0077   0.0085   0.0010   0.0038
       0.0045   0.0040   0.0045   0.0024   0.0070   0.0098   0.0026
       0.0030   0.0036]
m =   [-1.2600  -1.1200  -0.2000  -1.2709  -1.2280  -1.1455  -1.0802
      -0.8017  -0.7063  -0.3080  -0.1091  -1.2100  -1.0600  -0.9200
      -0.6900  -0.6400  -0.5400  -0.4515  -0.3400  -0.1300  -1.0000
      -0.5250   0.5250   1.0000   0.1300   0.3400   0.4515   0.5400
       0.6400   0.6900   0.9200   1.0600   1.2100   0.1091   0.3080
       0.7063   0.8017   1.0802   1.1455   1.2280   1.2709   0.2000
       1.1200   1.2600]
σ =   [0.0071   0.0099   0.0255   0.0028   0.0047   0.0028   0.0042
       0.0050   0.0028   0.0028   0.0028   0.0212   0.0170   0.0099
       0.0141   0.0184   0.0090   0.0170   0.0410   0.0283   0.1131
       0.1570   0.1570   0.1131   0.0283   0.0410   0.0170   0.0090
       0.0184   0.0141   0.0099   0.0170   0.0212   0.0028   0.0028
       0.0028   0.0050   0.0042   0.0028   0.0047   0.0028   0.0255
       0.0099   0.0071]
```

$$P_h(x_h) = P_m(x_m) = 0.5 \tag{31}$$

$$x_t = (x_h)(P_h(x_h)) + (x_m)(P_m(x_m)) \tag{32}$$

$$\bar{x}_t = \frac{1}{K}\sum_{k=1}^{K} x_t[k] = P_h(x_h)\left(\frac{1}{K}\sum_{k=1}^{K} x_h[k]\right) + P_m(x_m)\left(\frac{1}{K}\sum_{k=1}^{K} x_m[k]\right) \tag{33}$$

$$\bar{x}_t = \frac{\bar{x}_h + \bar{x}_m}{2} = \frac{0.2558 - 0.2558}{2} = 0 \tag{34}$$

$$\sigma_t^2 = \tag{35}$$

$$\frac{1}{K}\sum_{k=1}^{K} (x_t[k] - 0)^2 = P_h(x_h)\left(\frac{1}{K}\sum_{k=1}^{K} x_h^2[k]\right) + P_m(x_m)\left(\frac{1}{K}\sum_{k=1}^{K} x_m^2[k]\right).$$

Substituting from equations (27) and (29) into (35) yields the transmit power equation $$\sigma_t^2 = P_h(x_h)(\sigma_h^2 + \bar{x}_h^2) + P_m(x_m)(\sigma_m^2 + \bar{x}_m^2) = \frac{(\sigma_h^2 + \bar{x}_h^2) + (\sigma_m^2 + \bar{x}_m^2)}{2}. \tag{36}$$

and entering the empirically determined Henon and mirrored Henon values yields $$\sigma_t^2 = \frac{(0.5210 + 0.2558^2) + (0.5210 + (-0.2558)^2)}{2} = 0.5864. \tag{37}$$

Transmit Sequence $\bar{x}_t = 0$ $\sigma_t^2 = 0.5864$

These values have been proven by statistical analysis of empirical data runs. The transmit power is used to set up the proper lossless non-fading AWGN channel noise power level via an SNR specified as an input to the simulation for the bit error rate (BER) data runs.

Figure 16:
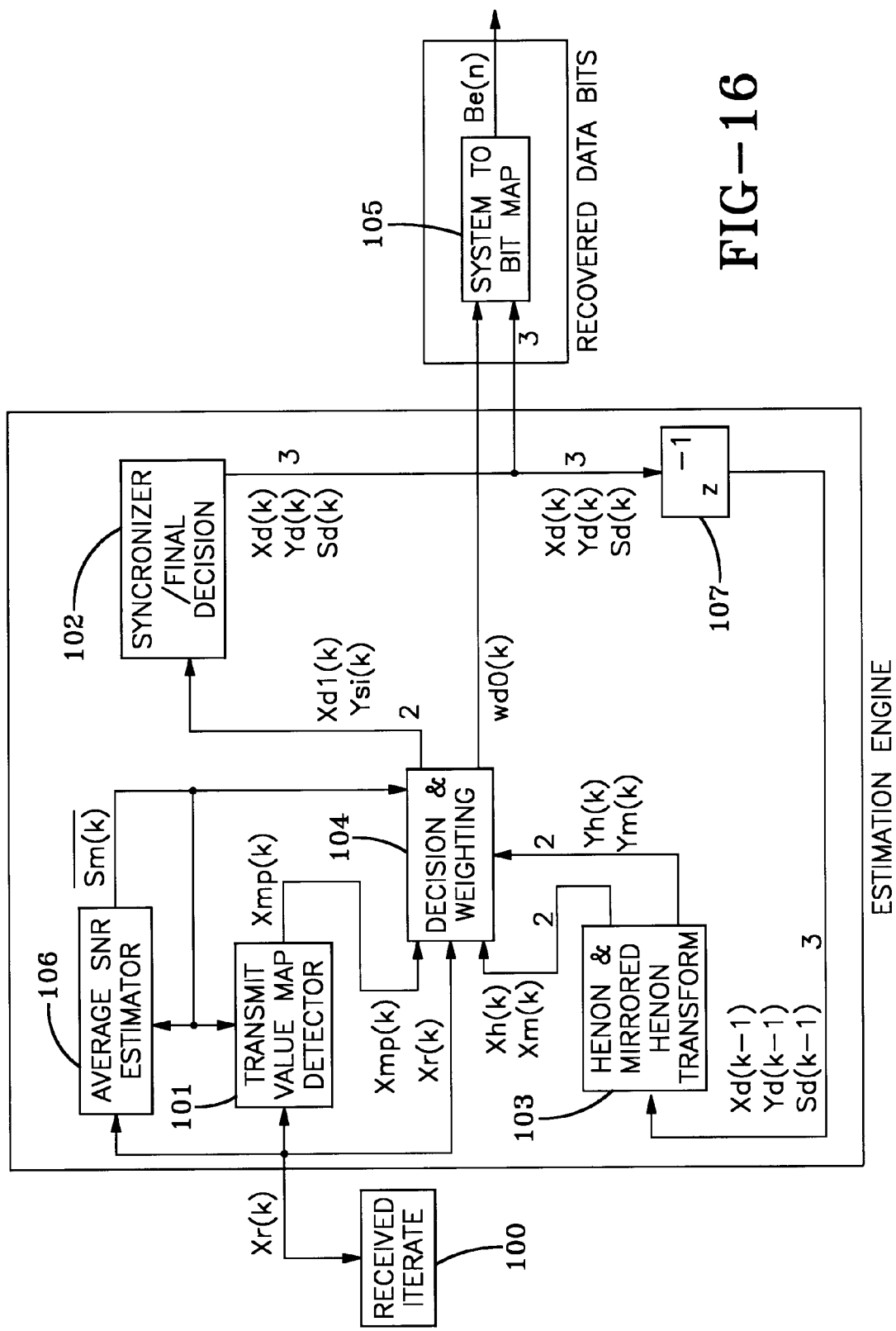
FIG. 16 is a block diagram of the receiver and the system to bit map function.

The general block diagram for the receiver is shown in FIG. 16. When a chaotic transmission is received 100, three estimates are generated for each received iterate 100, an initial decision is calculated from them, and a final decision is formed by mapping the initial decision onto the chaotic attractor. The mapping operation also yields the synchronization estimate. It provides chaotic synchronization without requiring the special characteristics or techniques utilized by other methods, such as stable/unstable chaotic subsystem separation or inverse system methods. At the appropriate times, the individual iterate decisions are combined into a bit decision. A BER is then calculated to evaluate the performance of this method.

The first estimate is the received value 100 itself, called the received iterate. In the absence of noise, it is an accurate indication of the transmitted value. In the presence of additive white Gaussian noise, the received value is a valid estimate of the transmitted iterate because the most likely noise value is 0. The maximum a posteriori (MAP) transmit value 101 function calculates the second estimate for every received iterate and yields the minimal error probabilistic estimate. The Synchronization/Final Decision Generator 102 calculates the third estimate using the receiver final decision of the previous iterate, which is delayed by one iterate 107 and then processed through the Henon and mirrored Henon transform 103 equations. The third estimate provides information on the next possible received values for both chaotic systems given an accurate current decision, which aids the decision process in the presence of noise.

The Decision and Weighting function 104 combines the three estimates into an initial decision through a weighted average whose weights derive from probability calculations on each estimate. It is given the received iterate estimate, the MAP estimate, and two possible feedback estimates—one assuming a correct previous decision and the other assuming an erroneous previous decision. It chooses the feedback estimate closest to the received value and MAP estimates, determines the necessary probability values, and performs the weighted average calculation.

The Decision and Weighting function 104 also generates a discount weight to be used by the System to Bit Map function 105 in combining individual iterate decisions into a bit decision that serves to de-emphasize iterate decisions whose received value is in close proximity to zero. The Henon and mirrored Henon transmit possibilities are the negatives of each other. Transmitted values in the close proximity of zero can appear to have come from the incorrect attractor with very small amounts of noise. The feedback estimate chosen as closest to the MAP and received value estimates can easily be in error, which may then create an erroneous final iterate decision. The quantification of the term "close proximity" is based on the average SNR estimate 106, discounting more severely those received values close enough to zero to have been significantly affected by the noise currently present in the channel, while emphasizing the larger magnitude received values.

The Synchronization and Final Decision Generator 102 is given the initial probabilistic decision and the corresponding y-value from the Henon or mirrored Henon transform. It uses parabola equations that model the Henon and mirrored Henon attractors to generate parabolic sections in the vicinity of the input point and chooses the parabola and corresponding system closest to the input point via a Euclidean distance metric. This process adjusts both the x- and y-values of the receiver initial decision to provide accurate tracking of the chaotic dynamics in the final decision.

Figure 17A:
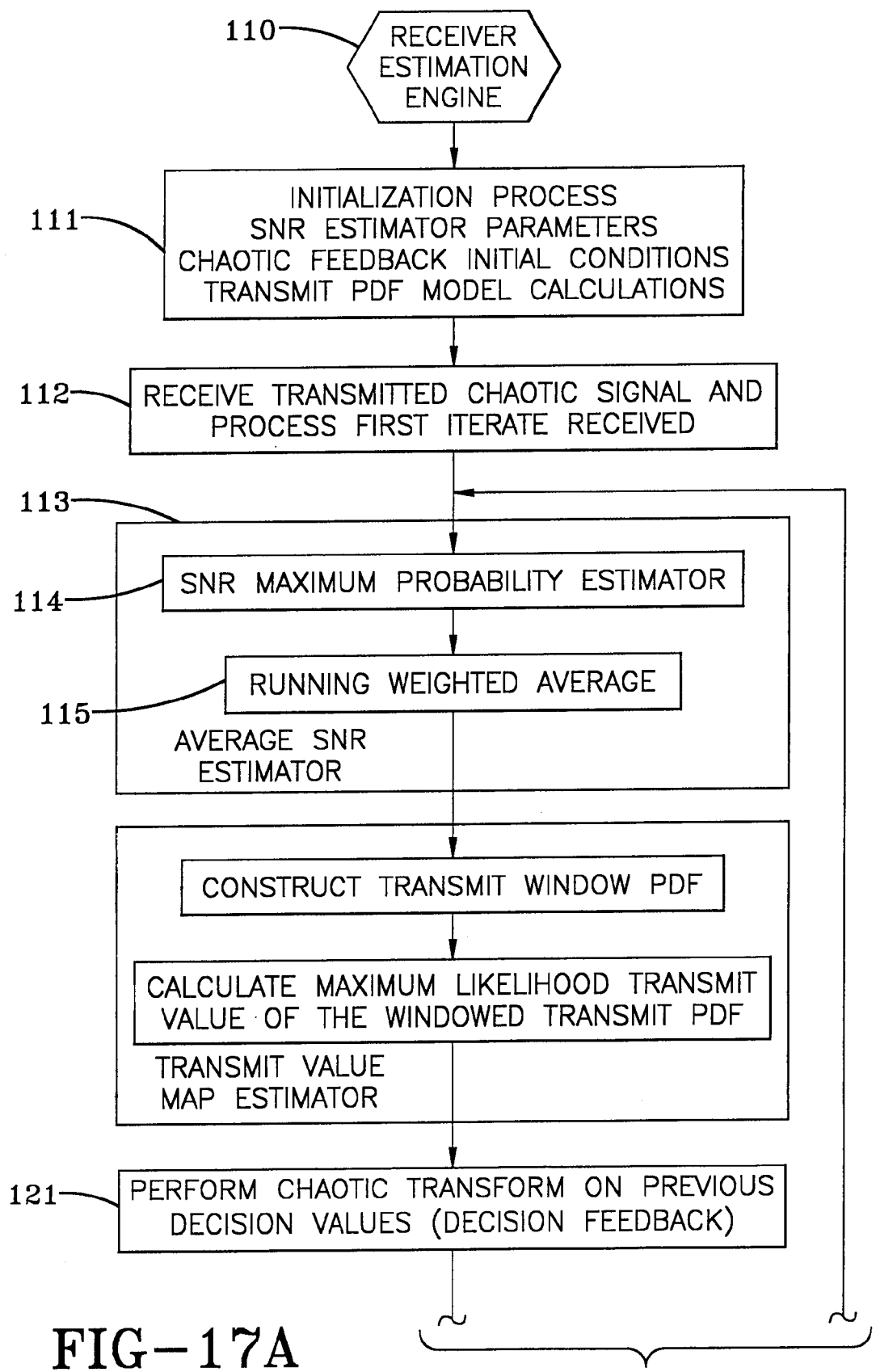
FIG. 17 is a flowchart of the receiver estimation engine process.
Figure 17B:
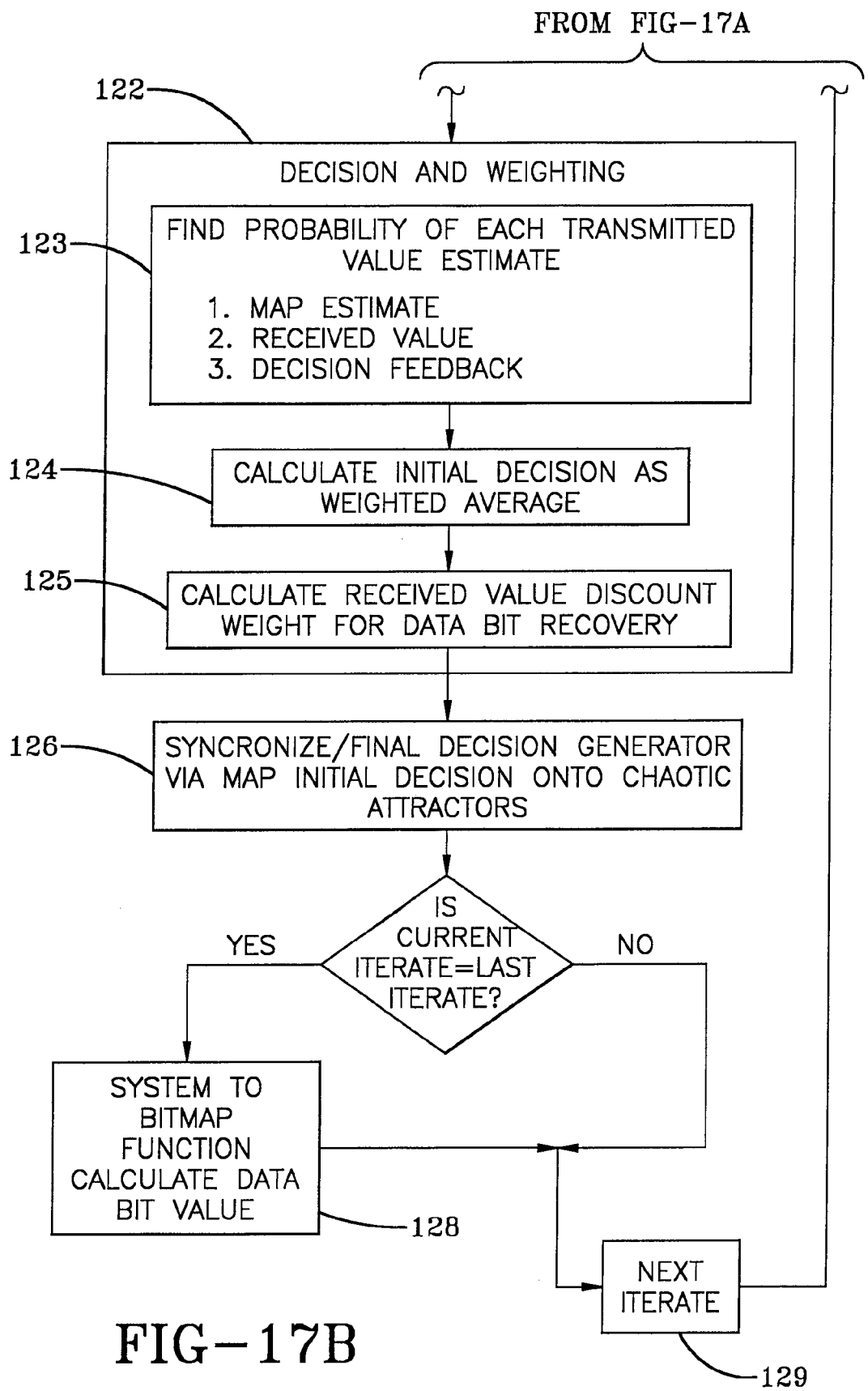

FIG. 17 is a flowchart of the receiver estimation engine process 110. As stated above, the three estimates generated for each received iterate are the received value itself, the MAP estimate, and the decision feedback estimate. The received value is used directly because it equals the transmitted value in the absence of noise and, because the AWGN has zero mean, the expected value of the received value is the transmitted value. The other two estimates must be generated by the receiver estimation engine as shown in FIG. 17. Upon initialization 111, the signal-to-noise (SNR) estimator parameters, chaotic feedback initial conditions, strange attractor model initial conditions (from the a priori receiver design investigation) and transmit PDF model calculations (from the a priori receiver design investigation) are input. The next step is to receive the transmitted chaotic signal and to process the first iterate received 112.

The next step is to estimate the average SNR 113. The MAP estimator requires knowledge of the noise power (or SNR). The SNR or noise power is also used to find receiver probabilities needed in the weighted averaging of the three estimates into an initial decision and, again, as the means for discounting iterate decisions that are too close to zero in the bit decision process. The receiver requires a method for estimating the noise power contained in a chaotic signal contaminated with random noise. The average SNR estimator 113 consists of an SNR maximum probability estimator 114 followed by a running weighted average calculation 115.

Figure 18:
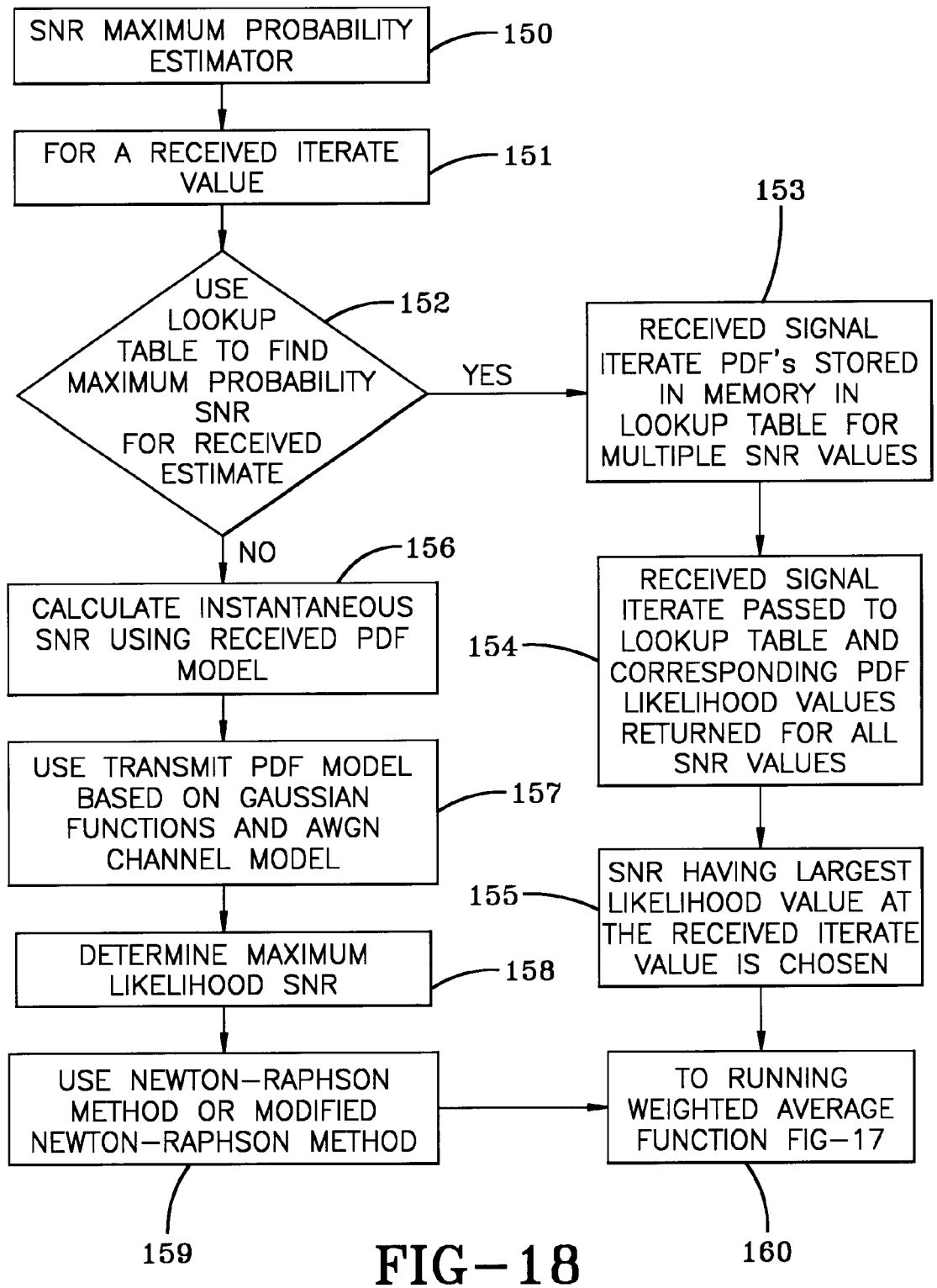
FIG. 18 is a flowchart of the SNR maximum probability estimator.
Figure 19A:
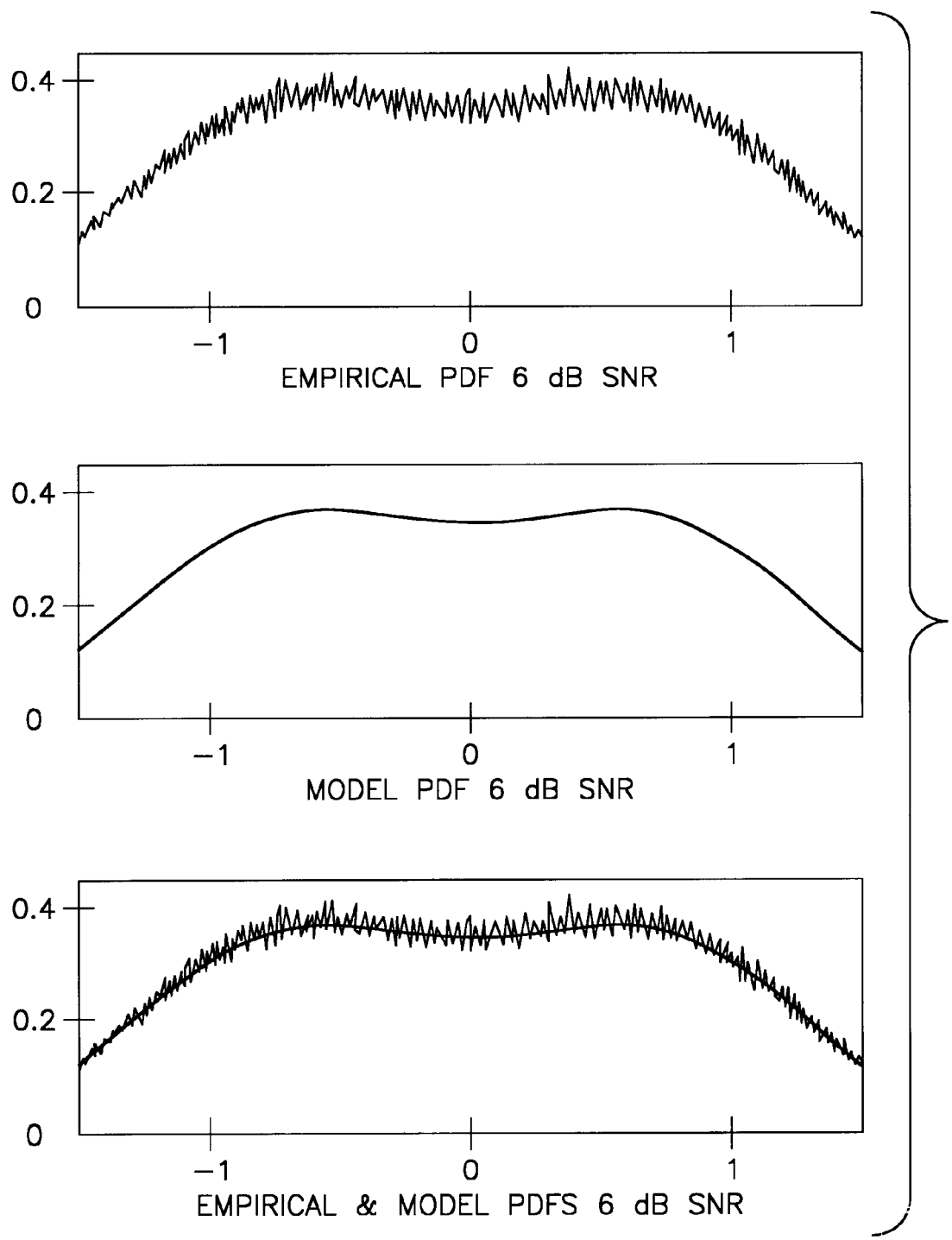
FIG. 19a are plots of the PDF traces for an SNR of 6 dB.
Figure 19B:
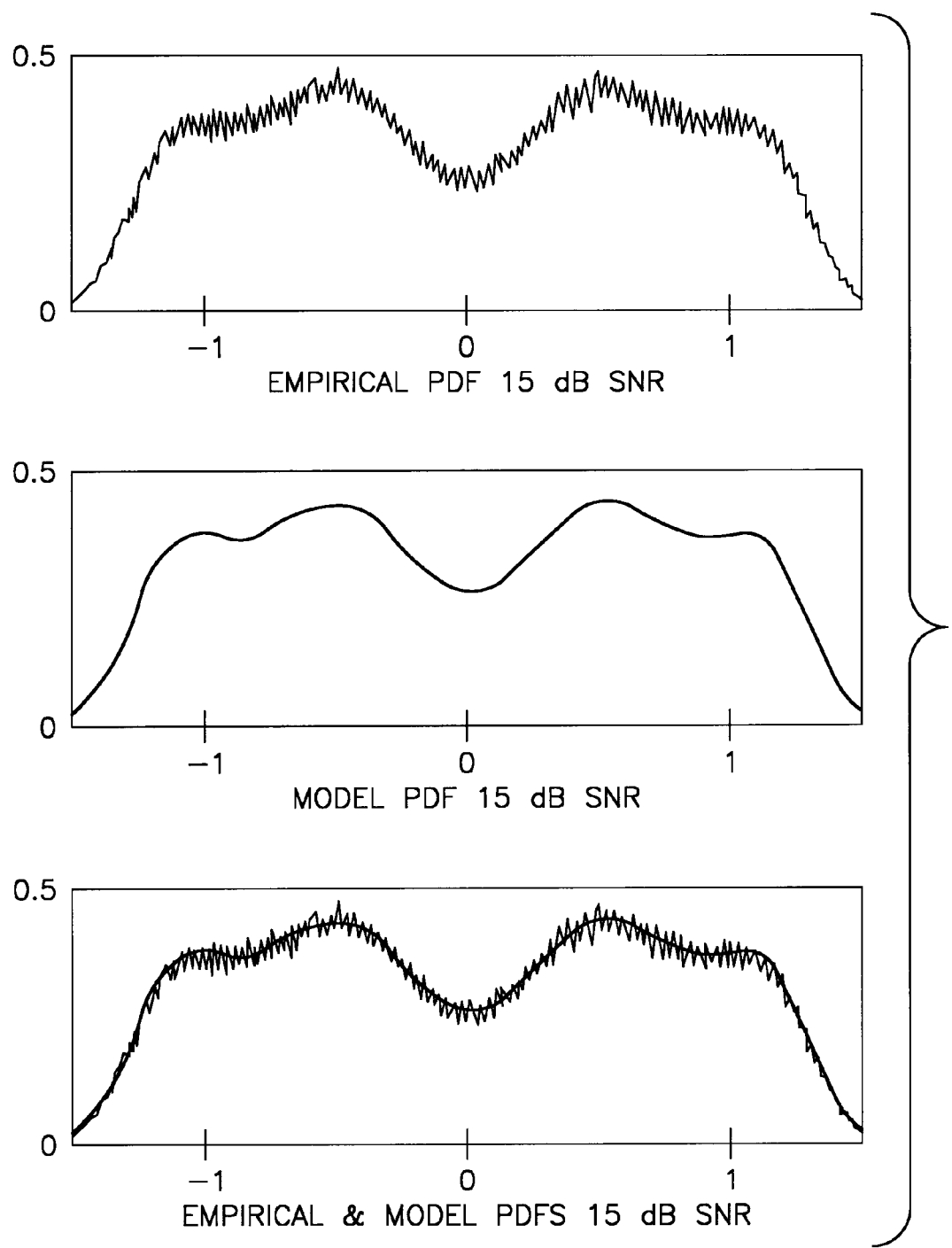
FIG. 19b are plots of the PDF traces for an SNR of 15 dB.
Figure 20A:
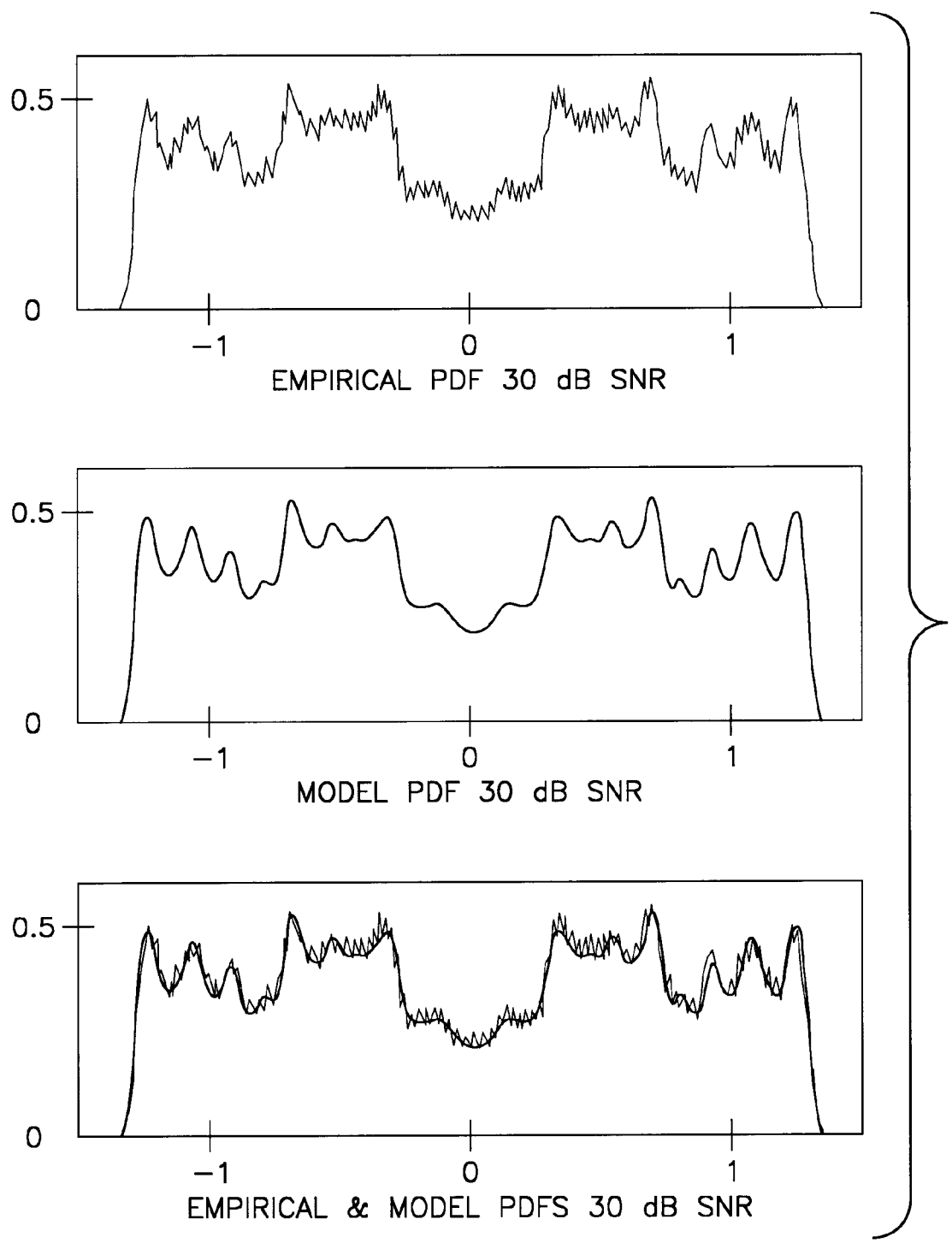
FIG. 20a are plots of the PDF traces for an SNR of 30 dB.
Figure 20B:
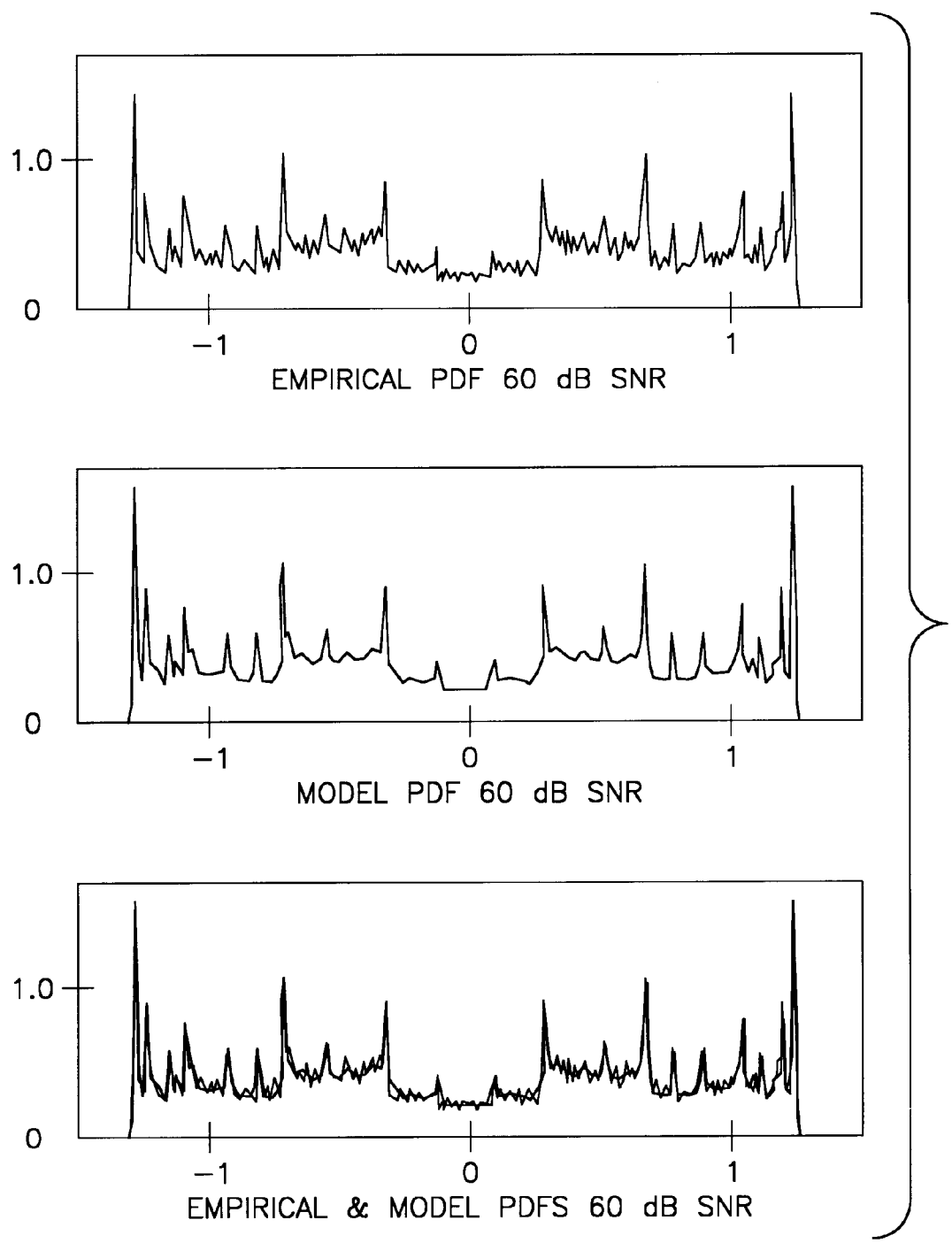
FIG. 20b are plots of the PDF traces for an SNR of 60 dB.

Turning now to FIG. 18, a flowchart is shown of the SNR maximum probability estimator 150 (114 in FIG. 17). The signal transmission is a data sequence comprising N number of iterates where the first iterate represents a first value in the data sequence and the Nth iterate represents a last value in the data sequence. For a received signal iterate value 151, a lookup table can be used to find the maximum probability SNR for a received iterate 152. This involves determining the instantaneous SNR, which can be defined as the instantaneous SNR for which a received PDF trace has the greatest probability of occurrence out of the PDF traces for all SNR values. The lookup table contains received signal PDFs that have been stored in memory 153. The received signal iterate value is passed into the lookup table and the corresponding PDF value is returned 154 for all SNR values. The SNR having the largest PDF value associated with the received value is chosen 155. The individual iterate decisions are then smoothed through a running average calculation 160 and processing continues in FIG. 17.

Alternatively, the instantaneous SNR may be calculated rather than using a lookup table 156. An algorithm is used and is based on the closed-form equations realized for the received PDF. The model chosen for the transmit PDF is based on Gaussian functions with an AWGN channel model 157. The received PDF is the convolution of the transmit PDF with the channel noise PDF 158, and the convolution of a Gaussian function with another Gaussian function is a Gaussian function. This closed-form representation enabled the development of the computational algorithm for the determination of the instantaneous maximum probability SNR.

The transmit PDF model that windows only the DC component and not the Gaussian functions is used. Although both transmit PDF models result in closed-form expressions for the received PDF, the version that windowed all terms had significantly more complicated expressions involving the evaluation of Q-functions in all terms plus exponential functions in most terms. The version that windowed only the DC component had two Q-functions for the windowed DC term, with the transmit PDF Gaussian terms remaining Gaussian in the received PDF.

The calculation of Q-functions is computationally more expensive than the evaluation of Gaussian functions, even when a Q-function approximation formula is used. This additional complexity is easily seen by comparing the general Gaussian equation in equation (38) with the integrated Gaussian structure of the Q-function definition equation (44) and the extra terms preceding the Gaussian function in the Q-function approximation equation (45).

A few terms will be collected from previous sections to continue the discussion. The equation for the transmit PDF approximation model (FIG. 18, 157) is $$\tilde{p}_t(x) = cW_{dc}(x) + \sum_{l=1}^{L} \frac{b_l}{\sqrt{2\pi}\,\sigma_l} e^{-\left(\frac{x-m_l}{\sqrt{2}\,\sigma_l}\right)^2} \tag{25}$$

with $$W_{dc}(x) = U(x-(-H_{max})) - U(x-H_{max}) = U(x-(-1.2854)) - U(x-1.2854) \tag{24}$$

where $$U(x-x_0) = \begin{cases} 0 \Rightarrow x < x_0 \\ 1 \Rightarrow x \geq x_0 \end{cases} = \text{the unit step function}$$

and $H_{max}=1.2854$ is the maximum Henon magnitude for the specified bin structure. The channel noise PDF is modeled as $$p_n(x) = \frac{1}{\sqrt{2\pi}\,\sigma_n} e^{-\left(\frac{x}{\sqrt{2}\,\sigma_n}\right)^2} \tag{38}$$

The received PDF model 154 is found by the convolution of the transmit PDF model with the noise PDF model $$\tilde{p}_r(x) = \tilde{p}_t(x) * p_n(x) \tag{39}$$

$$\tilde{p}_r(x) = \int_{-\infty}^{\infty} \tilde{p}_t(y) p_n(x-y)\,dy \tag{40}$$

$$\tilde{p}_r(x,\sigma_n) = \int_{-\infty}^{\infty} \left\{ \left( cW_{dc}(y) + \sum_{l=1}^{L} \frac{b_l}{\sqrt{2\pi}\,\sigma_l} e^{-\left(\frac{x-m_l}{\sqrt{2}\,\sigma_l}\right)^2} \right) \left( \frac{1}{\sqrt{2\pi}\,\sigma_n} e^{-\left(\frac{x-y}{\sqrt{2}\,\sigma_n}\right)^2} \right) \right\} dy \tag{41}$$

where $$\sigma_n^2 = s/s_{nr} = \text{noise variance} = \text{noise power}$$

s = signal power $s_{nr}$ = signal-to-noise ratio (SNR)

$\tilde{p}_r(x,\sigma_n) = \tilde{p}_r(x,s_{nr})$ = a function of both the received value and the noise power Carrying the SNR variable explicitly because it is the quantity of interest yields $$\tilde{p}_r(x,s_{nr}) = \alpha(x,s_{nr}) + \beta(x,s_{nr}) \tag{42}$$

where $$\alpha(x,s_{nr}) = \int_{-\infty}^{\infty} \left\{ (cW_{dc}(y)) \left( \frac{1}{\sqrt{2\pi}\,\sigma_n} e^{-\left(\frac{x-y}{\sqrt{2}\,\sigma_n}\right)^2} \right) \right\} dy$$

$$\beta(x,s_{nr}) = \int_{-\infty}^{\infty} \left\{ \left( \sum_{l=1}^{L} \frac{b_l}{\sqrt{2\pi}\,\sigma_l} e^{-\left(\frac{y-m_j}{\sqrt{2}\,\sigma_l}\right)^2} \right) \left( \frac{1}{\sqrt{2\pi}\,\sigma_n} e^{-\left(\frac{x-y}{\sqrt{2}\,\sigma_n}\right)^2} \right) \right\} dy$$

The first term is integrated with a standard change of variables as $$\alpha(x,s_{nr}) = c\left[Q\left(\frac{-H_{max}-x}{\sigma_n}\right) - Q\left(\frac{H_{max}-x}{\sigma_n}\right)\right] \quad \sigma_n^2 = s/s_{nr} \tag{43}$$

where [68, 70]

$$Q(\gamma) = \frac{1}{\sqrt{2\pi}} \int_\gamma^\infty e^{-\frac{1}{2}\gamma^2} d\gamma \quad (44)$$

An approximation to the Q-function has been found in that reduces the computation time by a factor of 2 over the MATLAB built-in error function (erf), which is related to the Q-function by a scale factor and change of variable. The approximation is $$Q(x) \cong \left[ \frac{1}{\left(1-\frac{1}{\pi}\right)x + \frac{1}{\pi}\sqrt{x^2+2\pi}} \right] \frac{1}{\sqrt{2\pi}} e^{-x^2/2} \quad (45)$$

and is accurate to within 1.5% across the entire range of x. Its use in the simulations helped control data run times.

The approximation has 1–1.5% accuracy for the argument in the range [0.3–1.2]. Closer to zero and greater than 1.2 yield more accurate approximations, asymptotically approaching zero error in both directions. For the windowed DC implementation here, the Q-function is used only in the first term of equation (42), where the positive argument shown in equation (43) results in the 1–1.5% error for the range $$0.3 < \frac{H_{max}-x}{\sigma_n} < 1.2 \qquad H_{max} - 1.2\sigma_n < x < H_{max} - 0.3\sigma_n.$$

Since $Q(-x)=1-Q(x)$, the greatest inaccuracy is also in the range $$1.2\sigma_n - H_{max} > x > 0.3\sigma_n - H_{max}.$$

The inaccuracy occurs in like manner for the other edge of the DC window. It is most pronounced just inside and outside the edges of DC window, and has greater contribution with larger channel noise power. The second term in the received PDF closed-form model equation (42) is exact, and reduces the contribution of the Q-function error to the received PDF convolution result.

The equation for the second term is solved using the result tabulated in a mathematical reference book, $$\int_{-\infty}^{\infty} e^{(-p^2x^2 \pm qx)} dx = e^{\frac{q^2}{4p^2}} \frac{\sqrt{\pi}}{p} \quad p > 0 \quad (46)$$

which results in $$\beta(x, s_{nr}) = \sum_{l=1}^{L} \frac{b_l}{\sqrt{2\pi}\,\sigma_{nl}} e^{-\left(\frac{x-m_l}{\sqrt{2}\,\sigma_{nl}}\right)^2} \quad (47)$$

where $\sigma_{nl}^2 = \sigma_n^2 + \sigma_l^2$ and $$\sigma_n^2 = s/s_{nr}.$$

The convolution of Gaussian functions results in a Gaussian function whose variance (power) is equal to the sum of the constituent variances (powers), which is a well-known result in probability theory.

FIGS. 19a and 19b and 20a and 20b illustrate the effectiveness of these equations in calculating PDF traces for 6 & 15 dB SNR and 30 & 60 dB SNR, respectively. In all cases, the top plot is an empirical data run of 1,000,000 iterates, the middle plot is the convolution result plotted from the equation $$\tilde{p}_r(x,s_{nr}) = \alpha(x,s_{nr}) + \beta(x,s_{nr}), \quad (48)$$

and the bottom plot is the superposition of the two.

Turning back to FIG. 18, the next step is to determine the maximum likelihood SNR 158. The basics of this method draw on the observation that the received probability $\tilde{p}_r(x,s_{nr})$ is a function of two variables, x and $s_{nr}$. It is not a joint probability function because only the function of x is a PDF with unity area (slices of constant $s_{nr}$), while the function of $s_{nr}$ has unbounded area (slices of constant x). FIGS. 19a, 19b, 20a and 20b show the x dependency, which are PDFs.

Figure 21:
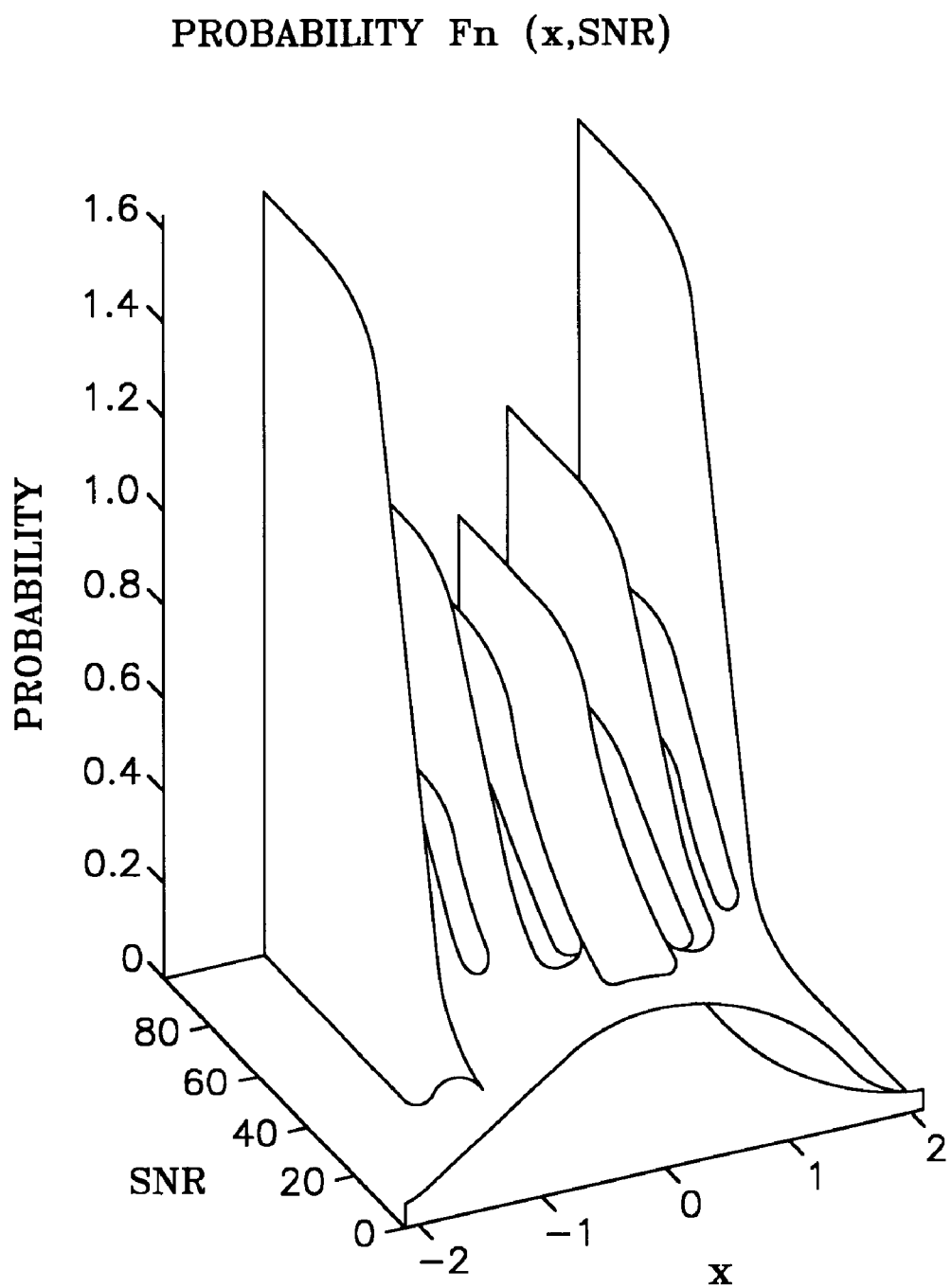
FIG. 21 is a plot of a two dimensional probability function at about 30° rotation and 120° elevation.
Figure 22:
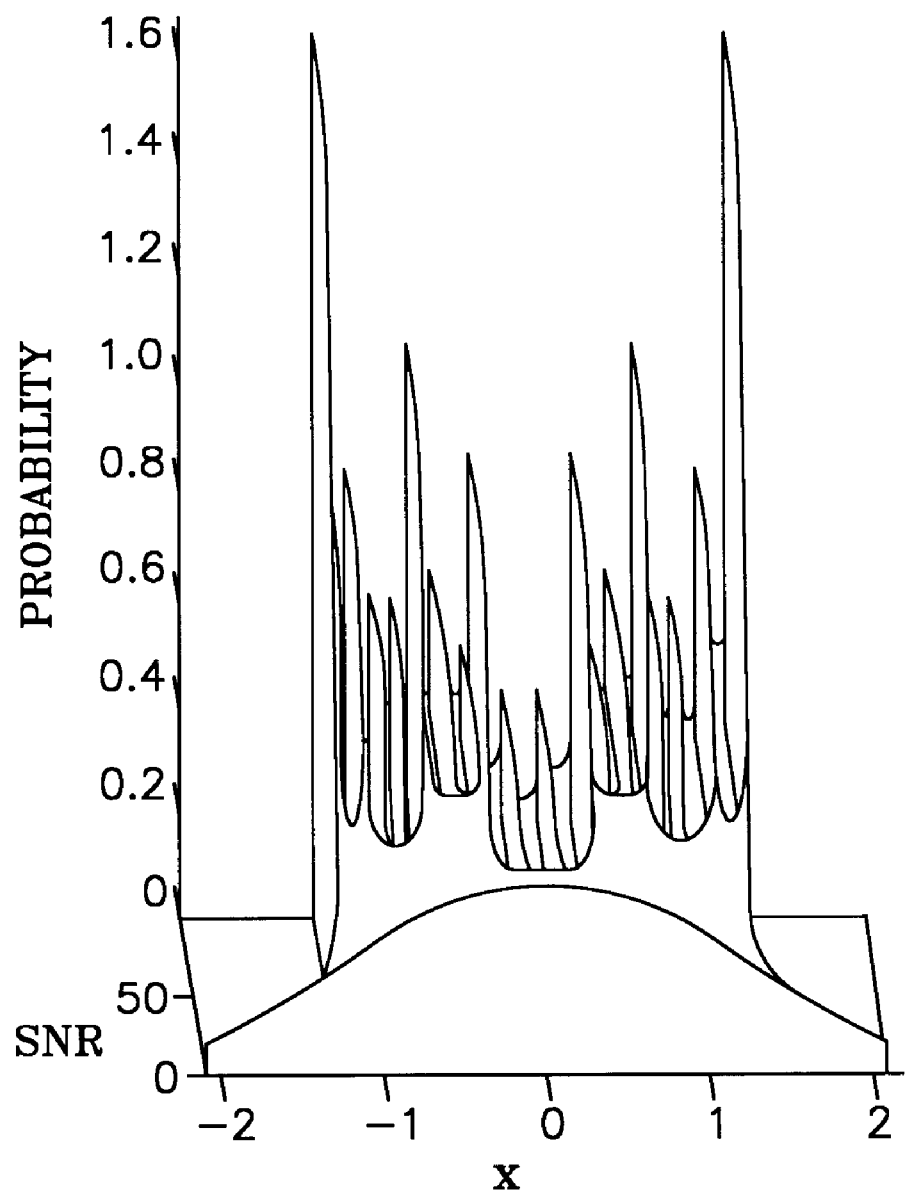
FIG. 22 is a plot of a two dimensional probability function at about 5° rotation and 10° elevation.
Figure 23:
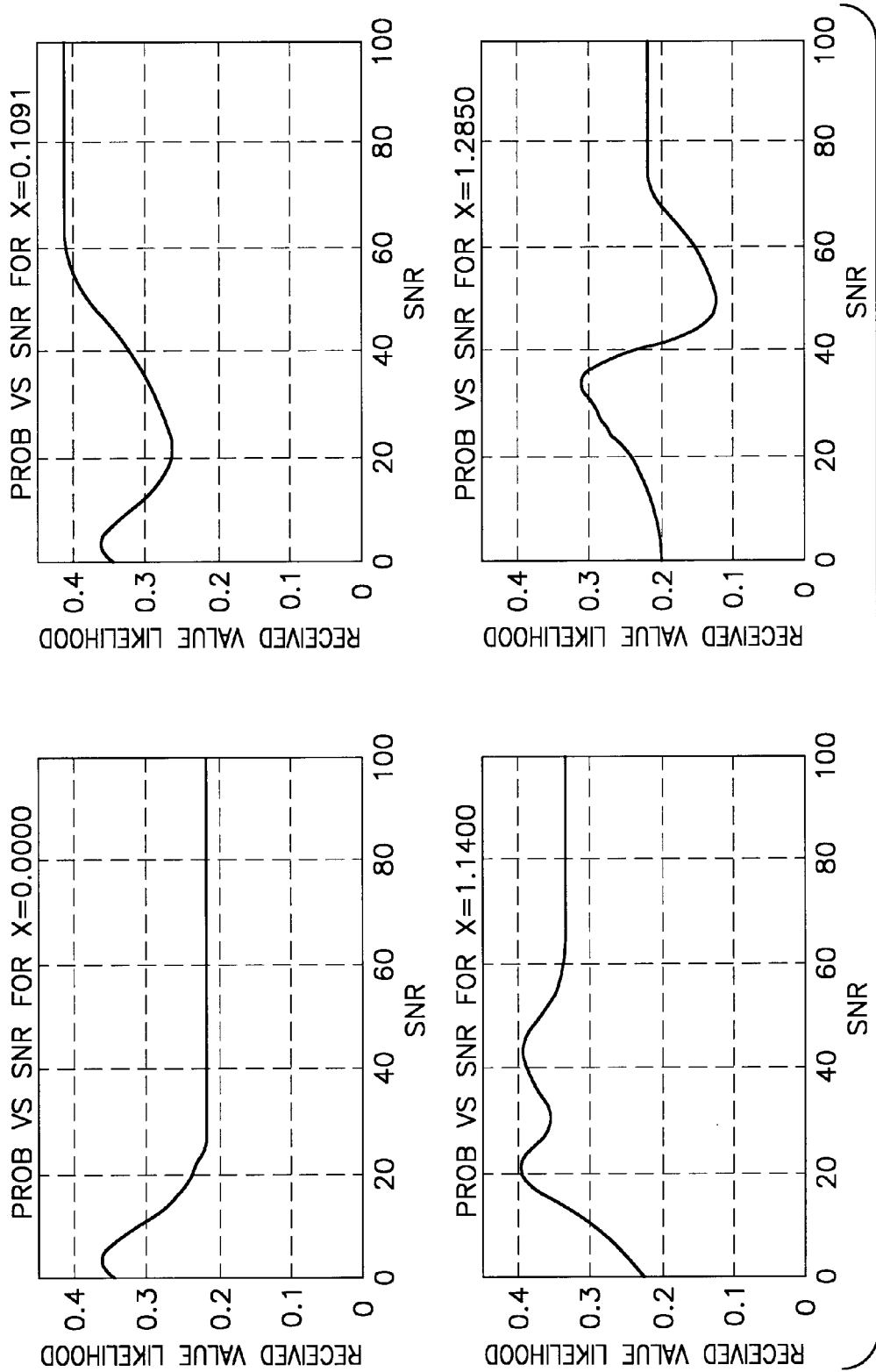
FIG. 23 shows a plot of PDF dependency on SNR for various received iterate values.

Plots of the two-dimensional function are shown in FIGS. 21 and 22, with slightly different angles of observation to highlight the variations in the functions with $s_{nr}$ and enable good views of the peaks and valleys of the surface topology. These peaks and valleys became an important feature in the determination of the average SNR estimate. FIG. 23 illustrates examples of the PDF dependency on SNR for various values of the received iterate. These shapes are continuous and vary smoothly with SNR, which opened the possibility of an algorithmic method of solving for the maximum probability point to determine the corresponding SNR as the desired instantaneous value. The preferred method will be fast and respond only to maxima. In addition, the question of choosing local or global solutions arises in situations with more than one peak, as well as traces with two identical peaks that must be addressed.

Turning back to FIG. 18, either the Newton-Raphson method or the modified Newton-Raphson method is used to determine the maximum probability SNR 159. The Newton-Raphson iterative root approximation optimization technique was targeted for the algorithm because it converges quadratically to a solution, while all other possibilities such as bisection, secant, and regula-falsi converged linearly or slightly better than linearly. The Newton-Raphson technique finds the zeros of a function and converges to local solutions or diverges depending on its initial estimate and the correction step size. The individual iterate decisions are then smoothed through a running average calculation 160 and processing continues in FIG. 17.

The Newton-Raphson method operates on functions expressed as $f(x_{sol})=0$, and requires the derivative of the function in its approximation correction process. Its iterated equation is $$x_{j+1} = x_j - \frac{f(x_j)}{f'(x_j)} \quad (49)$$

where
  j=the iterate counter
  $x_j$=the current approximation $f(x_j) = [f(x)]_{x=x_j}$ $f'(x_j) = [df(x)/dx]_{x=x_j}$ $x_{j+1}$=the next approximation
At $x=x_{sol}$, $f(x_{sol})=0$ and $x_{j+1}=x_j=x_{sol}$ and the iteration is complete.

Convergence of this method is not guaranteed and generally depends on the initial estimate and the step size that is calculated from the function and its derivative on each iterate. This method will find any zero of the function that is close enough to its initial value and has a well-behaved sequence of correction calculations. Although all references seen to date have similar descriptions of the technique that are not based on chaos theory, any solution point can be viewed from the standard nonlinear dynamical perspective as a fixed point of the iterative process. Correction steps that are large enough to move the next approximation out of the basin of attraction for a given solution will cause the iterative procedure to diverge from that point.

The function with zeros that the Newton-Raphson method solves for can be the derivative of another function, for example (cf. equation 42)

$$f(s_{nr}) = \frac{d[\tilde{p}_r(x, s_{nr})]}{ds_{nr}} \quad (50)$$

The solutions $f(s_{nr_{sol}})=0$ in this case correspond to the maxima, minima, and points of inflection for the probability function of SNR for a given received value, where its first derivative is zero.

Alternatively the modified Newton-Raphson technique may be used to determine the maximum probability SNR 159 by adapting the Newton-Raphson technique to this design via three main modifications to the control its functional characteristics. The first modification causes it to find only the maxima of the probability function of SNR based on the fact that the second derivative of a function identifies its concave down (maximum) or concave up (minimum) characteristic. The second change limits the maximum correction per step in order to avoid jumping over maxima without detecting them. And finally, the computed step size is multiplied by a factor that toggles between two values to prevent a period two fixed point of the iterative process spanning a peak and causing detection failure. Other standard programming techniques such as limiting the number of iterations allowed in each execution, hard programming upper and lower $s_{nr}$ range limits, protecting against a zero denominator, and early loop termination via testing each new approximation for proximity to the current value round out its implementation.

The Newton-Raphson equation expressed as functions of the probability function of SNR is $$s_{nr_{j+1}} = s_{nr_j} - \frac{\left[\frac{d[\tilde{p}_r(x, s_{nr})]}{ds_{nr}}\right]_{s_{nr_j}}}{\left[\frac{d^2[\tilde{p}_r(x, s_{nr})]}{ds_{nr}^2}\right]_{s_{nr_j}}} \quad (51)$$

The derivative in the numerator is carried out below, and the fact that it equals zero at the solution allows a term to be dropped that simplifies the second derivative in the denominator. The correction term actually used is, therefore, not exactly as specified in equation (51), and so the notation will be changed to reflect this.

Let $$s_{nr_{j+1}} = s_{nr_j} - \frac{f(s_{nr_j})}{f'(s_{nr_j})} \quad (52)$$

where $$f(s_{nr}) \propto \frac{d[\tilde{p}_r(x, s_{nr})]}{ds_{nr}} \text{ and } f'(s_{nr}) = \frac{df(s_{nr})}{ds_{nr}} \propto \frac{d^2[\tilde{p}_r(x, s_{nr})]}{ds_{nr}^2}$$

Differentiating equation (42), $$\frac{d[\tilde{p}_r(x, s_{nr})]}{ds_{nr}} = \frac{d[\alpha(x, s_{nr})]}{ds_{nr}} + \frac{d[\beta(x, s_{nr})]}{ds_{nr}} \quad (53)$$

From equation (43)

$$\frac{d\alpha(x, s_{nr})}{ds_{nr}} = \quad (54)$$
$$c\left[\frac{d}{d\sigma_n}\left\{Q\left(\frac{-H_{\max}-x}{\sigma_n}\right)\right\}\frac{d\sigma_n}{ds_{nr}} - \frac{d}{d\sigma_n}\left\{Q\left(\frac{-H_{\max}-x}{\sigma_n}\right)\right\}\frac{d\sigma_n}{ds_{nr}}\right]$$

The differentiation of the Q-function was done using the Liebniz rule $$\frac{d}{dy}\left[\int_{s(y)}^{r(y)} p_X(x)dx\right] = p_X(r(y))\frac{dr(y)}{dy} - p_X(s(y))\frac{ds(y)}{dy}. \quad (55)$$

The result was verified with the following equation $$\frac{d}{dx}erf(x) = \frac{2}{\sqrt{\pi}}e^{-x^2} \quad (56)$$

and the relationship $$Q(x) = \frac{1}{2}\left[1 - erf\left(\frac{x}{\sqrt{2}}\right)\right] \quad (57)$$

as $$\frac{d}{dx}Q(x) = -\frac{1}{\sqrt{2\pi}}e^{-\frac{x^2}{2}} \quad (58)$$

So $$\frac{d\alpha(x, s_{nr})}{ds_{nr}} = \left(\frac{1}{\sqrt{2\pi}s_{nr}}\right)\left(\frac{c}{\sqrt{2}}\right)\left[\left(\frac{H_{\max}-x}{\sqrt{2}\sigma_n}\right)e^{-\left(\frac{H_{\max}-x}{\sqrt{2}\sigma_n}\right)^2} + \left(\frac{H_{\max}+x}{\sqrt{2}\sigma_n}\right)e^{-\left(\frac{H_{\max}+x}{\sqrt{2}\sigma_n}\right)^2}\right] \quad (59)$$

Carrying out the differentiation for the second term of equation (53), using equation (47)

$$\frac{d\beta(x,s_{nr})}{ds_{nr}} = \sum_{l=1}^{L} \left\{ \frac{d}{d\sigma_{nl}} \left[ \frac{b_l}{\sqrt{2\pi}\,\sigma_{nl}} e^{-\left(\frac{x-m_l}{\sqrt{2}\,\sigma_{nl}}\right)^2} \right] \left(\frac{d\sigma_{nl}}{d\sigma_n}\right)\left(\frac{d\sigma_n}{ds_{nr}}\right) \right\} \quad (60)$$

$$= \left(\frac{1}{\sqrt{2\pi}\,s_{nr}}\right)\left(\frac{\sigma_n^2}{2}\right) \sum_{l=1}^{L} \left\{ b_l e^{-\left(\frac{x-m_l}{\sqrt{2}\,\sigma_{nl}}\right)^2} \left(\frac{1}{\sigma_{nl}^3}\right)\left(1 - \left(\frac{x-m_l}{\sigma_{nl}}\right)^2\right) \right\} \quad (61)$$

Both terms of the differentiation for the Newton-Raphson correction term numerator have been found. Setting the numerator equal to zero allows the elimination of one $s_{nr}$ term, which simplifies the next differentiation for the denominator of the correction term. It is possible to form the total correction shown in equation (52) prior to simplification, but the leading term eliminated now because of numerator equality to zero contains the variable $s_{nr}$, which would enter into the differentiation process and result in more complicated equations. The notation change is shown below.

$$\left[\frac{d[\tilde{p}_r(x,s_{nr})]}{ds_{nr}}\right]_{s_{nr_{sol}}} = \left[\frac{d[\alpha(x,s_{nr})]}{ds_{nr}}\right]_{s_{nr_{sol}}} + \left[\frac{d[\beta(x,s_{nr})]}{ds_{nr}}\right]_{s_{nr_{sol}}} = 0 \quad (62)$$

Both of these terms have a common leading factor, which can be eliminated.

$$\left[\frac{d[\tilde{p}_r(x,s_{nr})]}{ds_{nr}}\right]_{s_{nr_{sol}}} = \left(\frac{1}{\sqrt{2\pi}\,s_{nr_{sol}}}\right) f1(s_{nr_{sol}}) + \left(\frac{1}{\sqrt{2\pi}\,s_{nr_{sol}}}\right) f2(s_{nr_{sol}}) = 0 \quad (63)$$

Resulting in the new notation $$f(s_{nr}) = f_1(s_{nr}) + f_2(s_{nr}) = \sqrt{2\pi}\,s_{nr} \left[\frac{d[\tilde{p}_r(x,s_{nr})]}{ds_{nr}}\right] \quad (64)$$

where $$f_1(s_{nr}) = \left(\frac{c}{2}\right)\left[\left(\frac{H_{\max}-x}{\sigma_n}\right)e^{-\frac{1}{2}\left(\frac{H_{\max}-x}{\sigma_n}\right)^2} + \left(\frac{H_{\max}+x}{\sigma_n}\right)e^{-\frac{1}{2}\left(\frac{H_{\max}+x}{\sigma_n}\right)^2}\right] \quad (65)$$

$$f_2(s_{nr}) = \left(\frac{\sigma_n^2}{2}\right) \sum_{l=1}^{L} \left\{ b_l e^{-\frac{1}{2}\left(\frac{x-m_l}{\sigma_{nl}}\right)^2} \left(\frac{1}{\sigma_{nl}^3}\right)\left(1 - \left(\frac{x-m_l}{\sigma_{nl}}\right)^2\right) \right\} \quad (66)$$

The denominator in equation (52) becomes $$f'(s_{nr}) = f_1'(s_{nr}) + f_2'(s_{nr}) \quad (67)$$

with $$f_1'(s_{nr}) = \left(\frac{1}{2s_{nr}}\right)\left(\frac{c}{2}\right)\left[\left(\frac{H_{\max}-x}{\sigma_n}\right)e^{-\frac{1}{2}\left(\frac{H_{\max}-x}{\sigma_n}\right)^2}\left\{1 - \left(\frac{H_{\max}-x}{\sigma_n}\right)^2\right\} + \left(\frac{H_{\max}+x}{\sigma_n}\right)e^{-\frac{1}{2}\left(\frac{H_{\max}+x}{\sigma_n}\right)^2}\left\{1 - \left(\frac{H_{\max}+x}{\sigma_n}\right)^2\right\}\right] \quad (68)$$

-continued $$f_2'(s_{nr}) = \left(\frac{\sigma_n^2}{2s_{nr}}\right)\left(\frac{\sigma_n^2}{2}\right) \sum_{l=1}^{L} b_l e^{-\frac{1}{2}\left(\frac{x-m_l}{\sigma_{nl}}\right)^2} \left(\frac{1}{\sigma_{nl}^3}\right)\left[\left(\frac{1}{\sigma_{nl}^2}\right)\left[3\left(1 - \left(\frac{x-m_l}{\sigma_{nl}}\right)^2\right) - 2\left(\left(\frac{x-m_l}{\sigma_{nl}}\right)^2\right)^2\right] - \frac{2}{\sigma_n^2}\left(1 - \left(\frac{x-m_l}{\sigma_{nl}}\right)^2\right)\right\} \quad (69)$$

The equations are now fully defined, and the algorithmic modifications can be made. Equation (52) is repeated below as the starting point, and depicts the Newton-Raphson method with attractive fixed points at all maxima, minima, and points of inflection for the probability function $\tilde{p}_r(x,s_{nr})$.

$$s_{nr_{j+1}} = s_{nr_j} - \frac{f(s_{nr_j})}{f'(s_{nr_j})} \quad (70)$$

The minima have a concave up structure with a positive second derivative of $\tilde{p}_r(x,s_{nr})$, while the maxima have a concave down structure and a negative second derivative. The same holds true for the corresponding portions of a point of inflection in that the side leading up into the point is concave down and the side leading up away from the point is concave up. A simple test prior to the execution of equation (70) turns the minima into repelling fixed points, while maintaining the maxima as attractive fixed points.

If $f'(s_{nr_j}) > 0$ % Concave up–minima $f'(s_{nr_j}) = -f'(s_{nr_j})$ % Negates correction direction  (71)

% therefore pushes away from minima end $$s_{nr_{j+1}} = s_{nr_j} - \frac{f(s_{nr_j})}{f'(s_{nr_j})}$$

The maximum probability algorithm performs better when working with SNR values expressed as dB rather than ratios. Although the typical calculation method is to work with power ratios and convert results to dB, the traces shown in FIG. 23 have an intuitively good appearance similar to polynomial curves on a dB SNR scale, so the various considerations are expressed in dB for this situation.

TABLE 3

Sliding maximum step sizes

| SNR Values | Max Step Size |
| --- | --- |
| 0–10 dB | 5 dB |
| 10–20 dB | 5 + 1.5 dB |
| 20–30 dB | 5 + 2(1.5) dB |
| 30–40 dB | 5 + 3(1.5) dB |
| etc. | etc. |

A set of maximum step criteria were established to avoid jumping over maxima without detecting them. A sliding maximum step was used because the areas of these traces that showed little or no activity could tolerate larger steps than those areas with a lot of peaks and valleys, and maximized the efficiency of the algorithm at locating the peaks. The steps and their regions of definition are shown in Table 3.

The maximum step size is multiplied at each pass by a variable that toggles between the values of 1 and $\sqrt[5]{1/2}=0.8706$, which is an empirically determined value. The roots of ½ are used as candidates for a suitable step size modification because the various roots yield conveniently spaced possibilities. A number of other selection methods would have worked as well. The dual step size technique avoided the situation of a period two fixed point causing the algorithm to perpetually span the desired maximum point without ever finding it within the SNR range of a given maximum step size. Care was required at the crossover points of the sliding maximum steps that were used, where the wrong choice of toggle multiplier could map the larger range exactly into the smaller and cause algorithm failure due to a period two fixed point.

The detection rails were set at 0 dB and 100 dB SNR, which were the expected minimum SNR of performance and essentially no noise, respectively. Next approximation values that exceeded these limits were adjusted, so instantaneous SNR values are always within this range. These were chosen prior to completion of the receiver design and the subsequent evaluation of its performance, and especially the 0 dB minimum SNR may be a good subject for further investigation.

At the completion of the Newton-Raphson computation, the instantaneous maximum probability SNR estimate for iterate k has been found.

$$s\exists_{nr}[k]=s_{nr_{sol}}=[s_{nr_{j+1}}]_{\{s_{nr_{j+1}}-s_{nr_j}<\epsilon\}} \text{ where } \epsilon=\text{desired accuracy} \quad (72)$$

Turning back to FIG. 17, the next step in the receiver estimation engine processing is to calculate the running weighted average 115.

Combining the instantaneous SNR estimates on every received iterate into an average value that accurately tracks is accomplished by a running weighted average calculation whose weights are derived from probability computations so the estimated SNR tracks the true SNR closely. The current received iterate and the corresponding instantaneous SNR estimate are processed to find their probability of occurrence. The bin width w is ignored because it is the same for all bins in the PDF model and contributes nothing to the decision process. Only the bin values of the PDF functions will be used in the weighted averaging process and will be loosely referred to as the probability. For each received iterate, the SNR is estimated, and the probability of occurrence is found for the (received value, SNR estimate) pair. These values correspond to a point in the two-dimensional probability function shown in FIGS. 21 and 22. Both the received value and the SNR estimate will change for every iterate, so the instantaneous probability moves with respect to both axes on every calculation.

In order for the estimated SNR to track the true SNR, the averaging weights are defined as the inverse instantaneous probability of the (received value, SNR estimate) pair $$w_{av}[k] = 1/P_i[k]. \quad (74)$$

Two considerations for calculating the weighting factors are avoiding division by zero and limiting the maximum weight. Observed probabilities of zero within the resolution of MATLAB did happen, and the probability result is now restricted to a minimum value of $10^{-10}$ to avoid division by zero. The maximum weight calculation limits the amount of emphasis put on the very low probability values so that their inverses do not swamp the average, and was derived from the observed average probability and the averaging window length.

$$\overline{P}_i=0.4444$$

$$w_{\max} = \frac{1}{\overline{P}_i} \frac{W_{ra}}{f_W} \quad (75)$$

where $W_{ra}$=the running average window length and $f_W$=3, an empirical factor.

Figure 24:
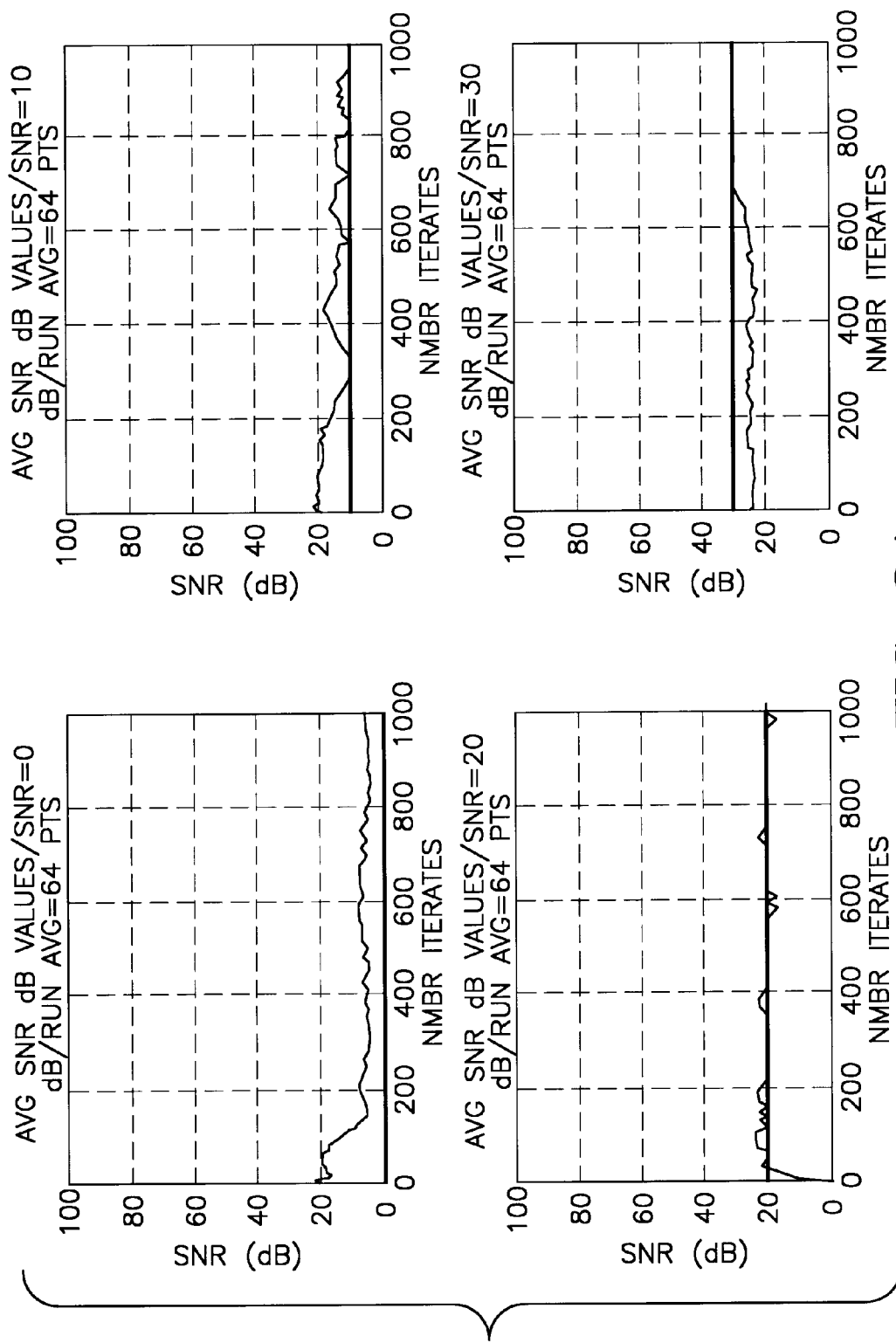
FIG. 24 is a plot of the SNR estimator performance for a 64 iterate window.

Data was taken for various combinations of variables, and the empirical factor value of three was found to yield good results. Averaging window lengths of 8 and 16 are responsive to changes in channel conditions but have a grassy appearance with some areas of significant discrepancy between the estimated SNR and the true SNR. Windows of 32 and 64 iterates showed smoother traces with better estimate tracking. This simulation was done with a 64-iterate window, and examples of its performance are shown in FIG. 24. In FIG. 24, it can be seen that the running weighted average SNR locks onto a close estimate of the true SNR within approximately 200 iterates for a 64-iterate window. The traces have some variation because they are estimates and not power measurements, however they maintain a close proximity to the true value once lock is attained. In simulations of the receiver, the receiver decisions are ignored until the 200-iterate transient period has passed, after which time data bit recovery commences. In the event that the channel SNR varies, the SNR estimator will track the changes in the same manner as the receiver initialization process did with an unknown SNR. Sharp variations will cause a 200-iterate transient period to occur, as happens at receiver initialization, and gradual changes will be tracked on a continual basis.

The issues of local versus global instantaneous SNR maximum likelihood detection and algorithm initialization are related. Global detection is desired in the absence of knowledge at estimate algorithm inception, but the average value drives the instantaneous peak detection once the averaging window has filled up with globally detected maximum likelihood instantaneous SNR values. This feedback of the current average SNR estimate serves as the initial approximation in the Newton-Raphson root approximation optimization procedure. The average SNR feedback enables the determination of local maxima in the vicinity of the current average SNR estimate after the its value has been established via global values, which tends to drive the estimated SNR toward an accurate assessment of the true SNR. Observations of the probability vs. SNR functions led to the empirical initial SNR value of 23 dB for the instantaneous SNR detector Newton-Raphson algorithm during the averaging window initialization. This value is located about midway between the lobes of the observed double-peak functions and had good mobility toward either higher or lower values for the various observed traces.

The techniques used in this SNR estimator do not require differentiable equations for the probability function to be successful implementations. Standard derivative definition equations could be used in the Newton-Raphson iteration technique where two close values are used with the corre sponding function responses, and the second derivative can be found in the same manner.

$$\frac{df(x)}{dx} \cong \frac{f(x_2)-f(x_1)}{x_2-x_1} \text{ and } \frac{d^2f(x)}{dx^2} \cong \frac{\frac{df(x_2)}{dx}-\frac{df(x_1)}{dx}}{x_2-x_1} \quad (76)$$

It is necessary in the averaging process to find the probability of occurrence for the (received iterate, maximum probability SNR) pair, which can be done with empirical data rather than via closed-form equations. The difficulty with this approach is that the probability response as a function of SNR is not known and cannot be verified to be smooth and well behaved for proper Newton-Raphson iteration performance.

Turning back to FIG. 17, the transmit value Maximum a Posteriori (MAP) estimator 117 generates the second estimate for a given received iterate, which is the optimal probabilistic detector because it minimizes the probability of error. Differences between conventional communication methods and this chaotic system in the transmission characteristics, the modulation technique, and the presence of chaotic dynamics require additional considerations in the decision process. The MAP decision resulting in the second estimate is a statistical method that yields the lowest bit error rate.

The chaotic communication system herein relates the binary possibilities of logical 1 and logical 0 with a constantly changing sequence drawn from a continuum of possible values, the range of which is identical for both logical states. There is not a direct relationship between a transmit value and its message content. Any given transmit value could represent either logical state depending on the attractor from which it was generated at that point in time, and the next time the value (or a value within a small neighborhood) is encountered it may have come from the opposite attractor.

The MAP calculation is performed on every received iterate, so the iterate index k is carried explicitly in the following equations. In order to relate the continuum of values $x_t$ to the PDF as empirically determined or modeled, reference is made to the formulations derived previously. There the empirical PDF traces were generated by collecting the countably infinite set of transmit values into quantized data bins of acceptably narrow widths. The PDF traces were then modeled by a set of weighted Gaussian functions, resulting in equation (25). This quantized data bin approach is extended below to the maximum a posteriori (MAP) statistical calculation, and a decision criterion is derived. This criterion is shown to be computationally intensive, and a simplified calculation that minimizes the computational load for a MAP calculation is developed to enable faster execution of the receiver estimation engine decision process.

The continuous range of countably infinite values is considered instead to have a very large but finite set l of possible values, as is encountered by a chaotic map processed on a computer because of the finite resolution of computer-generated numbers. The general relationship between the probability and a specific value in the range of a PDF is $$P[A < X \leq B] = \int_A^B p_X(x_0)dx_0 \quad (77)$$

The probability that the $l^{th}$ transmitted value possibility $x_t(l)$ falls into bin b in the quantized PDF of section 4.2.2 is equal to $$P_t[(x_{tb}-w/2) < x_t(l) \leq (x_{tb}+w/2)] = \quad (78)$$
$$\int_{x_{tb}-w/2}^{x_{tb}+w/2} {}_b p_t(x_t[l])dx_t = w[{}_b p_t(x_t[l])]$$

where $x_{*b}$=* iterate series PDF central value of bin b (i.e.—t→Tx series,
   r→Rx series, etc.)
   ${}_b p_*(\bullet)$=the probability of the bin into which the value ($\bullet$) falls, for the * iterate series
   l=a dummy variable of delineating the range of possible transmit values
and
   b=1,2, ..., B bin index.
Note that the index "l" used here is an indicator of the countably infinite possible transmit values, the total set of which numbered about $2.6 \times 10^{14}$ on the hardware platform used with the software package MATLAB. This set of transmit values became quantized into the 4096 bins selected as adequate to represent the discretized PDF with sufficient resolution. It is distinct from the index "l" used previously to enumerate the weighted Gaussian functions comprising the PDF models. In shorthand notation, $$P_t(x_{tb}[l])=w[{}_b p_t(x_t[l])] \quad (79)$$

The determination of a MAP transmit value seeks the maximum value of the equation $$\max_b \{P(x_{tb}[l]|x_r[k])\} = \max_b \{{}_b p_{r|t}(x_r[k]|x_{tb}[l])P_t(x_{tb}[l])\} \quad (80)$$

$$= \max_b \{{}_b p_{r|t}(x_r[k]|x_{tb}[l])w[{}_b p_t(x_t[l])]\} \quad (81)$$

where k is the time index and $x_r[k]$ is the $k^{th}$ received value. The bin width term w is the same constant value for all probability bins, and so can be dropped from the maximization process. The resulting equation to maximize is $$\max_h \{P(x_{th}[l]|x_r[k])\} = \max_b \{{}_b p_{r|t}(x_r[k]|x_{th}[l])_h p_t(x_t[l])\} \quad (82)$$

The maximization occurs across all bins in the quantized PDF range of values. The index b can be dropped, with the understanding that the entire PDF is included in the maximization range, and that the resulting values will be quantized. A further notation simplification can be made by recognizing that the transmit PDF is fixed, regardless of which time iterate index k is current. In addition, the countably infinite number of possible transmit values can be considered continuous, allowing elimination of the index "l". The results are $$p_t(x_t[l]) \to p_t(x_t) \text{ is the transmit PDF} \quad (83)$$

$$x_{tb}[l] \to x_t \text{ the } l^{th} \text{ transmit value possibility that} \quad (84)$$

results in $x_r[k]$ is the entire transmit range $$\max_x \{P_{t|r}(x_t|x_r[k])\} = \max_x \{p_{r|t}(x_r[k]|x_t)p_t(x_t)\}. \quad (85)$$

Equation (85) is the MAP technique for the estimation of continuous variables. The term $p_{r|t}(x_r[k]|x_t)$ is a window that multiplies the transmit PDF $p_t(x_t)$, and the maximization of the result is the desired MAP transmit value for the $k^{th}$ system iterate. This window serves to define the region of the PDF over which the maximization will occur, and also to modify the shape of the transmit PDF according to the noise contained in the received sequence $x_r$.

Figure 25:
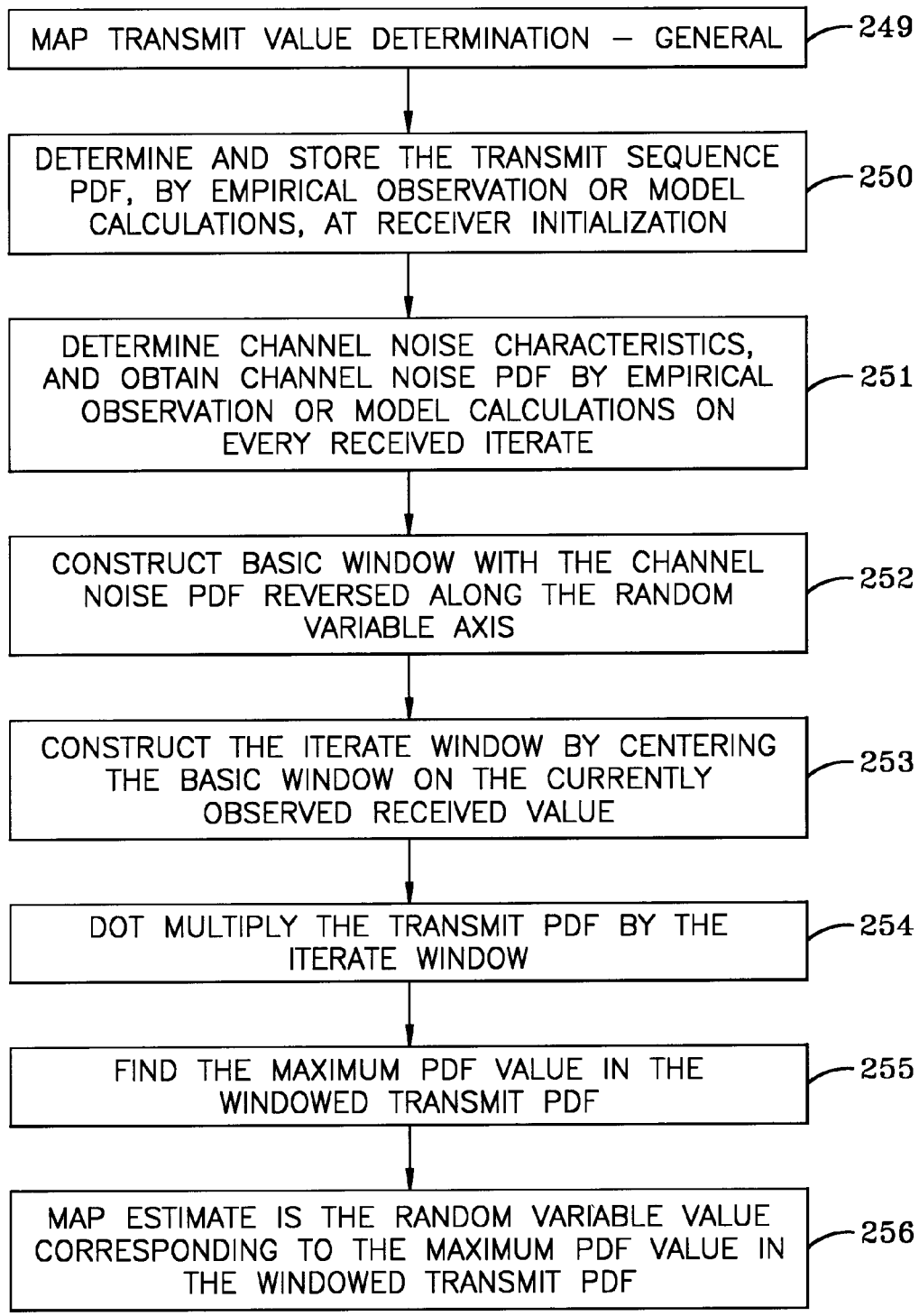
FIG. 25 shows a flowchart of the general MAP transmit value determination where the transmit sequence PDF is determined and stored by empirical observation or using model calculations at receiver initialization.

FIG. 25 shows a flowchart of the general MAP transmit value determination. The transmit sequence PDF is determined and stored by empirical observation or using model calculations at receiver initialization 250. The channel noise characteristics for every received iterate are determined and the channel noise PDF is obtained by empirical observation or model calculations 251. A basic window is constructed with the channel noise PDF reversed along the random variable axis 252. The iterate widow is constructed by centering the basic window on the currently observed received value 253. The transmit PDF is multiplied by the iterate window 254. The maximum PDF value in the windowed transmit PDF is then found 255. The MAP estimate is the random variable value corresponding to the maximum PDF value in the windowed transmit PDF 256.

For the current situation with Gaussian noise and a Gaussian approximation to the transmit PDF, it is conceptually possible to perform this multiplication and get a closed-form equation for the result. This expression can then be differentiated once or twice, depending on the iterative root approximation modification algorithm used to find the maxima, as is done for the SNR estimator. However, the multiplication result will have many sharply defined peaks for the noise levels of interest for practical communications, and this approach was discarded as impractical. The multiplication result is more easily searched for its largest value with a software routine that locates the maximum value of a vector of numbers, which yields the most likely transmitted value. A 'max' function is standard in many mathematical platforms such as MATLAB, and makes the search for the maximum value in a vector of numbers routine.

The transmit PDF window construction is outlined below. The general result is that the noise PDF, reversed in x, is centered on the received value. This window function then multiplies the transmit PDF, and the maximum value of the result is found. A simplified decision calculation has been developed for this design, to ease the computational burden of the technique by avoiding the repeated computation of Gaussian exponentials for the determination of the MAP transmitted value.

Turning back to FIG. 17, the next step is to calculate the transmit PDF window 118. The fact that a continuum of values can be transmitted for either logical binary state complicates the determination of an a posteriori maximum likelihood transmit value, compared to the methods used in the prior art. Furthermore, the result of such a calculation is not necessarily the best estimate of the transmit value because the effects of chaotic dynamics have not been taken into account. In this implementation the MAP computation uses only the current value and makes no use of past or future received values. However, it is a good contributor to the receiver decision of the transmit value, along with some other estimates that help track the deterministic random motion of the chaotic system.

Figure 28:
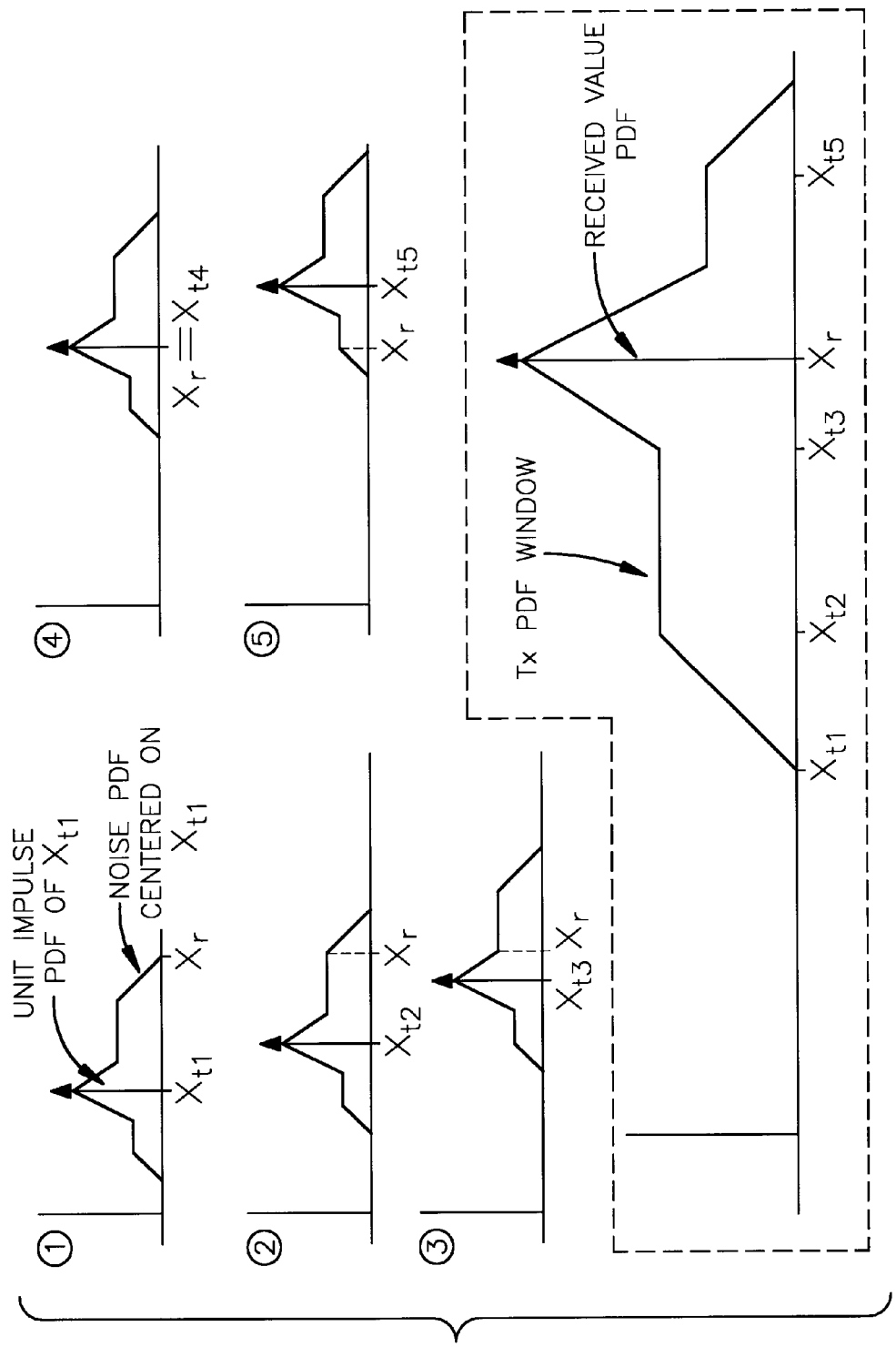
FIG. 28 is a graphical representation of the transmit PDF window construction.
Figure 29:
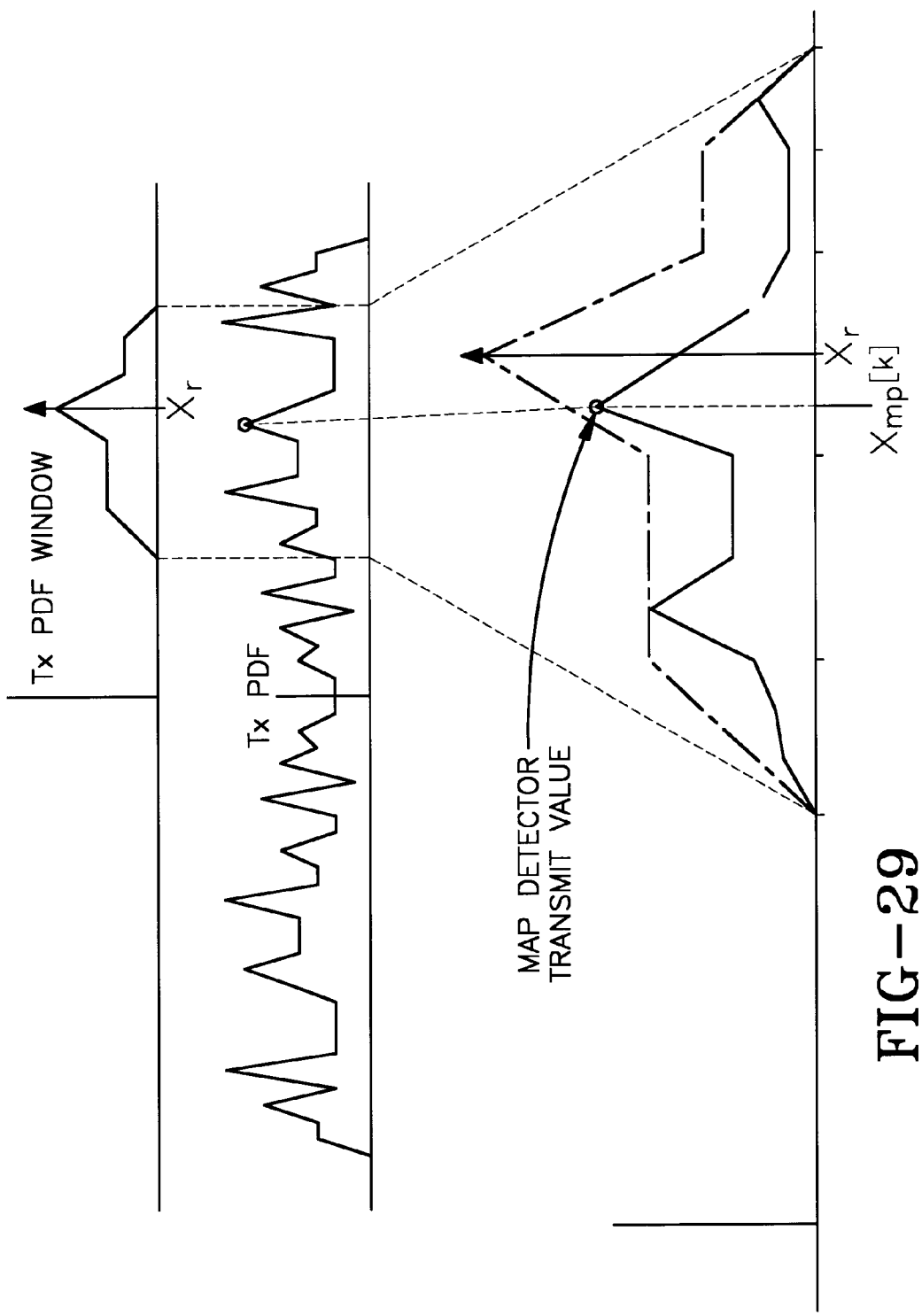
FIG. 29 is a graphical representation of the MAP decision windowing and maximum value determination.

A graphical proof of the transmit PDF window construction is presented in FIG. 28. It draws on the fact that for additive, statistically independent noise, the received PDF is the convolution of the transmit PDF with the channel noise PDF $$p_r(x) = p_t(x) * p_n(x). \tag{86}$$

It is helpful to view the succession of graphs in FIG. 28 as depicting a sequence of transmit values that have all resulted in a received value $x_r$. For each of the five graphs in the sequence, the $l^{th}$ possible transmit value $x_t[l]$ is known, and so its PDF is a unit impulse. The convolution of the channel noise PDF with this delta function results in the noise PDF being centered on the transmit value. So, $$p_t(x|x_t=x_t[l]) = \delta(x-x_t[l]) \tag{87}$$

where $\delta(x)$ is the Dirac delta function, and $$p_{r|t}(x|x_t[l]) = \delta(x-x_t[l]) * p_n(x) = p_n(x-x_t[l]) \tag{88}$$

The sequence of graphs show an asymmetrical noise PDF with its maximum peak at 0, centered on various transmit values. For all cases, the received value is the same fixed value and assumed to be the current received iterate. For the $l^{th}$ plot, the quantized probability that $x_r$ is received given that $x_t[l]$ was sent is the bin width w times the value of the received PDF at $x_r$. However, as was discussed above, the bin width does not contribute to the MAP calculation and is omitted. Letting $x_r$ be the received value on the $k^{th}$ iterate, $x_r[k]$:

$$P_{r|t}(x_r[k]|x_t[l]) = p_n(x_r[k]-x_t[l]) \tag{89}$$

The $l^{th}$ probability value is associated with the $l^{th}$ transmit value depicted in the succession of graphs in FIG. 28, all of which are laid out for the $k^{th}$ received chaotic iterate. By performing this operation for all possible shifts within the range of transmit values that can result in the current received iterate, the entire noise PDF is traced out. The result is a PDF that preserves the unity area characteristic of probability density functions.

This construction is plotted in the result box labeled "Tx PDF Window". The window, $W_{tx}$, is seen to be the noise PDF, reversed in x, and centered on the received value.

$$W_{tx}(x_r[k]) = p_n(x_r[k]-x) \tag{90}$$

Note that this result has the same general form as equation (88) for the convolution of the noise PDF with the current transmit value PDF, where the transmit value is considered to be known with probability 1 and consequently possesses a delta function PDF. The noise PDF is reversed in x in this case, and so the following interpretation can be adopted.

In the receiver, the current received value has been observed and is, therefore, known with probability 1. This value is not the received value probability of occurrence as determined from the received sequence PDF, it is the probability of the current observation and has a delta function PDF at the observed value for the construction of the transmit PDF window. The window is found as the convolution of the noise PDF reversed in x with the delta function PDF of the observed received value. The process of windowing the transmit PDF is performed, and the result is searched for its maximum value, yielding the corresponding MAP transmit value.

$$_{w}p_r(x_r[k]) = \delta(x-x_r[k]) \tag{91}$$

$$W_{tx}(x_r[k]) = p_n(-x) *{}_{w}p_r(x[k]) = p_n(x_r[k]-x) \tag{92}$$

$$p_{t|r}(x_r[k]|x_t) = W_{tx}(x_r[k]) \tag{93}$$

$$\max_x\{P_{t|r}(x_t|x_r[k])\} = \max_x\{W_{tx}(x_r[k])p_t(x_t)\} \tag{94}$$

The calculation of the maximum likelihood transmit value reduces to finding the maximum value of the windowed transmit PDF, the general case of which is illustrated in FIG.

29. The convolution shown in equation (92) requires the noise PDF to be reversed in x. White Gaussian noise is symmetric in x, so the reversed PDF equals the forward PDF.

$$p_n(x) = \frac{1}{\sqrt{2\pi}\,\sigma_n} e^{-\left(\frac{x}{\sqrt{2}\,\sigma_n}\right)^2} \quad (95)$$

where $$\sigma_n^2 = s/s_{nr} = \text{noise variance} = \text{noise power}$$

s=signal power
$s_{nr}$=signal-to-noise ratio (SNR)

$$p_n(-x) = \frac{1}{\sqrt{2\pi}\,\sigma_n} e^{-\left(\frac{-x}{\sqrt{2}\,\sigma_n}\right)^2} = p_n(x) \quad (96)$$

$$W_{tx}(x_r[k]) = \quad (97)$$

$$p_n(x_r[k] - x) = \frac{1}{\sqrt{2\pi}\,\sigma_n} e^{-\left(\frac{x_r[k]-x}{\sqrt{2}\,\sigma_n}\right)^2} = \frac{1}{\sqrt{2\pi}\,\sigma_n} e^{-\left(\frac{x-x_r[k]}{\sqrt{2}\,\sigma_n}\right)^2}$$

$$\max_x \{W_{tx}(x_r[k]) p_t(x_t)\} = \quad (98)$$

$$\max_x \left\{ \frac{1}{\sqrt{2\pi}\,\sigma_n} e^{-\left(\frac{x-x_r[k]}{\sqrt{2}\,\sigma_n}\right)^2} \left[ cW_{dc} + \sum_{l=1}^{L} \frac{b_l}{\sqrt{2}\,\sigma_l} e^{-\left(\frac{x-m_l}{\sqrt{2}\,\sigma_l}\right)^2} \right] \right\}$$

$$\max_x \{W_{tx}(x_r[k]) p_t(x_t)\} = \max_x \left\{ \frac{1}{\sqrt{2\pi}\,\sigma_n} \left[ cW_{dc}(x) e^{-\left(\frac{x-x_r[k]}{\sqrt{2}\,\sigma_n}\right)^2} + \sum_{l=1}^{L} \frac{b_l}{\sqrt{2\pi}\,\sigma_l} e^{-\left(\frac{\sigma_n^2(x-m_l)^2 + \sigma_l^2(x-x_r[k])^2}{2\sigma_n^2\sigma_l^2}\right)} \right] \right\} \quad (99)$$

$$x_{mp}[k] = x\left(\max_x \{W_{tx}(x_r[k]) p_t(x_t)\}\right) \quad (100)$$

The calculations in these equations take place across the data bins that were set up in the transmit PDF mode, which covered the range [−5.12, 5.12] with 4096 bins. Each new iterate produces a new received value $x_r[k]$. The noise power (or SNR) is estimated in the receiver and has a new value on each iterate. Every received value has a minimum computational load of 4096 subtractions (exponent), 4096 divisions (exponent), 4096 squaring calculations (exponent), and 4096 exponentiation calculations to calculate the noise PDF, followed by a 4096 length dot product (point-by-point multiplication) of the PDF waveforms prior to performing the $$\max_x$$

operation to find the MAP decision. This operation count refers to equation (98), assumes that the transmit PDF was calculated and stored at receiver initialization, and accounts for the fact that the lead term $$\frac{1}{\sqrt{2\pi}\,\sigma_n}$$

contributes nothing to the $$\max_x$$

operation and may be ignored.

Figure 26:
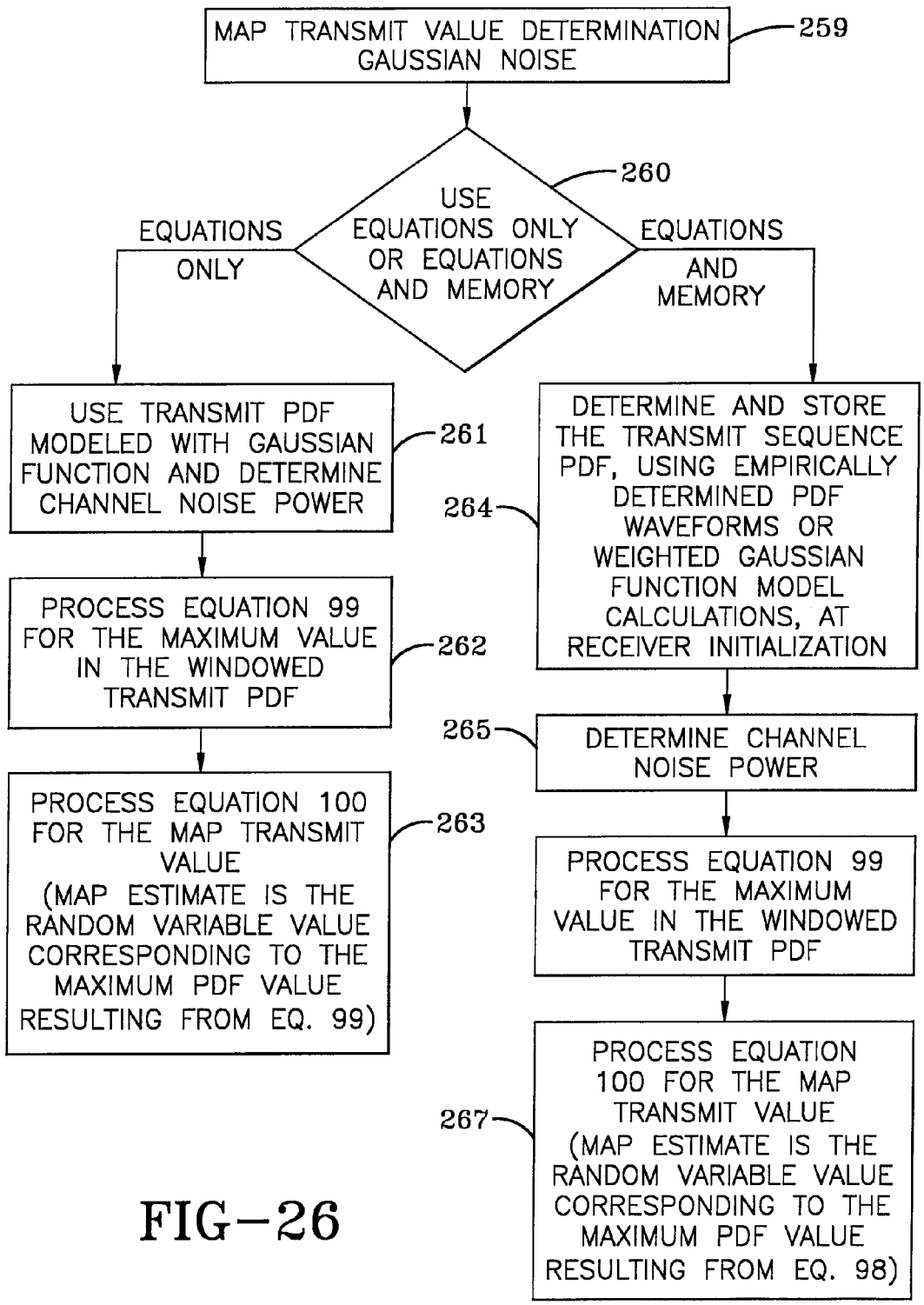
FIG. 26 is a flowchart of the MAP transmit value determination with Gaussian noise.

FIG. 26 is a flowchart of the MAP transmit value determination with Gaussian noise 259. A determination is first made as to whether to use equations only or equations and memory 260. If equations only are used, channel noise power is determined 261. Equation (99) is processed for the maximum value in the windowed transmit PDF 262. Equation (100) is processed for the MAP transmit value 263 where the MAP estimate is the random variable value corresponding to the maximum PDF value resulting from equation (99). If equations and memory are used, the transmit sequence PDF is determined and stored using weighted Gaussian function model calculations, at receiver initialization 264. The channel noise power is determined 265. Equation (98) is processed for the maximum value in the windowed transmit PDF 267. Equation (100) is processed for the MAP transmit value where the MAP estimate is the random variable value corresponding to the maximum PDF value resulting from equation (98).

A simplified MAP transmit value calculation recognizes that a squaring operation can be programmed as a multiplication and that the exponentiation calculations are the major component of the computational load. The series representation of this process is $$e^{-x^2} = 1 - x^2 + \frac{x^4}{2!} - \frac{x^6}{3!} + \frac{x^8}{4!} - \ldots \quad (101)$$

It can be seen that the exponentiation is an expensive calculation, and its elimination would greatly enhance the computational efficiency of the MAP calculation.

Dropping the lead term from equation (98) results in the following MAP decision equation $$\max_x \{W_{tx}(x_r[k]) p_t(x_t)\} = \quad (102)$$

$$\max_x \left\{ e^{-\left(\frac{x-x_r[k]}{\sqrt{2}\,\sigma_n[k]}\right)^2} \left[ cW_{dc}(x) + \sum_{l=1}^{L} \frac{b_l}{\sqrt{2\pi}\,\sigma_l} e^{-\left(\frac{x-m_l}{\sqrt{2}\,\sigma_l}\right)^2} \right] \right\}$$

where $\sigma_n[k]$=the estimated noise on the power on the $k^{th}$ iterate. The natural logarithm is a monotonically increasing function of its argument, so the maximization of the logarithm maximizes the argument.

$$\max_x \{\ln[W_{tx}(x_r[k]) p_t(x_t)]\} = \quad (102)$$

$$\max_x \left\{ \ln\left\{ e^{-\left(\frac{x-x_r[k]}{\sqrt{2}\,\sigma_n[k]}\right)^2} \left[ cW_{dc}(x) + \sum_{l=1}^{L} \frac{b_l}{\sqrt{2\pi}\,\sigma_l} e^{-\left(\frac{x-m_l}{\sqrt{2}\,\sigma_l}\right)^2} \right] \right\} \right\}$$

$$\max_x \{\ln[W_{tx}(x_r[k]) p_t(x_t)]\} = \quad (104)$$

$$\max_x \left\{ -\left(\frac{x - x_r[k]}{\sqrt{2\frac{s}{\tilde{s}_{nr}[k]}}}\right)^2 + \ln\left[ cW_{dc}(x) + \sum_{l=1}^{L} \frac{b_l}{\sqrt{2\pi}\,\sigma_l} e^{-\left(\frac{x-m_l}{\sqrt{2}\,\sigma_l}\right)^2} \right] \right\}$$

where $\tilde{s}_{nr}[k]$=the estimated SNR on the $k^{th}$ iterate.

Equation (104) has eliminated the recurring 4096 exponentiation operations and the 4096 length dot product of the PDF waveforms for each received iterate. Its natural logarithm function is applied only to the transmit PDF, which is calculated once and stored at the receiver initialization. Programming the squaring operation as a multiply, the MAP decision now has 4096 subtractions, 4096 divisions, 4096 multiplies, and 4096 additions for every received value.

Figure 27:
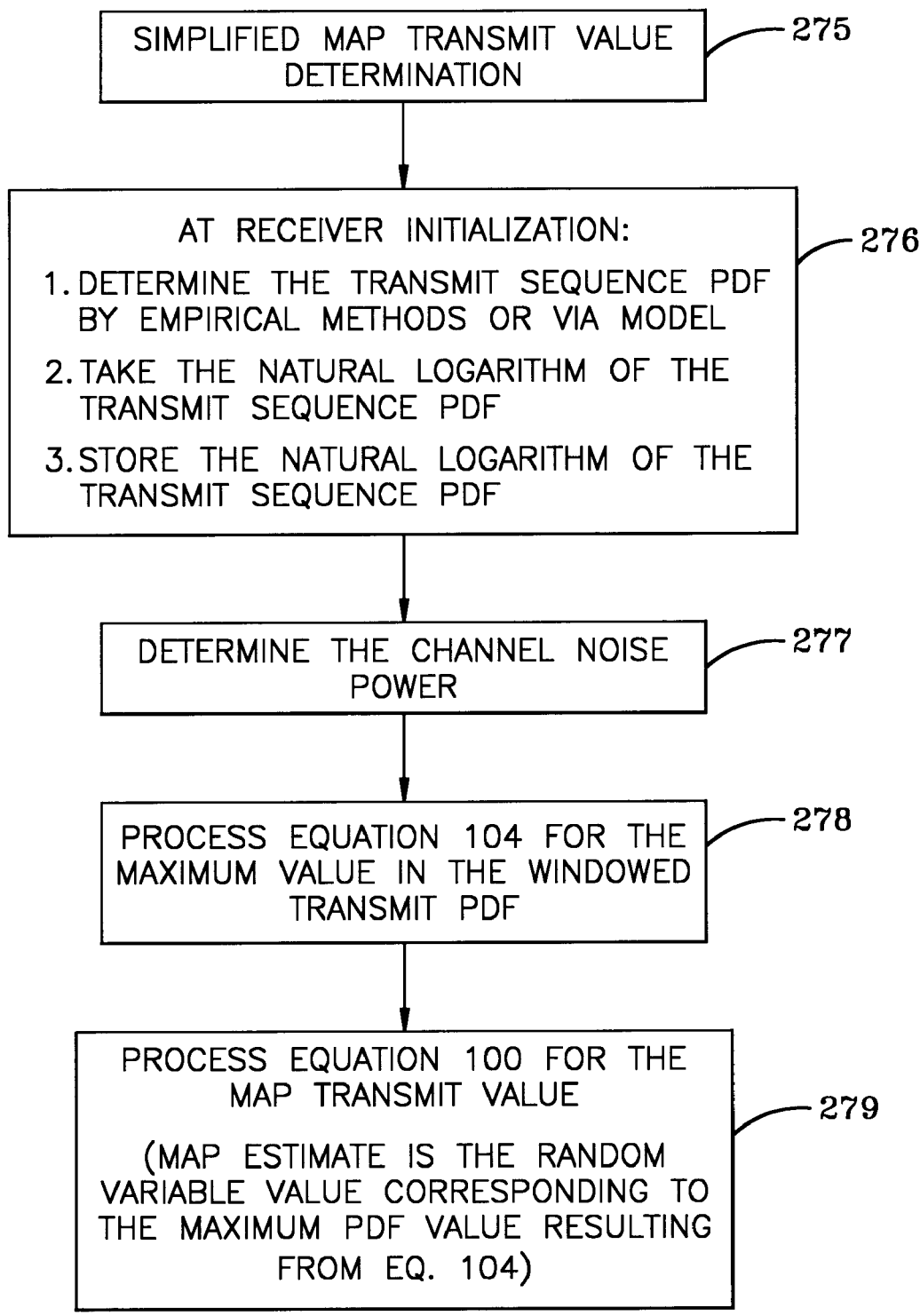
FIG. 27 is a flowchart of the simplified MAP value determination.

FIG. 27 is a flowchart of the simplified MAP value determination 275. At receiver initialization, the transmit sequence PDF is determined, the natural logarithm of the transmit sequence PDF is taken and stored 276. The transmit sequence PDF could be an empirical waveform in memory or a model of an empirical waveform, with the natural logarithm taken on a point-by-point basis if no closed form equations are available. The channel noise power is determined 277. Equation (104) is processed for the maximum value in the windowed transmit PDF 278. Equation (100) is processed for the MAP transmit value 279 where the MAP estimate is the random variable value corresponding to the maximum PDF value resulting from equation (104). The implementation of this simplified MAP transmit value calculation relies only on the exponential form of the noise model PDF. It does not assume anything about the transmit signal PDF.

The regions of the transmit PDF that are close to zero are of practical concern in the use of the logarithm function at receiver initialization. The addition of a very small value (i.e., $10^{-100}$) prior to taking the logarithm avoids a negative infinity result without altering the calculation or the PDF properties.

Turning back to FIG. 17, the third current estimate which is called decision feedback is derived by performing a chaotic transformation on the previous decision values 121 by passing the previous estimate through the Henon and mirrored Henon equations. The previous estimate will be exact in the absence of noise, and the result of the chaotic map operating on it will generate an exact estimate of the next received iterate. The previous estimate will have some error in the presence of noise and will be somewhat inaccurate in predicting the next nominal received iterate via the Henon and mirrored Henon transforms. The fact that it is combined with two other estimates to make an initial decision and then mapped onto the chaotic attractor to produce a final decision enables each original estimate to impact the final decision prior to the imposition of the chaotic dynamics. This process helps to track the chaotic motion and eliminate the truly random motion attributed to the noise in the received data stream.

The chaotic mapping provides two sets of inputs to the decision and weighting block 122, the Henon and the mirrored Henon x- and y-values, $(x_h[k], y_h[k])$ and $(x_m[k], y_m[k])$. Whichever x-value is closer to the other two estimates is chosen, its corresponding Henon or mirrored Henon system becomes the instantaneous system $s_i[k]$, and its concomitant y-value is passed with the initial decision to the parabola mapping operation.

The algorithm is as follows:

If $s_d[k-1] = h$ ⇐ Henon previous decision $$\left.\begin{array}{l}x_h[k] = -1.4x_d^2[k-1] + y_d[k-1] + 1 \\ y_h[k] = 0.3x_d[k-1] \\ x_m[k] = 1.4(-x_d)^2[k-1] + (-y_d)[k-1] - 1 \\ y_m[k] = 0.3(-x_d)[k-1]\end{array}\right\} \quad (105)$$

else ⇐ mirrored Henon previous decision $$\left.\begin{array}{l}x_h[k] = -1.4(-x_d)^2[k-1] + (-y_d)[k-1] + 1 \\ y_h[k] = 0.3(-x_d)[k-1] \\ x_m[k] = 1.4x_d^2[k-1] + y_d[k-1] - 1 \\ y_m[k] = 0.3x_d[k-1]\end{array}\right\} \quad (106)$$

end where $s_d[k]$=receiver final system decision for the $k^{th}$ iterate—Henon or mirrored Henon $x_d[k]$=receiver final x-value decision for the $k^{th}$ iterate $y_d[k]$=receiver final y-value decision for the $k^{th}$ iterate.

Turning back to FIG. 17, the Decision and Weighting function 122 (FIG. 16, 104) performs a probabilistic combination of all three initial estimates. It finds the probability of each transmitted value estimate 123 for the MAP estimate, received value and decision feedback methods. It decides which feedback estimate the MAP and received value estimates are closest to, generates the weights used in a weighted averaged computation 124, performs the weighted average, and calculates another factor to discount the initial decisions whose received values were in the vicinity of zero 125. It passes the initial decision x-value and the corresponding y-value to the final decision generator 126 and the zero proximity discount value to the System to Bit map function 128, where the data bits are recovered. The first operation of the Decision and Weighting function 122 is to calculate the one-dimensional Euclidean distances from the received value and the MAP decision to each of the Henon and mirrored Henon transforms of the previous estimate. The initial current iterate system choice corresponds to the minimum distance, and the feedback x- and y-values are taken from the chosen system.

$$d_h[k]=(x_r[k]-x_h[k])^2+(x_{mp}[k]-x_h[k])^2 \quad (107)$$

$$d_m[k]=(x_r[k]-x_m[k])^2+(x_{mp}[k]-x_m[k])^2 \quad (108)$$

$$s_i[k] = system(\min\{d_h[k], d_m[k]\}) \quad \text{Henon or mirrored Henon system} \quad (109)$$

$$x_{si}[k] = x(\min\{d_h[k], d_m[k]\}) \quad \text{corresponding } x\text{-value} \quad (110)$$

$$y_{si}[k] = y(\min\{d_h[k], d_m[k]\}) \quad \text{corresponding } y\text{-value} \quad (111)$$

The second operation executed by the decision and weighting function is weighting factor generation based on probability calculations. As was done in the MAP decision algorithm, the bin width w is ignored as contributing nothing to the calculation, as all the required information is contained in the PDF bin value that is referred to loosely as the probability.

Each of the constituent estimates $x_r[k]$, $x_{mp}[k]$, $x_{si}[k]$ is associated with two independent probabilities. The first of these is drawn from the transmit PDF window used in determining the MAP transmission value, which is the channel noise PDF reversed in x and centered on the received value $x_r[k]$ and serves to quantify the channel effects. The second one is based on the transmit or received PDF as appropriate and characterizes the probabilistic effects of the chaotic dynamics. These contributions are independent, and are multiplied together to produce each weighting factor, which change for every received iterate.

All estimates are of the transmitted value $x_t[k]$ and pertain to the situation that $x_r[k]$ was received on the $k^{th}$ iterate in the presence of noise. They are therefore associated with the noise probability window constructed on the observation $x_r[k]$ and shown in FIG. 28 that outlines the range of possible transmit values that could result in the reception of $x_r[k]$. The difference between $x_r[k]$ and each estimate is the noise that caused $x_r[k]$ to be observed if the estimate were accurate, and the bin value of the PDF is the probability that that amount of noise occurred. The first probability contribution to each weight is expressed as $$x_r[k]-x_*[k]=n_*[k] \quad (112)$$

where *=r (received), mp (MAP), or si (system initial decision, equation (110))

$$w_{r1}[k]=p_n(x_r[k]-x_r[k])=p_n(n_r[k])=p_n(0) \quad (113)$$

$$w_{mp1}[k]=p_n(x_r[k]-x_{mp}[k])=p_n(n_{mp}[k]) \quad (114)$$

$$w_{si1}[k]=p_n(x_r[k]-x_{si}[k])=p_n(n_{si}[k]) \quad (115)$$

The second contribution to the weighting function comes from the transmit or received PDF. The known fact in this consideration is that $x_r[k]$ was received on iterate k. The received PDF is appropriate for the $x_r$ estimate because the total weight reflects the probability that $x_r$ was received and no noise occurred. The viewpoint that $x_r$ is an estimate of the transmit value and could utilize the transmit PDF is not adopted here because $x_r$ can have values outside the valid transmit range, which results in a weighting factor of zero. This weighting would nullify the estimate and its ability to contribute to the receiver decision. However, it is desirable to have the decision be based on three estimates in all cases due to the fact that no estimate is known to be correct, but $x_r[k]$ is known to be observed.

The transmit PDF is used for $x_{mp}$ so the total weight quantifies the probability that $x_r$ was received and the maximum probability transmitted value $x_{mp}$ was actually transmitted. It uses the transmit PDF because this estimate is the statistically most probable transmitted value, calculated by windowing the transmit PDF, and the corresponding transmit probability is quantified in the transmit PDF bin value. It is impossible for this weighting factor to be zero because the method of finding $x_{mp}$ inherently places it within the valid transmit range.

The feedback of the transformed instantaneous system decision uses the received PDF because the previous decision on which it is based is an estimate of the previously transmitted value. Although the previous decision had been mapped onto the attractor geometrical model, it is possible for the small discrepancies between the attractor and its model to result in a transformed iterate value slightly outside the valid region of the transmit sequence and the subsequent nullification of the estimate. This situation is avoided by use of the received PDF to generate the weighting factor second contribution.

The equations for the second set of weighting factors are $$w_{r2}[k]=p_r(x_r[k]) \quad (116)$$

$$w_{mp2}[k]=p_t(x_{mp}[k]) \quad (117)$$

$$w_{si2}[k]=p_r(x_{si}[k]) \quad (118)$$

The total weights are $$w_*=w_{*1}w_{*2}, *=r, mp, \text{ or si} \quad (119)$$

and the receiver initial decision is the weighted average of the estimates $$x_{d1}[k]=\frac{x_r[k]w_r[k]+x_{mp}[k]w_{mp}[k]+x_{si}[k]w_{si}[k]}{w_r[k]+w_{mp}[k]+w_{si}[k]} \quad (120)$$

This value of $x_{d1}[k]$ is sent with $y_{si}[k]$ to the approximation parabola block.

Figure 30:
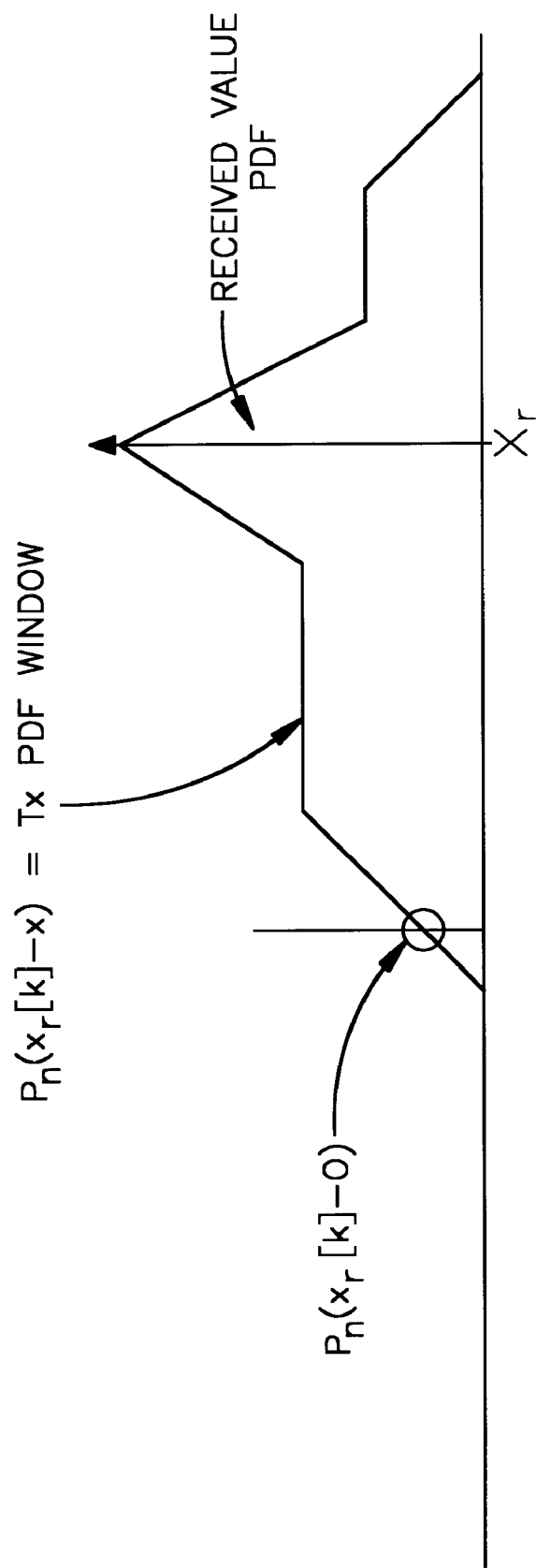
FIG. 30 is a graphical representation of the probability of reversed noise PDF centered on the received iterate and evaluated at zero.

The final action of the decision and weighting block is to calculate a discount weight to reduce the impact that those initial decisions whose received iterate values were close to zero may have on the bit decisions resulting from combining individual iterate decisions. The term "close to" is quantified via the estimated SNR on every iterate. FIG. 30 depicts the transmit window, which is the noise PDF reversed in x and centered on the received value. The value of this function at x=0 quantifies the relative probabilistic distance of the current received iterate from zero assuming a unimodal noise PDF, which is valid for the AWGN channel in this investigation. Received iterate values close to zero will have large probabilities and those far from zero will have small probabilities as measured by the current average SNR estimate. The inverse of this probability is the desired discount value.

$$w_{do}[k]=\frac{1}{p_n(x_r[k]-0)} \quad (121)$$

This discount weight is sent to the System to Bit Map Block for data bit recovery.

Figure 31:
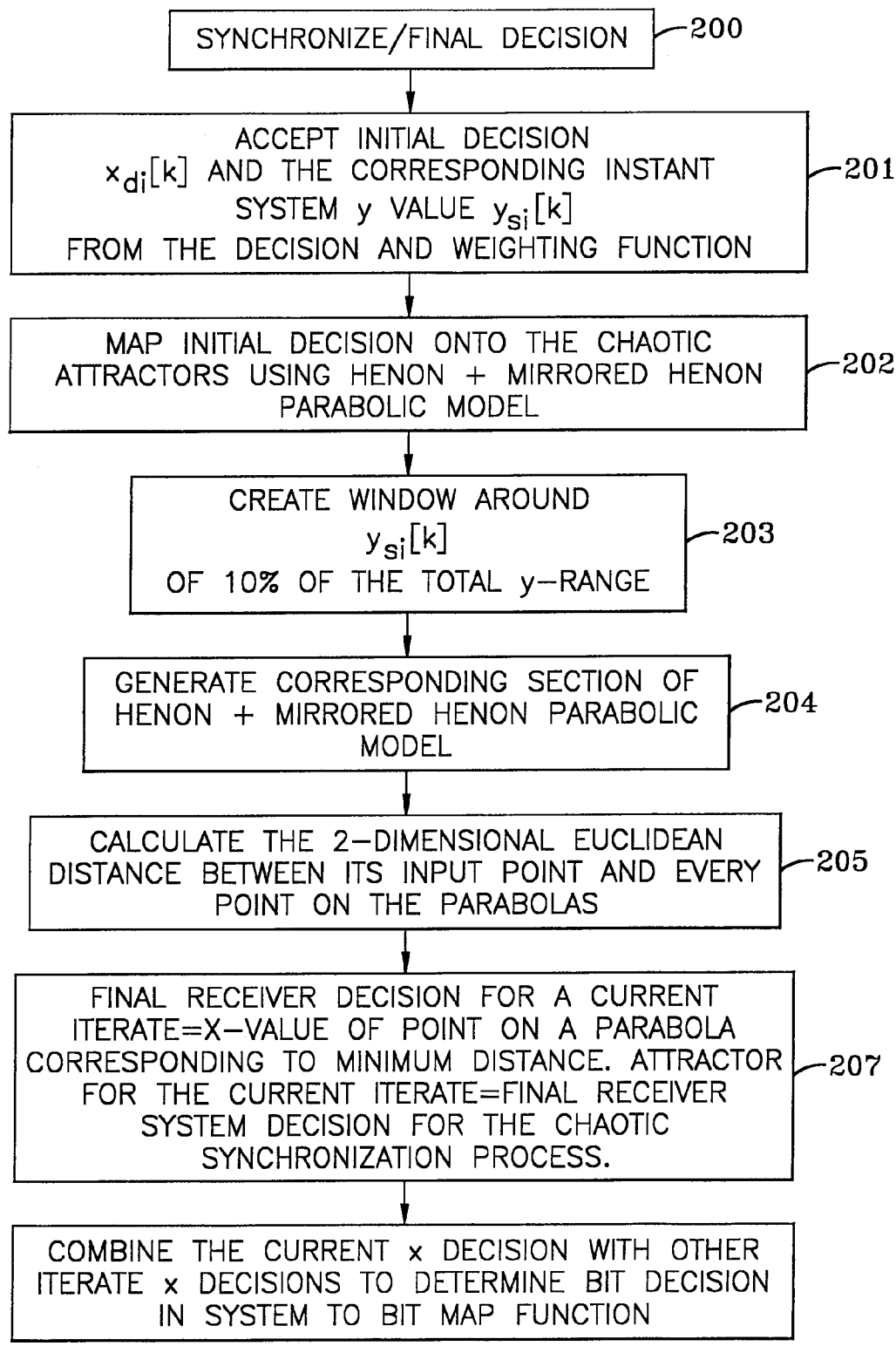
FIG. 31 is a flowchart of the synchronizer/final decision function.

FIG. 31 is a flowchart of the Synchronizer/Final Decision function 200 (FIG. 17, 126 and FIG. 16, 102). It accepts the initial decision $x_{d1}[k]$ and the corresponding instantaneous system y-value $y_{si}[k]$ from the decision and weighting function 201. It maps the initial decision onto the chaotic attractors using the Henon and mirrored Henon parabola models 202. It creates a window around $y_{si}[k]$ of ten percent of the total y-range 203 and generates the appropriate sections of the Henon and mirrored Henon parabola models as shown below 204.

$$y_{max}=0.3862 \text{ absolute+/−limit of y-range on Henon attractor} \quad (122)$$

$$y_{tot}=2y_{max} \quad (123)$$

$$w_y=\frac{y_{tot}}{1000} \text{ y-bin width- not necessary to be factor of 2} \quad (124)$$

$$[y_r]=[y_{si}[k]-50w_y, \ldots y_{si}[k]-w_y, y_{si}[k], y_{si}[k]+w_y, \ldots, y_{si}[k]+50w_y] \quad (125)$$

$$[\tilde{x}_{h1}]=-15.15([y_r]-0.014)^2+0.710 \ldots -0.2846<[y_r]<0.3659$$

$$[\tilde{x}_{h2}]=-14.75([y_r]-0.018)^2+0.800 \ldots -0.1911<[y_r]<0.2215$$

$$[\tilde{e}_{h3}]=-16.60([y_r]+0.014)^2+1.245 \ldots -0.2154<[y_r]<0.2378$$

$$[\tilde{x}_{h4}]=-16.05([1y_r]+0.013)^2+1.280 \ldots -0.3862<[y_r]<0.3780$$

$$[\tilde{x}_{m1}]=15.15([y_r]+0.014)^2-0.710 \ldots -0.3659<[y_r]<0.2846$$

$$[\tilde{x}_{m2}]=14.75([y_r]+0.018)^2-0.800 \ldots -0.2215<[y_r]<0.1911$$

$$[\tilde{x}_{m3}]=16.60([y_r]-0.014)^2-1.245 \ldots -0.2378<[y_r]<0.2154$$

$$[\tilde{x}_{m4}]=16.05([y_r]-0.013)^2-1.280 \ldots -0.3780<[y_r]<0.3862 \quad (126)$$

where [●] denotes a vector of numbers except when [k], as in $y_{si}[k]$, is the iterate index.

The next step is the calculation of the two-dimensional Euclidean distance between its input point $(x_{d1}[k],y_{si}[k])$ and every point on all parabolas 205 as shown in the equation (127). It chooses the point on a parabola corresponding to the minimum distance equation (128), whose x-value becomes the final receiver decision for the current iterate and whose attractor is the final receiver system decision for the chaotic synchronization process 207. The overlapping Henon and mirrored Henon attractors cross in the general vicinity of x=0, causing iterate decision errors at their points of crossing because the Henon and mirrored Henon parabolas are so close that the correct attractor cannot be reliably chosen in the mapping process. This situation is exacerbated by noise, and the weighting factor that discounts decisions for received values close to zero based on the estimated SNR is applied in the system to Bit Map (FIG. 16, 105 and FIG. 17, 128) and serves to minimize this effect.

$$[d_{h1}]=[(x_d[k]-[\tilde{x}_{h1}])^2+(y_{si}[k]-[y_r])^2]$$

$$[d_{h2}]=[(x_d[k]-[\tilde{x}_{h2}])^2+(y_{si}[k]-[y_r])^2]$$

$$[d_{h3}]=[(x_d[k]-[\tilde{x}_{h3}])^2+(y_{si}[k]-[y_r])^2]$$

$$[d_{h4}]=[(x_d[k]-[\tilde{x}_{h4}])^2+(y_{si}[k]-[y_r])^2]$$

$$[d_{m1}]=[(x_d[k]-[\tilde{x}_{m1}])^2+(y_{si}[k]-[y_r])^2]$$

$$[d_{m2}]=[(x_d[k]-[\tilde{x}_{m2}])^2+(y_{si}[k]-[y_r])^2]$$

$$[d_{m3}]=[(x_d[k]-[\tilde{x}_{m3}])^2+(y_{si}[k]-[y_r])^2]$$

$$[d_{m4}]=[(x_d[k]-[\tilde{x}_{m4}])^2+(y_{si}[k]-[y_r])^2] \quad (127)$$

$$d_{tot}=[[d_{h1}][d_{h2}][d_{h3}][d_{h4}][d_{m1}][d_{m2}][d_{m3}][d_{m4}]] \quad (128)$$

$$d_{min}=\min\{[d_{tot}]\} \quad (129)$$

The receiver final iterate decision values are $$x_d[k]=\tilde{x}(\min\{[d_{tot}]\}) \text{ x-value} \quad (130)$$

$$y_d[k]=y_{si}(\min\{[d_{tot}]\}) \text{ y-value} \quad (131)$$

$$s_d[k]=s_i(\min\{[d_{tot}]\}) \text{ chaotic system} \quad (132)$$

These decisions are the approximate (x,y) attractor components of the current iterate, along with the system to which the point belongs. The current x-decision is combined with other iterate x-decisions to determine a bit decision in the System to Bit Map Block (FIG. 17, 128), and the system decision is the synchronization output of the receiver estimation engine. The methods of the prior art have not been invoked to achieve decisions or synchronization. Special invertible chaotic systems are not required, nor is the division into subsystems that was needed for the Pecora-Carroll method. The only requirement on the chaotic system for this technique is the ability to model it with a geometric approximation.

The failure of the Henon fixed point as an advantageous receiver decision initial condition prompted the search for a better choice. The superimposed Henon and mirrored Henon attractors representing the transmit sequence were observed to have a point at (0,0) that is not on either attractor but central to both. This point was tried as a possible initialization value for the receiver initial decision. The first iterate of the chaotic maps moved this common point to (1,0) and (−1,0) for the Henon and mirrored Henon systems, respectively. These points quickly moved to onto their attractors with further iterations of the chaotic maps. These chaotic dynamics of the initial condition are coupled with the decision process of combining three transmitted value estimates into a single initial decision via probabilistic computations. This step is followed by the mapping of the initial decision (FIG. 17, 126) onto the attractors in order to further incorporate the chaotic dynamics into the final decision process. The net effect of combining the probability and chaotic dynamics in this manner tended to pull the initial receiver condition in the direction of the received iterates such that synchronization was quickly achieved, well within the 200-iterate transient period of the SNR estimator.

If the current iterate is not the last iterate to be processed in a bit interval, processing continues in FIG. 17 step 114 to process the next iterate. If the current iterate is the final bit interval iterate to be processed, indicating that a data bit transmission is complete 127, the System to Bit Map function 128 (FIG. 16, 105) calculates the current received data bit value. It accepts as inputs the vector of iterate system decisions $$[s_d]=[s_d[nN+1],s_d[nN+2],s_d[nN+3], \ldots s_d[nN+N]] \quad (133)$$

and the corresponding vector of iterate discount weights $$[w_{d0}]=[w_{d0}[nN+1],w_{d0}[nN+2],w_{d0}[nN+3], \ldots w_{d0}[nN+N]] \quad (134)$$

where N is the number of iterates per bit n is the index of bits already processed, and iterate index k as been replaced by the bit-referenced iterate index as shown.

For example, during the second bit period n=1 and the iterate index range is [N+1,2N]. On the final segment of a bit duration, this algorithm creates a binary antipodal vector from the system decisions and performs a weighted average to find the bit decision.

Each Henon decision takes on the value $s_d[●]=1$ and each mirrored Henon decision takes on the value $s_d[●]=-1$. Then the vector of iterate system decisions (equation 133) in binary antipodal format is $$[s_{ba}]=[s_{ba}[nN+1],s_{ba}[nN+2],s_{ba}[nN+3], \ldots s_{ba}[nN+N]] \quad (135)$$

A weighted average performed on this vector, using the discount weights for received value proximity to zero is evaluated for positive or negative quality. A positive value is a Henon bit decision and a negative value is a mirrored Henon bit decision.

$$B_v[n+1] = \frac{\sum_{k=nN+1}^{nN+N} s_{ba}[k]w_{d0}[k]}{\sum_{k=nN+1}^{nN+N} w_{d0}[k]} \quad (136)$$

$$B_s[n+1] = \begin{cases} \text{Henon} \Rightarrow B_v[n+1] \geq 0 \\ \text{Mirrored\_Henon} \Rightarrow B_v[n+1] < 0 \end{cases} \quad (137)$$

Note that the denominator is positive definite because the weighting values are based on probabilities, which cannot be negative and exist in the range [0,1]. The denominator, therefore, need not be calculated since the impending decision seeks only the positive or negative attribute of the weighted average; which is not affected by division with a positive number.

Figure 32:
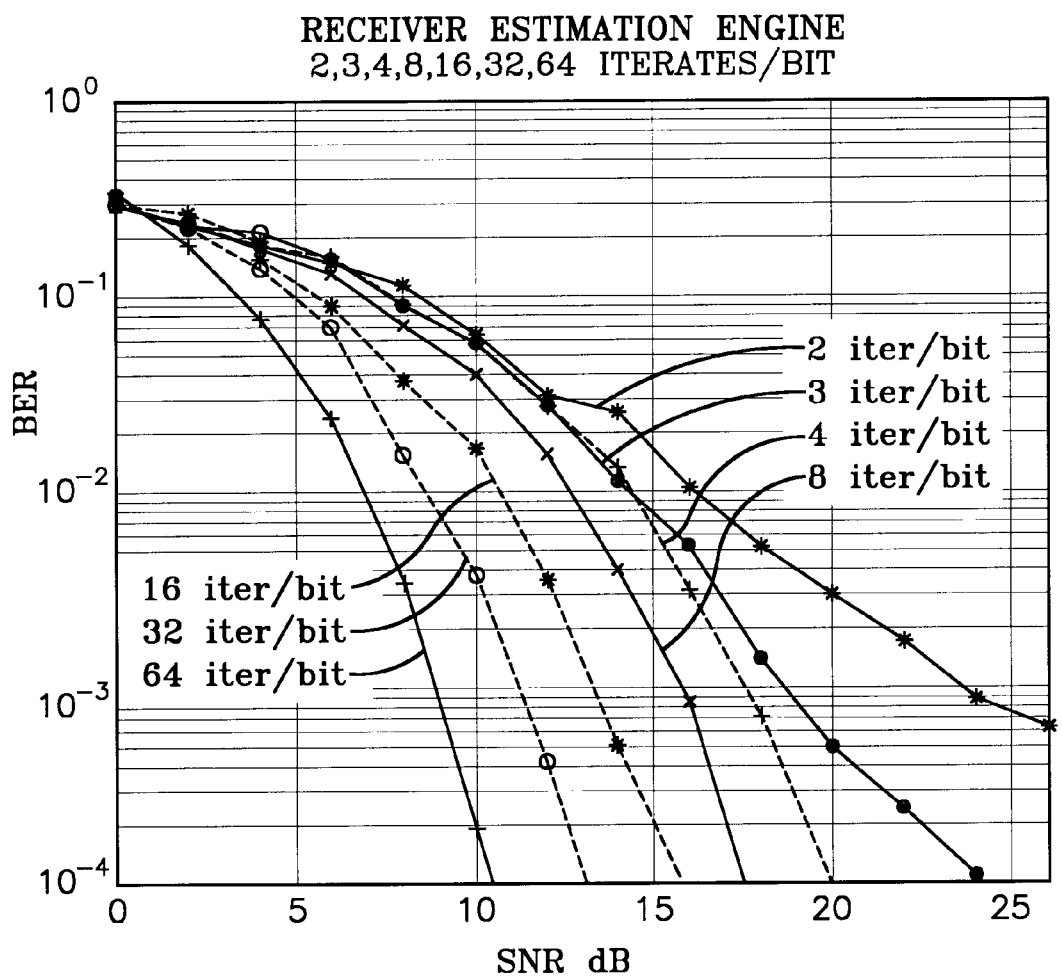
FIG. 32 is a plot of the results of the receiver estimation engine model for SNR values between 0 and 26 dB and for a number of iterates per bit of 2, 3, 4, 8, 16, 32 and 64.

The chaotic communication system using a receiver estimation engine was modeled and simulated in MATLAB. Data runs were taken for SNR values between 0 dB and 26 dB, and for the number of iterates per bit of 2, 3, 4, 8, 16, 32, and 64. The results are shown in FIG. 32. The receiver recovers data bits with as little as two iterates per bit, and performance is improved with increasing iterates per bit.

Although the present invention has been described in detail with reference to certain preferred embodiments, other embodiments are possible. Therefore, the spirit and scope of the appended claims should not be limited to the description of the preferred embodiments herein.

What is claimed is:

1. A nonlinear chaotic receiver comprising a component for receiving a chaotic encoded digital signal transmission from a chaotic transmitter, synchronizing the chaotic receiver with the chaotic transmitter and recovering the contents of the encoded chaotic digital signal transmission using a chaotic strange attractor model and a chaotic probability density function model, wherein:
  a. synchronization of the chaotic receiver with the chaotic transmitter and recovery of the contents of the encoded chaotic digital signal transmission occurs in the same calculations and results concurrently from the same calculations,
  b. the chaotic encoded digital signal transmission is a data sequence comprising a first through N number of iterates, wherein the first iterate represents a first value in the data sequence and the Nth iterate represents a last value in the data sequence; and
  c. the chaotic strange attractor model comprises:
    i. a strange attractor generated by combining Henon and mirrored Henon attractors, wherein the Henon and mirrored Henon attractors are generated by starting with one or more arbitrary points within an area of phase space that stretches and folds back onto itself, and inputting the points to a set of Henon equations, the result being the Henon attractor, and taking a mirror image of the Henon attractor to form the mirrored Henon attractor;
    ii. the strange attractor represented as a set of parabolas displayed on a Cartesian coordinate system; and
    iii. the parabolic regions of validity of the strange attractor determined.

2. A nonlinear chaotic receiver according to claim 1, wherein the chaotic attractor model further comprises determining any existing fixed point on the strange attractor that repeats itself through multiple iterations of the chaotic transmission.

3. A nonlinear chaotic receiver according to claim 1, wherein the data sequence of the received chaotic encoded digital signal transmission is randomly selected from the group consisting of a first logical state for the Henon attractor and a second logical state for the mirrored Henon attractor.

4. A nonlinear chaotic receiver according to claim 3, wherein the chaotic probability density function models the probability of the first and second logical states of the Henon and mirrored Henon attractors as a random selection.

5. A nonlinear chaotic receiver according to claim 1, wherein the strange attractor is generated by using image calculations on a Henon map.

6. A nonlinear chaotic receiver according to claim 1, wherein the strange attractor is represented in a Cartesian coordinate system as a crescent-like shape which occupies all four quadrants of the Cartesian coordinate system.

7. A nonlinear chaotic receiver according to claim 6, wherein the strange attractor is modeled as a set of four parabolas.

8. A nonlinear chaotic receiver comprising a component for receiving a chaotic encoded digital signal transmission from a chaotic transmitter, synchronizing the chaotic receiver with the chaotic transmitter and recovering the contents of the encoded chaotic digital signal transmission using a chaotic strange attractor model and a chaotic probability density function model, wherein:
  a. synchronization of the chaotic receiver with the chaotic transmitter and recovery of the contents of the encoded chaotic digital signal transmission occurs in the same calculations and results concurrently from the same calculations;
  b. the chaotic encoded digital signal transmission is a data sequence comprising a first through N number of iterates, wherein the first iterate represents a first value in the data sequence and the Nth iterate represents a last value in the data sequence:
    the nonlinear chaotic receiver further comprising means for determining the contents of the encoded chaotic digital signal transmission including:
  c. three estimates generated for each iterate received and an initial decision calculated for each iterate;
  d. the initial decision mapped onto the chaotic attractor to form a final decision for each estimate; and
  e. a discount weight calculated to reduce the impact of the initial decisions whose receive values are close to zero.

9. A nonlinear chaotic receiver according to claim 8, wherein the three estimates comprise:
  a. a first estimate which is the value of the received iterate;
  b. a second estimate which is a minimum error probabilistic estimate; and
  c. a third estimate which is a final decision of the previous iterate processed through Henon and mirrored Henon equations.

10. A nonlinear chaotic receiver according to claim 9, wherein the initial decision for each iterate comprises combining the three estimates to form the initial decision through a weighted average using probability calculations using the first, second and third estimates.

11. A nonlinear chaotic receiver according to claim 8, further comprising means for determining a synchronization estimate to synchronize the chaotic receiver with a chaotic transmitter that generates the encoded chaotic digital signal transmission.

12. A nonlinear chaotic receiver according to claim 11, wherein the means for determining a synchronization estimate comprises synchronizing the chaotic receiver with a plurality of chaotic processes used in generating the observed chaotic quantity.

13. A nonlinear chaotic receiver according to claim 12, wherein the means for determining a synchronization estimate comprises determining the synchronization data by mapping an initial decision onto the chaotic attractor to generate a final decision for each estimate and the synchronization data is the chaotic system in which the final decision resides.

14. A nonlinear chaotic receiver comprising:
  a. a receiver estimation engine for synchronizing the chaotic receiver with a chaotic transmitter and recovering the value of an encoded chaotic digital signal transmission, the receiver estimation engine comprising:
  i. a signal-to-noise ratio (SNR) estimator;
  ii. a maximum a posteriori (MAP) estimator;
  iii. a feedback estimator;
  iv. wherein the chaotic receiver and the chaotic transmitter synchronization and the encoded digital signal transmission recovery occur concurrently while executing the same set of calculations within the receiver estimation engine;
  b. a decision and weighting function within the receiver estimation engine comprising:
    i. probability of transmit value estimates determined using the SNR estimator, the MAP estimator and the feedback estimator for each received iterate;
    ii. an initial decision calculated for the iterate;
    iii. a discount weight calculated for a final decision for received values in close proximity to zero;
  c. within the receiver estimation engine, the final estimate of each iterate determined based on the initial decision from the decision and weighting function; and
  d. within the receiver estimation engine, the final decision of iterates 1 through N combined to recover the encoded digital signal transmission data sequence.

15. A nonlinear chaotic receiver according to claim 14, wherein the SNR estimator comprises:
  a. an instantaneous maximum likelihood SNR;
  b. a current average SNR value calculated as a running weighted average of the instantaneous maximum likelihood SNR; and
  c. the current average SNR value is used as feedback to the instantaneous maximum likelihood SNR to determine if a local instantaneous maximum likelihood value close to the current average SNR value exists.

16. A nonlinear chaotic receiver according to claim 15, wherein the instantaneous maximum likelihood SNR is determined for each iterate using a lookup-table.

17. A nonlinear chaotic receiver according to claim 15, wherein the instantaneous maximum likelihood SNR for each iterate is determined using a Newton-Raphson iterative root approximation optimization technique.

18. A nonlinear chaotic receiver according to claim 15, wherein the instantaneous maximum likelihood SNR for each iterate is determined using a modified Newton-Raphson root approximation.

19. A nonlinear chaotic receiver according to claim 14, wherein the MAP estimator comprises:
  a. a transmit probability density function window constructed for each iterate centered about the received value using channel noise power and probability density function characteristics; and
  b. a maximum value of a windowed transmit probability density function.

20. A nonlinear chaotic receiver according to claim 19, wherein the probability density function is modeled as a summation of deterministic functions.

21. A nonlinear chaotic receiver according to claim 19, wherein the modeled transmit probability density function includes using weighted Gaussian functions to approximate PDF defining characteristics.

22. A nonlinear chaotic receiver according to claim 19, wherein the MAP estimator comprises an empirical windowed transmit PDF waveform stored in memory at receiver initialization.

23. A nonlinear chaotic receiver according to claim 19, wherein the MAP estimator comprises a windowed transmit PDF waveform stored in memory at receiver initialization, wherein a transmit PDF waveform is generated from a summation of deterministic functions.

24. A nonlinear chaotic receiver according to claim 19, wherein the MAP estimator comprises a transmit PDF waveform windowed via in-line computations of closed form equations modeling the transmit PDF waveform as a summation of weighted Gaussian functions.

25. A nonlinear chaotic receiver according to claim 19, wherein the MAP estimator comprises a simplified MAP estimator having a calculation process that achieves computational efficiency on Gaussian noise probability density functions via the natural logarithm function.

26. A nonlinear chaotic receiver according to claim 25, wherein the simplified MAP estimator comprises the windowed natural logarithm of an empirically determined transmit PDF waveform.

27. A nonlinear chaotic receiver according to claim 25, wherein the simplified MAP estimator comprises the windowed natural logarithm of a transmit PDF model waveform consisting of a summation of deterministic functions.

28. A nonlinear receiver according to claim 15, wherein the instantaneous maximum likelihood SNR estimate comprises:
  a. a two dimensional probability model of the received probability density function;
  b. the two dimensional model sliced along an SNR axis;
  c. the maximum likelihood SNR for the current received value determined by using the two dimensional probability model in a Newton-Raphson iteration; and
  d. a current average SNR value used as feedback to the instantaneous maximum likelihood SNR estimator to determine if a local maximum instantaneous likelihood value close to the current average SNR value exists.

29. A method in a computer system of receiving and recovering the contents of a chaotic encoded digital signal transmission comprising:
  a. receiving a chaotic encoded digital signal transmission from a chaotic transmitter;
  b. synchronizing the chaotic receiver with the chaotic transmitter; and
  c. recovering the contents of the encoded chaotic digital signal transmission using a chaotic strange attractor model and a chaotic probability density function model,
  d. wherein:
    i. the synchronizing of the chaotic receiver with the chaotic transmitter and recovering of the contents of the encoded chaotic digital signal transmission occurs in the same calculations and results concurrently from the same calculations;
    ii. the receiving a chaotic encoded digital signal transmission is a data sequence comprising a first through N number of iterates, wherein the first iterate represents a first value in the data sequence and the Nth iterate represents a last value in the data sequence;
    iii. the using of a chaotic strange attractor model comprises:
      1. generating a strange attractor by combining Henon and mirrored Henon attractors, wherein the Henon and mirrored Henon attractors are generated by starting with one or more arbitrary points within an area of phase space that stretches and folds back onto itself, and inputting the points to a set of Henon equations, the result being the Henon attractor, and taking a mirror image of the Henon attractor to form the mirrored Henon attractor;

2. representing the strange attractor as a set of parabolas displayed on a Cartesian coordinate system; and 3. determining the parabolic regions of validity of the strange attractor.

30. The method according to claim 29, wherein the chaotic strange attractor model comprises:

a. a strange attractor generated by combining Henon and mirrored Henon attractors, wherein the Henon and mirrored Henon attractors are generated by starting with one or more arbitrary points within an area of phase space that stretches and folds back onto itself, and inputting the points to a set of Henon equations, the result being the Henon attractor, and taking a mirror image of the Henon attractor to form the mirrored Henon attractor;

b. representing the strange attractor as a set of parabolas displayed on a Cartesian coordinate system; and c. determining the parabolic regions of validity of the strange attractor.

31. The method according to claim 29, wherein the chaotic attracter model further comprises determining any existing fixed point on the strange attractor that repeats itself through multiple iterations of the chaotic transmission.

32. The method according to claim 29, wherein the data sequence of the received chaotic encoded digital signal transmission is randomly selected from the group consisting of a first logical state for the Henon attractor and a second logical state for the mirrored Henon attractor.

33. The method according to claim 31, wherein the chaotic probability density function models the probability of the first and second logical states of the Henon and mirrored Henon attractors as a random selection.

34. The method according to claim 29, wherein the strange attractor is generated by using image calculations on a Henon map.

35. The method according to claim 29, wherein the strange attractor is represented in a Cartesian coordinate system as a crescent-like shape which occupies all four quadrants of the Cartesian coordinate system.

36. The method according to claim 34, wherein the strange attractor is modeled as a set of four parabolas.

37. A method according to claim 36, wherein the initial decision is generated using a decision and weighting function.

38. A method in a computer system of receiving and recovering the contents of a chaotic encoded digital signal transmission comprising:

a. receiving a chaotic encoded digital signal transmission from a chaotic transmitter;

b. synchronizing the chaotic receiver with the chaotic transmitter; and c. recovering the contents of the encoded chaotic digital signal transmission using a chaotic strange attractor model and a chaotic probability density function model d. wherein:

i. the synchronizing of the chaotic receiver with the chaotic transmitter and recovering of the contents of the encoded chaotic digital signal transmission occurs in the same calculations and results concurrently from the same calculations;

ii. the receiving a chaotic encoded digital signal transmission is a data sequence comprising a first through N number of iterates, wherein the first iterate represents a first value in the data sequence and the Nth iterate represents a last value in the data sequence; and e. determining the contents of the encoded chaotic digital signal transmission by:

i. generating three estimates for each iterate received and calculating an initial decision for each iterate;

ii. mapping the initial decision on onto the chaotic attractor to form a final decision for each estimate; and iii. calculating a discount weight to reduce the impact of the initial decisions whose receive values are close to zero.

39. The method according to claim 38, wherein the three estimates comprise:

a. a first estimate which is the value of the received iterate;

b. a second estimate which is a minimum error probabilistic estimate; and c. a third estimate which is a final decision of the previous iterate processed through Henon and mirrored Henon equations.

40. The method according to claim 39, wherein the initial decision for each iterate comprises combining the three estimates to form the initial decision through a weighted average using probability calculations using the first, second and third estimates.

41. The method according to claim 38, further comprising determining a synchronization estimate to synchronize the chaotic receiver with a chaotic transmitter that generates the encoded chaotic digital signal transmission.

42. The method according to claim 41, wherein the determining a synchronization estimate further comprises synchronizing the chaotic receiver with a plurality of chaotic processes used in generating the observed chaotic quantity.

43. The method according to claim 42, wherein the determining a synchronization estimate comprises determining the synchronization data by mapping an initial decision onto the chaotic attractor to generate a final decision for each estimate and the synchronization data is the chaotic system in which the final decision resides.

44. A method in computer system of receiving and recovering the contents of a chaotic encoded digital signal transmission comprising:

a. synchronizing a chaotic receiver with a chaotic transmitter and recovering an encoded chaotic digital signal transmission using a receiver estimation engine, said engine comprising:

i. a signal-to-noise ratio (SNR) estimator;

ii. a maximum a posteriori (MAP) estimator;

iii. a feedback estimator;

iv. wherein the chaotic receiver and the chaotic transmitter are synchronized and the encoded digital signal transmission are recovered concurrently when executing the same set of calculations within the receiver estimation engine;

b. using a decision and weighting function within the receiver estimation engine comprising:

i. determining the probability of transmit value estimates using the SNR estimator, the MAP estimator and the feedback estimator for each received iterate;

ii. calculating an initial decision for the iterate;

iii. calculating a discount weight for a final decision for received values in close proximity to zero;

c. determining the final value of each iterate based on the initial decision from the decision and weighting function; and d. combining the final decision of iterates 1 through N to recover the encoded digital signal transmission data sequence.

45. The method according to claim 92, wherein the SNR estimator comprises:
   a. calculating an instantaneous maximum likelihood SNR;
   b. calculating a current average SNR value as a running weighted average of the instantaneous maximum likelihood SNR; and
   c. using the current average SNR value as feedback to the instantaneous maximum likelihood SNR to determine if a local instantaneous maximum likelihood value close to the current average SNR value exists.

46. The method according to claim 45, wherein the instantaneous maximum likelihood SNR is determined for each iterate using a lookup-table.

47. The method according to claim 45, wherein the instantaneous maximum likelihood SNR for each iterate is determined using a Newton-Raphson iterative root approximation optimization technique.

48. The method according to claim 45, wherein the instantaneous maximum likelihood SNR for each iterate is determined using a modified Newton-Raphson root approximation.

49. The method according to claim 44, wherein the MAP estimator comprises:
   a. determining and storing the transmit sequence PDF;
   b. determining the channel noise PDF;
   c. constructing a basic window with channel noise PDF reversed along a ransom variable axis;
   d. constructing an iterated window by centering the basic window on a currently received iterate value;
   e. multiplying the transmit PDF by the iterate window to form a windowed transmit PDF; and
   f. setting the MAP estimate to a random variable value corresponding to the maximum PDF value in the windowed transmit PDF.

50. The method according to claim 49, wherein the PDF is modeled as a summation of deterministic functions.

51. The method according to claim 49, wherein modeling the transmit probability density function comprises using a weighted Gaussian function to approximate PDF defining characteristics.

52. The method according to claim 49, wherein the MAP estimator comprises windowing an empirical transmit PDF waveform stored in memory at receiver initialization.

53. The method according to claim 49, wherein the MAP estimator comprises windowing a transmit PDF waveform stored in memory at receiver initialization, where the transmit PDF waveform is generated from a summation of deterministic functions.

54. The method according to claim 49, wherein the MAP estimator comprises windowing a transmit PDF waveform via in-line computations of closed form equations modeling the transmit PDF waveform as a summation of weighted Gaussian functions.

55. The method according to claim 49, wherein the MAP estimator comprises a simplified MAP estimator having a calculation process that achieves computational efficiency on Gaussian noise probability density functions via the natural logarithm function.

56. The method according to claim 55, wherein the simplified MAP estimator windows the natural logarithm of an empirically determined transmit PDF waveform.

57. The method according to claim 55, wherein the simplified MAP estimator windows the natural logarithm of a transmit PDF model waveform consisting of a summation of deterministic functions.

58. The method according to claim 44, wherein the MAP estimator is a simplified MAP estimator comprising:
   a. at receiver initialization:
      i. determining the transmit sequence PDF;
      ii. taking and storing the natural logarithm of the transmit sequence PDF;
   b. determining channel noise power;
   c. processing equation (104) for the maximum value in the windowed transmit PDF; and
   d. processing equation (100) to find the MAP estimate where the MAP estimate is a random variable value corresponding to the maximum PDF value resulting from equation (104).

59. The method according to claim 45, wherein the instantaneous maximum likelihood SNR estimate comprises:
   e. constructing a two dimensional probability model of the received probability density function;
   f. slicing the two dimensional model along an SNR axis;
   g. determining the maximum likelihood SNR for the current received value by using the two dimensional probability model in a Newton-Raphson iteration; and
   h. using a current average SNR value as feedback to the instantaneous maximum likelihood SNR estimator to determine if a local maximum instantaneous likelihood value close to the current average SNR value exists.

60. A nonlinear receiver according to claim 37, wherein the synchronizer and final decision function incorporates estimation methods with chaotic dynamics to determine a maximum likelihood chaotic quantity from an observed quantity that is chaotic in nature.

61. A computer-readable medium containing instructions for controlling a computer system for receiving and recovering the contents of a chaotic encoded digital signal transmission comprising:
   e. recovering the value of an encoded chaotic digital signal transmission using a receiver estimation engine, said engine comprising:
      i. a signal-to-noise ratio (SNR) estimator;
      ii. a maximum a posteriori (MAP) estimator;
      iii. a feedback estimator;
   f. using a decision and weighting function within the receiver estimation engine comprising:
      i. determining the probability of a received value using the SNR estimator, the MAP estimator and the feedback estimator for each received iterate;
      ii. calculating an initial decision for the iterate;
      iii. calculating a discount weight for a final decision for received values in close proximity to zero;
   g. determining the final value of each iterate based on the initial decision from the decision and weighting function; and
   h. combining the final decision of iterates 1 through N to recover the encoded digital signal transmission data sequence.

62. The method according to claim 37, wherein the synchronizer and final decision function comprises combining synchronization and message data demodulation into a single set of calculations.

63. The method according to claim 37, wherein the attractors are modeled as a set of geometrical functions having defined regions of validity.

64. The method of claim 62, wherein the synchronizer and final decision function uses an initial decision and maps Cartesian coordinates of the initial decision onto a Cartesian coordinate representation of a chaotic strange attractor.

65. The method according to claim 64, wherein the chaotic strange attractor comprises:

i. generating the strange attractor by combining Henon and mirrored Henon attractors, wherein the Henon and mirrored Henon attractors are generated by starting with one or more arbitrary points within an area of phase space that stretches and folds back onto itself, and inputting the points to a set of Henon equations, the result being the Henon attractor, and taking a mirror image of the Henon attractor to form the mirrored Henon attractor;

j. representing the strange attractor as a set of parabolas displayed on a Cartesian coordinate system; and k. determining the parabolic regions of validity of the strange attractor.

66. The method according to claim 65, wherein the strange attractor is modeled as a set of four parabolas.

67. The method according to claim 64, wherein a final decision is determined by mapping the initial decision onto the chaotic attractor to form a final decision for each estimate.

\* \* \* \* \*